United States Patent
Karanasios et al.

(10) Patent No.: US 12,413,081 B2
(45) Date of Patent: Sep. 9, 2025

(54) MULTIPORT BATTERY

(71) Applicant: Brunswick Corporation, Mettawa, IL (US)

(72) Inventors: Evripidis Karanasios, Nieuw-Vennep (NL); Ramon Ferre Vila, Les Borges del Camp (ES)

(73) Assignee: Brunswick Corporation, Mettawa, IL (US)

( * ) Notice: Subject to any disclaimer, the term of this patent is extended or adjusted under 35 U.S.C. 154(b) by 195 days.

(21) Appl. No.: 17/985,682

(22) Filed: Nov. 11, 2022

(65) Prior Publication Data

US 2024/0162729 A1 May 16, 2024

(51) Int. Cl.
*B60L 53/16* (2019.01)
*B60L 53/62* (2019.01)
(Continued)

(52) U.S. Cl.
CPC ............ *H02J 7/0036* (2013.01); *B60L 53/16* (2019.02); *B60L 53/62* (2019.02); *B60L 58/19* (2019.02);
(Continued)

(58) Field of Classification Search
CPC ...... H02J 7/0036; H02J 7/0013; H02J 7/0045; H02J 7/0047; H02J 7/0063; H02J 7/0042;
(Continued)

(56) References Cited

U.S. PATENT DOCUMENTS 6,507,164 B1 1/2003 Healey et al.
6,902,446 B1 6/2005 Healey
(Continued)

FOREIGN PATENT DOCUMENTS

WO 2021216912 10/2021

OTHER PUBLICATIONS

Extended European Search Report for corresponding European Application No. 23209263.5, mailed May 13, 2024.
(Continued)

*Primary Examiner* — Rexford N Barnie
*Assistant Examiner* — Xuan Ly
(74) *Attorney, Agent, or Firm* — Andrus Intellectual Property Law, LLP

(57) ABSTRACT

A battery includes at least one battery cell, a bidirectional port configured to provide current output to a load from the at least one battery cell and to receive a charge current from a battery charger to charge the at least one battery cell, a charge only port configured to receive charge current from the battery charger to charge the at least one battery cell, and a battery control system. The battery control system is configured to detect a connection status of the bidirectional port and/or the charge only port and, based on the connection status of each port, to control the battery between a power delivery mode where current can flow from the at least one battery cell out of the bidirectional port, a charge mode where current can from the bidirectional port or the charge only port to the at least one battery cell, and a disconnected mode where current cannot flow between the bidirectional port or the charge only port and the at least one battery cell.

20 Claims, 28 Drawing Sheets

(51) Int. Cl.
*B60L 58/19* (2019.01)
*H01M 10/42* (2006.01)
*H01M 10/44* (2006.01)
*H01M 50/296* (2021.01)
*H02J 7/00* (2006.01)

(52) U.S. Cl.
CPC ....... *H01M 10/425* (2013.01); *H01M 10/441* (2013.01); *H01M 50/296* (2021.01); *H02J 7/0013* (2013.01); *H02J 7/0045* (2013.01); *H02J 7/0047* (2013.01); *H02J 7/0063* (2013.01); *B60L 2200/32* (2013.01); *H01M 2010/4271* (2013.01); *H01M 2220/20* (2013.01)

(58) Field of Classification Search
CPC ........ H02J 2310/42; H02J 7/0031; H02J 7/00; B60L 53/16; B60L 53/62; B60L 58/19; B60L 2200/32; H01M 10/425; H01M 10/441; H01M 50/296; H01M 2010/4271; H01M 2220/20; H01M 10/42; H01M 10/44
USPC .......................................................... 307/9.1
See application file for complete search history.

(56) References Cited

U.S. PATENT DOCUMENTS

| | | | |
|---|---|---|---|
| 7,104,856 | B1 | 9/2006 | Krupp et al. |
| 8,043,132 | B1 | 10/2011 | Wyant |
| 8,944,865 | B1 | 2/2015 | Krabacher et al. |
| 10,017,136 | B1 | 7/2018 | Waisanen et al. |
| 10,202,180 | B1 | 2/2019 | Amerling et al. |
| 10,511,121 | B2 | 12/2019 | Milroy et al. |
| 10,710,691 | B2 | 7/2020 | Amerling et al. |
| 11,046,405 | B1 | 6/2021 | Groeschel et al. |
| 11,377,186 | B1 | 7/2022 | Ahlswede et al. |
| 2007/0024219 | A1* | 2/2007 | Aoyagi ............... H02J 7/14 318/801 |
| 2021/0024192 | A1* | 1/2021 | Blomdahl ........... B63H 20/14 |
| 2021/0234402 | A1* | 7/2021 | Sultenfuss ........... G06F 1/263 |
| 2022/0194542 | A1 | 6/2022 | Kirchhoff et al. |
| 2022/0200070 | A1 | 6/2022 | Gonring |
| 2022/0328912 | A1 | 10/2022 | Gonring |
| 2023/0202317 | A1* | 6/2023 | Wiegman ............ B60L 53/16 320/108 |
| 2024/0063643 | A1* | 2/2024 | Loacker ............... H02J 7/0024 |

OTHER PUBLICATIONS

Park et al., "Outboard Motor," U.S. Appl. No. 29/848,875, filed Aug. 5, 2022 (drawings, specification, and claims only).
Johnson et al., "Battery," U.S. Appl. No. 29/855,548, filed Oct. 4, 2022 (drawings, specification, and claims only).
Futuronics, High voltage connector FTP18 Series, admitted prior art, available at https://en.futronics.com.cn/product/106.html.
Futuronics, Multi-core connector-(2+8/2+14) IP67, admitted prior art, available at https://en.futronics.com.cn/product/75.html.
Avertronics, C2 waterproof connector & wire hareness assy', admitted prior art, available at https://avertronics.com/en/product/c2-waterproof-connector-2021-e-1/.
Avertronics, D1 waterproof connector & wire hareness assy'(80A), admitted prior art, available at https://avertronics.com/en/product/d1-waterproof-connector-2021-e-1/.
Unicon, E Vehicles Waterproof Power Connector M23 Push Locking 2 Power 1 Grouding 5 Data, admitted prior art, available at https://www.jniconnector.com/sale-12168416-e-vehicles-waterproof-power-connector-m23-push-locking-2-power-1-grouding-5-data.html.

A&C Solutions, Female Panel Mount Connector—Manual Locking, admitted prior art, available at https://www.higoconnector.com/products/s835am-c-00-hb-0300/L099K#title.
A&C Solutions, Female Panel Mount Connector—Charging & discharging in 1, self-locking, admitted prior art, available at https://www.higoconnector.com/products/s828bm-c-00-gm-0300/0099K#title.
A&C Solutions, Male Angled Plug Connector—Charging & discharging in 1, self-locking, admitted prior art, available at https://www.higoconnector.com/products/s828bg-a-00-cd-1000/v099K#title.
A&C Solutions, Female Panel Mount Connector—Self-locking, admitted prior art, available at https://www.higoconnector.com/products/s526am-c-00-b9-0300/P099K#title.
A&C Solutions, Male Angled Plug Connector, admitted prior art, available at https://www.higoconnector.com/products/z718ag-a-00-gg-1000/Hv99K#title.
A&C Solutions, Male Cable Connector, Self-Locking, Button Release—Self-locking, button release, admitted prior art, available at https://www.higoconnector.com/products/s824bg-a-00-fr-1000/0v99K#title.
A&C Solutions, Female Panel Mount Connector, Self-Locking—Self-locking, button release, admitted prior art, available at https://www.higoconnector.com/products/s824am-c-03-fq-0300/5v99K#title.
Amphenol Sine Systems, AHDP04-24-09PR-SRA, product data sheet, May 8, 2020, available at https://www.amphenol-sine.com/pdf/datasheet/AHDP04-24-09PR-SRA.pdf.
Amphenol Sine Systems, AHDP06-24-09PR-SRA, product data sheet, May 12, 2020, available at https://www.amphenol-sine.com/pdf/datasheet/AHDP06-24-09PR-SRA.pdf.
Amphenol Sine Systems, AHDP06-24-09SR-SRA, product data sheet, May 12, 2020, available at https://www.amphenol-sine.com/pdf/datasheet/AHDP06-24-09SR-SRA.pdf.
Amphenol Sine Systems, AHDP04-24-09SR-SRA, product data sheet, May 8, 2020, available at https://www.amphenol-sine.com/pdf/datasheet/AHDP04-24-09SR-SRA.pdf.
Amphenol Sine Systems, AHDP02-24-07PN-WTACL22, product data sheet, Sep. 1, 2020, available at https://www.amphenol-sine.com/pdf/datasheet/AHDP02-24-07PN-WTACL22.pdf.
Amphenol Sine Systems, AHDP06-24-07SN-SRACL22, product data sheet, May 8, 2020, available at https://www.amphenol-sine.com/pdf/datasheet/AHDP06-24-07SN-SRACL22.pdf.
Amphenol Sine Systems, AHDP04-24-07PN-WTACL22, product data sheet, Jul. 6, 2019, available at https://www.amphenol-sine.com/pdf/datasheet/AHDP04-24-07PN-WTACL22.pdf.
Amphenol Ltw, PWMU-04BFMB-TL7001, admitted prior art, available at https://www.amphenolltw.com/product-Info/Power/Power.PWMU/PWMU-04BFMB-TL7001.html.
Amphenol Ltw, PWMU-04RMFS-TS7001, admitted prior art, available at https://www.amphenolltw.com/product-Info/Power/Power.PWMU/PWMU-04RMFS-TS7001.html.
Epropulsion, EPropulsion Spirit 1.0 Plus 3HP Electric Outboard Motor, admitted prior art, available at https://tbnation.net/products/epropulsion-spirit-1-0-plus-3hp-electric-outboard-motor?variant=39585207648391&currency=USD&utm_medium=cpc&utm_source=google&gclid=CjwKCAjwwL6aBhBIEiwADycBIDOC4V7czgl1ST5foKhCsF37-KCbgqHSKNiuvW1sn1oeKx5EfOjQQhoC6RkQAvD_BwE.
Epropulsion, Epropulsion Navy Evo 6.0 LongShaft, admitted prior art, available at https://liquidsurfandsail.com/epropulsion-navy-evo-6-0-longshaft/?sku=NE-6000-L0&utm_source=google&utm_medium=cpc&adpos=&scid=scplpNE-6000-L0&sc_intid=NE-6000-L0&gclid=CjwKCAjwwL6aBhBIEiwADycBIP5gTVPPII1YYGbLWTypeM9Maysj1l3Wu9pUQ2i4HJmecrKz-WzRFhoCQ1EQAvD_BwE.
Fergus et al., U.S. Appl. No. 17/487,116, filed Sep. 28, 2021, "Outboard Motor That Is Removable From Transom Clamp Bracket" (specification, claims, and drawings only).
Schrank et al., U.S. Appl. No. 17/509,739, filed Oct. 25, 2021, "Integrated Copilot And Locking Mechanism For Marine Drives" (specification, claims, and drawings only).

(56) References Cited

OTHER PUBLICATIONS

Nickols et al., U.S. Appl. No. 17/884,355, filed Aug. 9, 2022, "Transom Bracket Assemblies For Supporting A Marine Drive On A Vessel" (specification, claims, and drawings only).
Kalnins et al., U.S. Appl. No. 17/695,200, filed Mar. 15, 2022, "Electric Marine Propulsion System And Control Method" (specification, claims, and drawings only).
Park et al., U.S. Appl. No. 29/848,875, filed Aug. 5, 2022, "Outboard Motor" (specification, claim, and drawings only).
Johnson et al., U.S. Appl. No. 29/855,548, filed Oct. 4, 2022, "Battery" (specification, claims, and drawings only).
Fletcher, U.S. Appl. No. 17/939,474, filed Sep. 7, 2022, "Marine Drives And Apparatuses For Steering Marine Drives And For Routing Flexible Rigging Connectors On Marine Drives" (specification, claims, and drawings only).
McEathron et al., U.S. Appl. No. 17/972,691, filed Oct. 25, 2022, "Marine Drives and Apparatuses for Steering Marine Drives and for Routing Flexible Rigging Connectors on Marine Drives" (specification, claims, and drawings only).
Amphenol Sine Systems, AHDP04-24-08PN-M1WTA, product data sheet, Sep. 22, 2021.
Amphenol Sine Systems, AHDP06-24-08SN-M1WTA, product data sheet, Sep. 22, 2021.
Amphenol Sine Systems, AHDP02-24-08PN-M1SRA, product data sheet, Sep. 22, 2021.

* cited by examiner

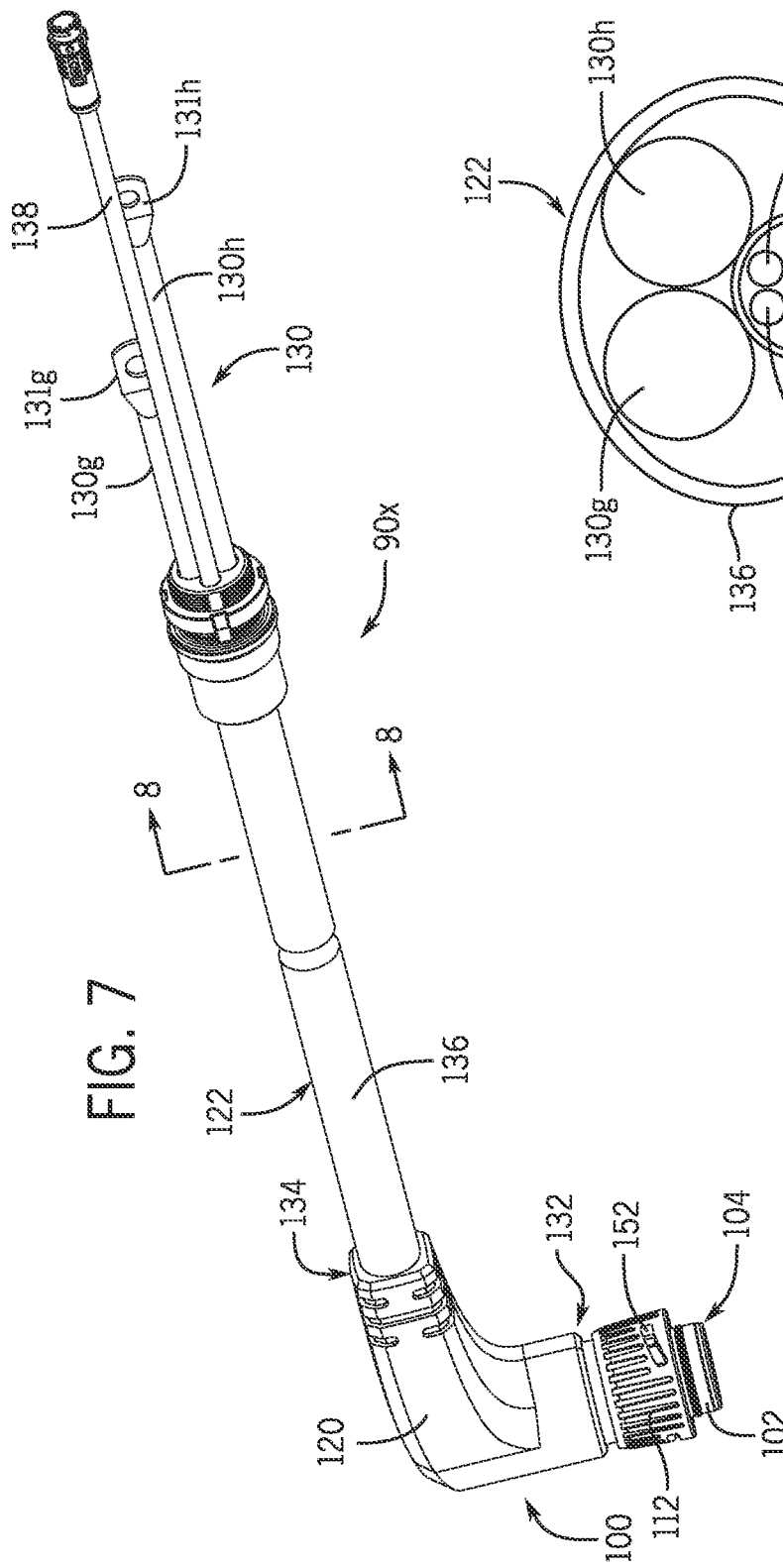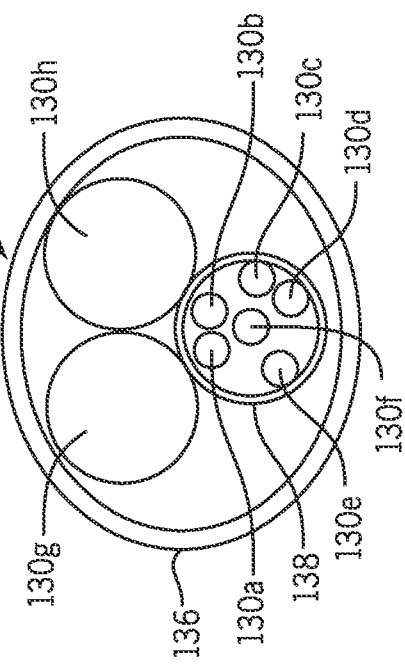

MULTIPORT BATTERY

FIELD

The present disclosure generally relates to rechargeable batteries, such as to marine batteries for electric marine propulsion systems having electric motors and methods for controlling power modes.

BACKGROUND

The following U.S. patents and applications provide background information and are each incorporated herein by reference in entirety.

U.S. Pat. No. 6,507,164 discloses a trolling motor having current-based power management including: an electric motor; a motor controller having an output for providing voltage to the motor; and a current sensor for measuring the electrical current flowing through the motor. Upon determining that the trolling motor has been operating above its continuous duty limit for a predetermined period of time, the motor controller begins reducing the voltage output to the motor until reaching an acceptable output voltage. In another embodiment, the controller is operated in three distinct modes with three distinct sets of operating parameters, namely: a normal mode wherein the output is set to a commanded level; a current limit mode wherein the output is set to a safe, predetermined level; and a transitional mode wherein the output is incrementally changed from the predetermined level to the commanded level.

U.S. Pat. No. 6,902,446 discloses a DC motor having a motor housing and a motor controller housed within the motor housing. In a preferred embodiment the heat-producing components of the motor controller are in thermal communication with the housing such that the majority of the heat produced by such components will be readily conducted to the environment in which the motor is operating. When incorporated into a trolling motor, the motor housing of the present invention will be submerged so that controller-produced heat will be dissipated into the water in which the trolling motor is operated.

U.S. Pat. No. 11,377,186 discloses an apparatus for operably connecting a marine drive to a marine vessel. A transom bracket is configured for fixed attachment to the marine vessel and for attachment to the marine drive such that the marine drive is trimmable up and down relative to the marine vessel about a trim axis. The transom bracket has a sidewall with a rigging opening through which at least one elongated rigging member extends for operably connecting the marine drive to the marine vessel, wherein the rigging opening is located along the trim axis. The rigging device has an elbow conduit with an inlet end and an outlet end, wherein the outlet end is positionable into a plurality of clock positions relative to the inlet end.

U.S. Publication No. 2022/0194542 discloses a method of controlling an electric marine propulsion system configured to propel a marine vessel including measuring at least one parameter of an electric motor in the electric marine propulsion system and determining that the parameter measurement indicates an abnormality in the electric marine propulsion system. A reduced operation limit is then determined based on the at least one parameter measurement, wherein the reduced operation limit includes at least one of a torque limit, an RPM limit, a current limit, and a power limit. The electric motor is then controlled such that the reduced operation limit is not exceeded.

U.S. Publication No. 2022/0328912 discloses a marine battery system configured to provide energy to a marine vessel load. The marine battery system includes a main enclosure body and an auxiliary enclosure body that is detachably coupled to the main enclosure body to define a sealed battery volume. The auxiliary enclosure body is configured to perform a pressure accommodation action responsive to an increase in a temperature within the sealed battery volume. The marine battery system further includes a battery disposed within the sealed battery volume.

U.S. Publication No. 2022/0200070 discloses a marine battery system configured to provide energy to a marine vehicle load is provided. The marine battery system includes a battery, an enclosure configured to at least partially encapsulate the battery, a temperature sensor configured to detect temperature information within the enclosure, a pressure sensor configured to detect pressure information within the enclosure, and a controller coupled to the temperature sensor and the pressure sensor. The controller is configured to receive the temperature information from the temperature sensor, receive the pressure information from the pressure sensor, determine whether an enclosure breach condition has occurred based on a comparison of the temperature information and the pressure information, and in response to a determination that the enclosure breach condition has occurred, perform an enclosure breach mitigation action.

U.S. patent application Ser. No. 17/487,116, filed Sep. 28, 2021, discloses an outboard motor having a transom clamp bracket configured to be supported on a transom of a marine vessel and a swivel bracket configured to be supported by the transom clamp bracket. A propulsion unit is supported by the swivel bracket, the propulsion unit comprising a head unit, a midsection below the head unit, and a lower unit below the midsection. The head unit, midsection, and lower unit are generally vertically aligned with one another when the outboard motor is in a neutral tilt/trim position. The propulsion unit is detachable from the transom clamp bracket.

U.S. patent application Ser. No. 17/509,739, filed Oct. 25, 2021, discloses an apparatus for removably supporting a marine drive on a marine vessel. The apparatus has a transom bracket assembly for mounting to the marine vessel, a steering bracket for coupling the marine drive to the transom bracket assembly so the marine drive is steerable relative to the transom bracket assembly and the marine vessel; and an integrated copilot and locking mechanism configured to retain the steering bracket in a plurality of steering orientations. The mechanism is further configured to lock and alternately unlock the steering bracket relative to the transom bracket assembly such that in a locked position the marine drive is retained on the transom bracket assembly and such that in an unlocked position the marine drive is removable from the transom bracket assembly.

U.S. patent application Ser. No. 17/884,355, filed Aug. 9, 2022, discloses a transom bracket assembly for supporting a marine drive on a marine vessel. The assembly comprises a transom bracket comprising a swivel cylinder, a steering arm extending from the marine drive, a swivel tube having a first end coupled to the steering arm and a second end seated in the swivel cylinder so that steering of the steering arm relative to the transom bracket rotates the swivel tube in the swivel cylinder about a steering axis for the marine drive, and a yoke which couples the second end of the swivel tube to the marine drive.

U.S. patent application Ser. No. 17/695,200, filed Mar. 15, 2022, discloses an electric marine propulsion system configured to propel a marine vessel includes a power storage system comprising a plurality of batteries and at least one electric motor powered by the power storage system and configured to rotate a propulsor to propel the marine vessel. A control system is configured to identify a charge level for each of the plurality of batteries and determine which of the plurality of batteries are active batteries based at least in part on the charge level on each of the plurality of batteries. A minimum power limit is then identified for the active batteries and a system power limit is determined based on the minimum power limit and the number of active batteries. The at least one electric motor is then controlled based on the system power limit such that the system power limit is not exceeded.

U.S. patent application Ser. No. 29/848,875, filed on Aug. 5, 2022, discloses an ornamental design for an outboard motor.

U.S. patent application Ser. No. 29/855,548, filed on Oct. 4, 2022, discloses an ornamental design for a battery.

U.S. patent application Ser. No. 17/939,474, filed Sep. 7, 2022, discloses a marine drive including a frame configured to support the marine drive with respect to the marine vessel, a cowling enclosing a portion of the frame in a cowling interior, a steering arm configured such that movement of the steering arm causes rotation of the marine drive with respect to the steering axis, and a flexible rigging connector extending from the cowling interior to a location in the marine vessel. The flexible rigging connector may extend through a guide passage in the steering arm. Additionally or alternatively, the steering arm may include a base member and a mounting member selectively movable relative to the base member to adjust the length of the steering arm.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect, a battery includes at least one battery cell, a bidirectional port configured to provide current output to a load from the at least one battery cell and to receive a charge current from a battery charger to charge the at least one battery cell, a charge only port configured to receive charge current from the battery charger to charge the at least one battery cell, and a battery control system. The battery control system is configured to detect a connection status of the bidirectional port and/or the charge only port and, based on the connection status of each port, to control the battery between a power delivery mode where current can flow from the at least one battery cell out of the bidirectional port, a charge mode where current can from the bidirectional port or the charge only port to the at least one battery cell, and a disconnected mode where current cannot flow between the bidirectional port or the charge only port and the at least one battery cell.

In one embodiment, the battery control system is configured to enable the power delivery mode only if the connection status of the bidirectional port is connected and the connection status of the charge only port is disconnected, and to enable the charge mode only if the connection status of only one of the bidirectional port and the charge only port is connected.

In another embodiment, the battery control system is further configured to enable the disconnected mode if the connection status of the bidirectional port is disconnected and the connection status of the charge only port is disconnected or if the connection status of the bidirectional port is connected and the connection status of the charge only port is connected.

In another embodiment, the battery includes a plurality of switches controlled by the battery control system and positioned between the bidirectional port, the charge only port, and the at least one battery cell, wherein controlling the battery between the power delivery mode, the charge mode, and the disconnected mode includes separately controlling each of the plurality of switches.

In another embodiment, the battery control system is configured to detect the connection status of the bidirectional port and the charge only port based on at least one of a resistance measurement across sockets in each of the of the bidirectional port and the charge only port and a voltage measurement across sockets in each of the of the bidirectional port and the charge only port.

In one aspect, a rechargeable battery system includes a plurality of batteries each having at least one battery cell, a bidirectional port configured to provide current output to a load from the at least one battery cell and to receive a charge current from a battery charger to charge the at least one battery cell in the battery, a charge only port configured to receive charge current from the battery charger to charge the at least one battery cell, a battery control system, and a switch box configured to connect the plurality of batteries in parallel to a load and provide for simultaneous charging of all of the plurality of batteries. The battery control system is configured to detect a connection status of the bidirectional port and/or the charge only port and, based on the connection status of each port, to control the battery between a power delivery mode where current can flow from the at least one battery cell out of the bidirectional port, a charge mode where current can from the bidirectional port or the charge only port to the at least one battery cell, and a disconnected mode where current cannot flow between the bidirectional port or the charge only port and the at least one battery cell.

In one embodiment, each of the plurality of batteries is configured to receive a charge current through the bidirectional port from a battery charger connected through the switch box.

In one embodiment, each of the plurality of batteries is configured to receive a charge current through the charge only port from a battery charger connected directly to the charge only port.

In one embodiment, each of the plurality of batteries is configured to permit receipt of the charge current through only one of the bidirectional port or the charge only port at a time.

In one aspect, a method of controlling charging of a battery is provided, wherein the battery includes at least one battery cell, a bidirectional port, and a charge only port. The method includes detecting a connection status of the bidirectional port and/or the charge only port, and based on the connection status of each port, controlling the battery between a power delivery mode where current can flow from the at least one battery cell out of the bidirectional port, a charge mode where current can from the bidirectional port or the charge only port to the at least one battery cell, and a disconnected mode where current cannot flow between the bidirectional port or the charge only port and the at least one battery cell.

In one embodiment, detecting the connection status of the bidirectional port and the charge only port includes measuring at least one of a resistance across sockets in each of the of the bidirectional port and the charge only port and a voltage across sockets in each of the of the bidirectional port and the charge only port and determining the connection status of each of the of the bidirectional port and the charge only port based on the resistance and/or the voltage measured therein.

In another embodiment, the method includes determining a connected indicator for the bidirectional port based on the voltage at the bidirectional port indicating whether a connector is or is not connected to the bidirectional port, and determining a permitted load indicator for the bidirectional port based on the resistance at the bidirectional port indicating whether a permitted load is or is not connected to the bidirectional port or determining a permitted charger indicator for the bidirectional port based on the resistance at the bidirectional port indicating whether a permitted charger is or is not connected to the bidirectional port, wherein the connection status of the bidirectional port is based on the connected indicator and the permitted load indicator for the bidirectional port.

In another embodiment, the method includes determining a connected indicator for the charge only port based on the voltage at the charge only port whether a connector is or is not connected to the charge only port, and determining a permitted charger indicator for the charge only port based on the resistance at the charge only port whether the permitted charger is or is not connected to the charge only port, wherein the connection status of the charge only port is based on the connected indicator and the permitted charger indicator for the charge only port.

In another embodiment, the battery comprises a plurality of switches positioned between the bidirectional port, the charge only port, and the at least one battery cell, and wherein controlling the battery between the power delivery mode, the charge mode, and the disconnected mode includes separately controlling the plurality of switches.

Various other features, objects, and advantages of the invention will be made apparent from the following description taken together with the drawings.

BRIEF DESCRIPTION OF THE DRAWINGS

The present disclosure is described with reference to the following Figures.

FIG. 7 illustrates the first connector coupled to a cable.

FIG. 8 is a cross section of the cable taken along the line 8-8 in FIG. 7.

DETAILED DESCRIPTION

Figure 1:
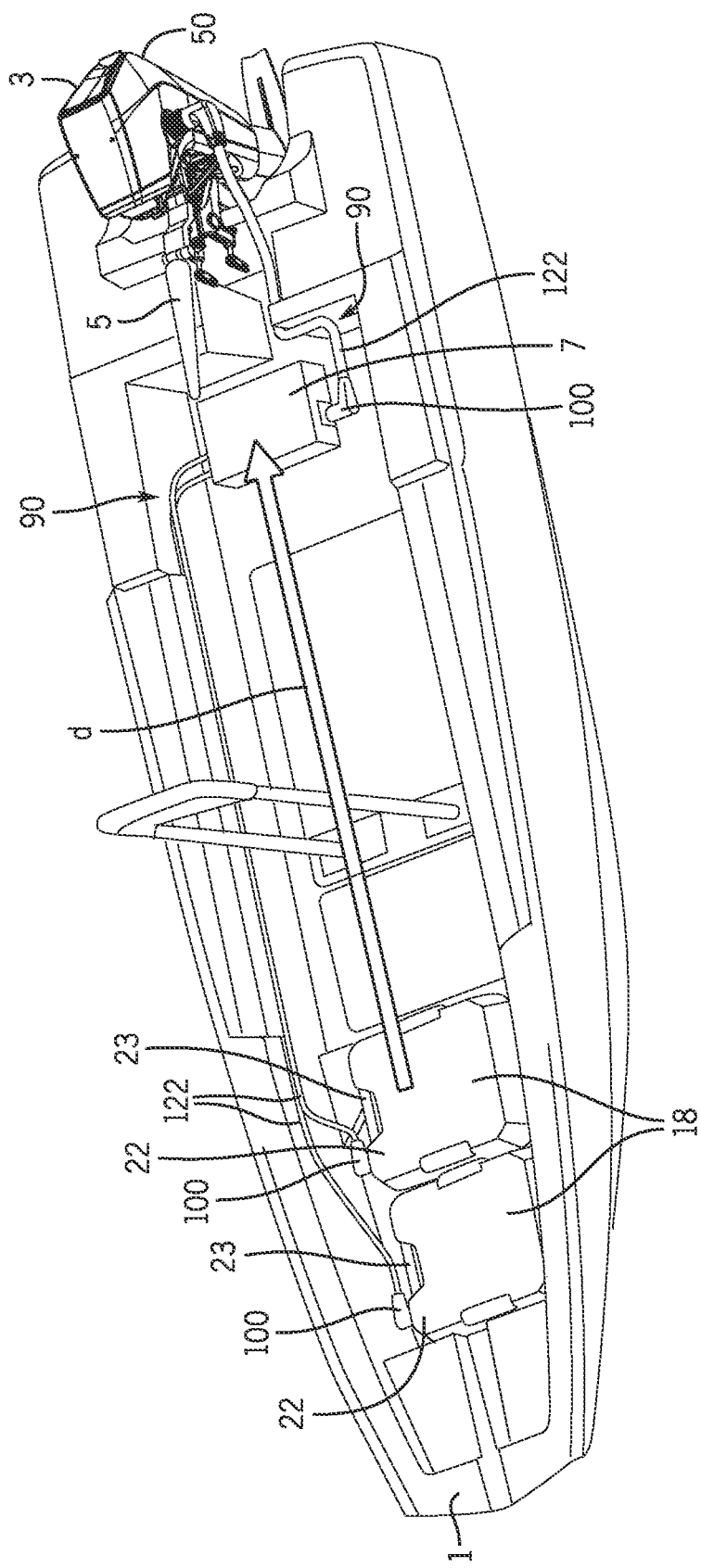
FIG. 1 illustrates a marine vessel having an electric marine propulsion system according to the present disclosure, in which an electric marine drive is controlled by a tiller.

The inventors have further recognized a need for a power control system that enables central charging and discharging of marine batteries connected in parallel within the system, and for the marine batteries to each detect connection of a load or a battery charger at a remote location, such as connection of a power-consuming device (e.g., a marine drive) or battery charger to a central switch box configured to provide multi-battery power distribution. In view of the forgoing, the inventors further developed the disclosed system comprising a switch box configured to connect a plurality of batteries in parallel to a load or to a battery charger. In examples described herein, the load is an electric marine drive having an electric motor powerhead. However, in other embodiments the load may be any electric-powered device.

The inventors have further recognized a need for a battery having two ports that enable charging of the battery—one high current port that enables bidirectional current flow and one lower current port that only permits inward flow of current to charge the battery. The bidirectional port permits flow of current from the battery to a load and permits flow of charging current from a battery charger to the battery cell pack. The charge only port is configured for lower current flow and only permits inflow of charge current from a battery charger to charge the cells of the battery and does not permit current to flow in the opposite direction out of the charge only port. The disclosed system is configured to connect each battery to a load, such as the marine drive, via the bidirectional port of each battery. Where multiple batteries are utilized, a switch box connects the drives in parallel with a connection cable connecting between the bidirectional port on each battery to a respective port on the switch box.

However, the inventors have recognized that only allowing charging via the bidirectional port is undesirable because it requires use of a large and specialized data and power connector that is configured for high current flow. Charging the battery requires a lower maximum current than the maximum amount of discharge current required for powering a large load (such as a marine drive) because typical battery charging is a slower process that occurs over several hours and conditions the battery. The inventors recognized that requiring charging through the bidirectional port via the specialized connector (e.g., connector 100) significantly increases the cost of the charging system. Thus, the inventors devised the disclosed battery and system having a charge only port configured to accept a smaller connector, e.g., having a standardized shape, thereby reducing the cost of the charging system. Each battery is configured to receive and detect connection of a permitted battery charger to the bidirectional port, either directly or through the switch box, and also to receive and detect connection of a permitted battery charger directly to the batteries' charge only port. The battery mode is then controlled accordingly between a power delivery mode, a charge mode, and a disconnected mode based on the detected connection.

Figure 2:
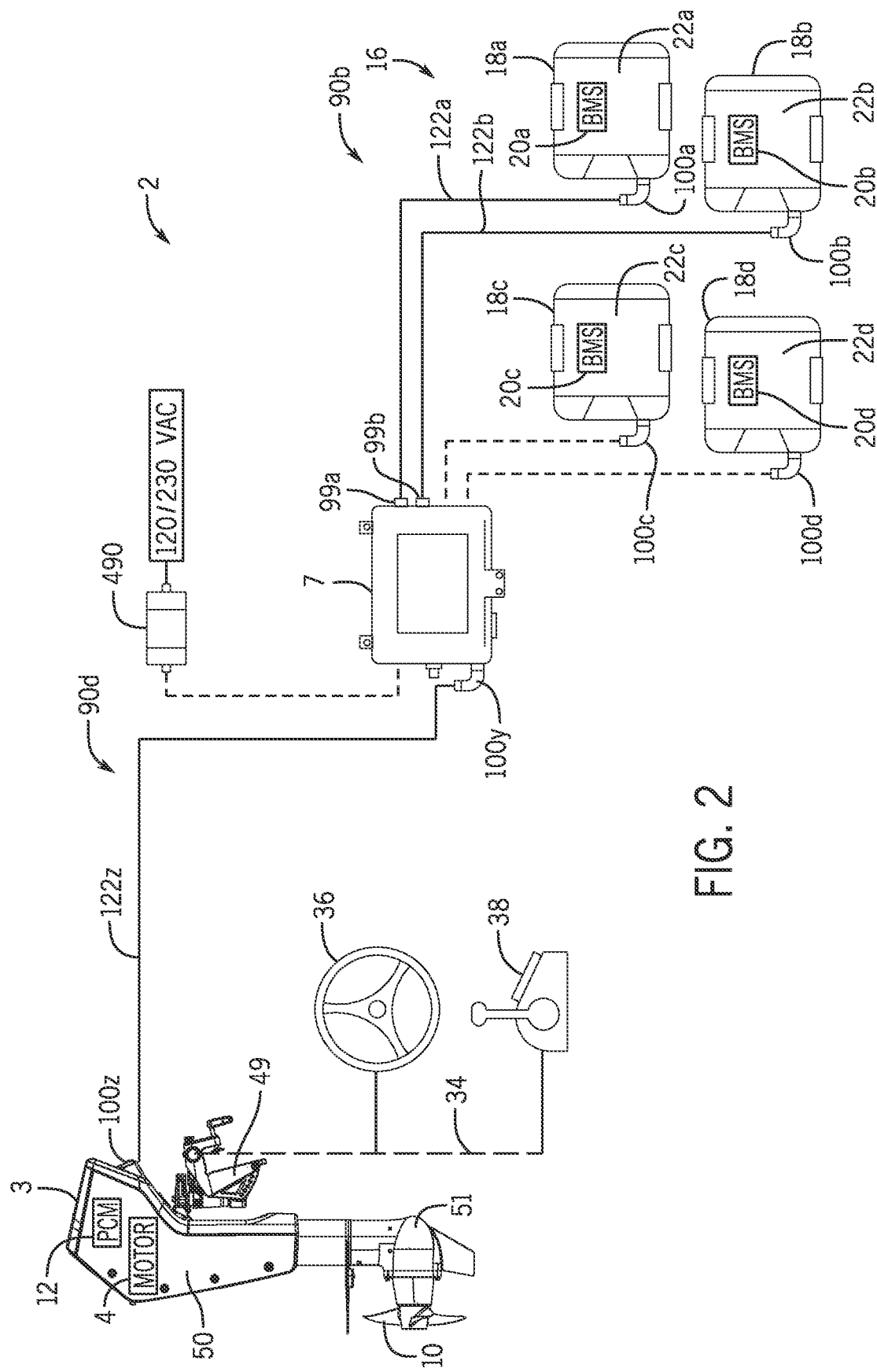
FIG. 2 is a schematic representation of another electric marine propulsion system according to the present disclosure, in which an electric marine drive is controlled at a helm.
Figure 3:
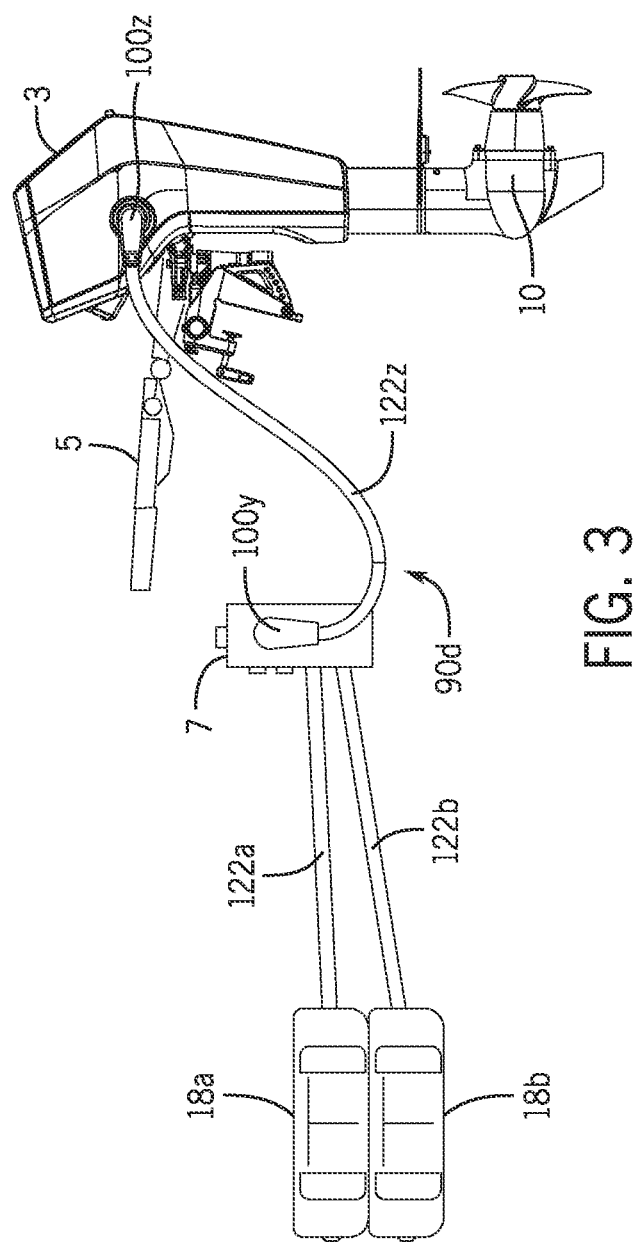
FIG. 3 illustrates an electric marine propulsion system like that of FIG. 1, in which an electric marine drive is connected to a pair of batteries by way of a switch box.
Figure 4:
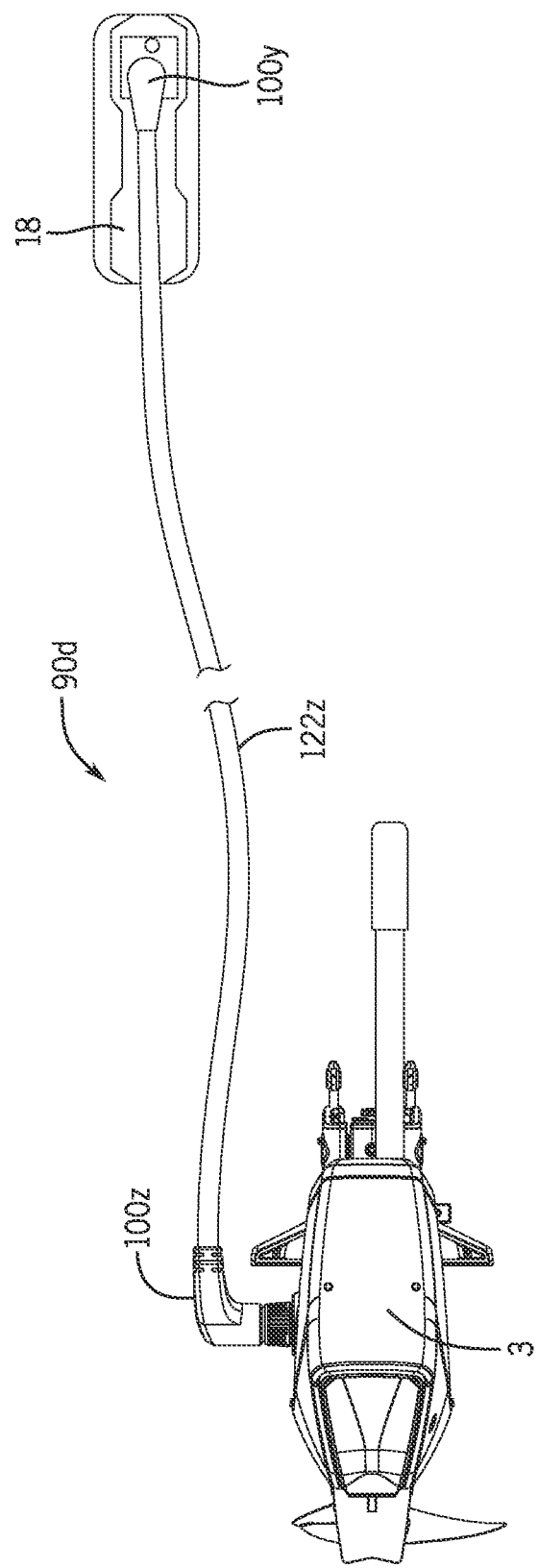
FIG. 4 illustrates yet another electric marine propulsion system according to the present disclosure, in which an electric marine drive is connected to a battery with no intervening switch box.

FIGS. 1 through 4 exemplify electric marine propulsion systems 2 in accordance with the present disclosure. Each electric marine propulsion system 2 includes an electric marine drive 3 powered by one marine battery 18 or a plurality of marine batteries 18 connected in parallel through a switch box 7. The switch box 7 enables multi-battery power distribution, as well as other safety, power control, and charging features. Any number of batteries 18 can be connected to the switch box 7 between one and the maximum number of ports on the switch box 7, which in various embodiments may be four, six, or more ports. The switch box 7 enables connection and disconnection of a plurality of marine batteries (e.g., 18a-d), including the addition or disconnection of a subset of marine batteries 18a-d without disrupting operation of the marine drive 3. The system 2 is also configured to enable direct connection of the electric marine drive 3 and a single battery 18, as shown in FIG. 4, eliminating the switch box 7 where only one battery 18 is used.

FIG. 1 depicts an exemplary embodiment of the disclosed electric marine propulsion system 2 on a marine vessel 1, which electric marine propulsion system 2 is modular and configured for quick and easy installation on a small marine vessel 1. Each marine battery 18 and the switch box 7 may be portable and configured to be easily transported on and off the marine vessel 1. Each marine battery 18 is separately housed in a marine-safe housing adapted for operation in a marine environment, including for preventing water ingress. For example, each battery housing 22 may have a handle 23 that enables easy carrying on and off the marine vessel 1. The switch box 7 is also contained in a marine-safe housing that is sealed against water ingress (see FIG. 27) and likewise may have a handle configured for easy carrying on and off the marine vessel 1.

The switch box 7 removably connects to each of the batteries 18 in parallel via connection cables 90 that each include a cable 122 with a connector 99, 100 (see FIG. 2) on each end. A connection cable 90 also connects the electric marine drive 3 to the switch box 7. Each connector 99, 100 connects to a port on the switch box 7, the battery 18, or the electric marine drive 3 to provide an all-in-one power, data, and interlock connection between the switch box 7 and each of the batteries 18 and between the switch box 7 and the electric marine drive 3. The connectors 99, 100 are twist-to-lock connectors that are easily connected and disconnected from the batteries 18, switch box 7, and electric marine drive 3 so that the system 2 is easily assembled and disassembled. Connection between the electric marine drive 3, the switch box 7, and the batteries 18 via the connection cables 90 is all that is required to install the electrical and data aspects of the electric marine propulsion system 2 on a vessel. Thus, in addition to mounting the electric marine drive 3, installing the electric marine propulsion system 2 only requires plugging in a few connectors 99, 100. The electric marine drive 3 may be connected to the marine vessel 1 via a detachable transom bracket 49, such as those shown and described in U.S. patent application Ser. Nos. 17/487,116; 17/509,739; 17/884,335, incorporated by reference herein.

In some embodiments, the connection cable 90 comprises identical elbow connectors 100 on each end of the cable 122 and identical ports are provided on each of the battery 18, switch box 7, and/or on the electric marine drive 3, such that the connection cables 90 between the various devices are reversible (direction agnostic) and interchangeable. This maximizes flexibility and modularity of the system 2, in that the same connection cable 90 can be used to connect any two devices—i.e., between the battery 18 and the switch box 7, between the switch box 7 and the electric marine drive 3, or between the battery 18 and the electric marine drive 3.

The connection cables 90 may be available in various sizes so that a user can customize the system 2 based on their needs and the size constraints of a particular marine vessel. This enables placement of the switch box 7 and each of the one or more batteries 18 at whatever location is convenient. In the example illustrated in FIG. 1, the batteries 18 are placed toward the bow of the marine vessel 1 and the switch box 7 is located toward the stern near the electric marine drive 3. The batteries 18 are mounted at distance d from the switch box 7, which may be 6 to 7 feet or further. Here, a first battery is closer to the switch box 7 than the second battery. Each of the connection cables 90 may be appropriately sized to enable such connection without excess cable length that takes up space, gets caught or tangled. The connection cable 90 between the switch box 7 and the electric marine drive 3 is also appropriately sized, being shorter since it spans a shorter distance. In other vessels, a different location arrangement of the switch box 7 and/or the batteries 18 may be preferable, such as locating the elements in the middle or towards the sides of the marine vessel, and the system 2 is configured to enable any such arrangement.

The systems 2 illustrated in FIGS. 1-4 include an outboard electric marine drive 3 having an electric motor 4 powerhead housed therein, such as housed within the cowling 50 of the outboard electric marine drive 3 or in the torpedo housing 51 or other location near the propeller 10. Although the propulsion systems 2 illustrated in the figures comprise an electric marine drive 3 being an outboard, a person of ordinary skill in the art will understand in view of the present disclosure that embodiments of the electric marine propulsion system 2 may include other types of electric marine drives 3, such as inboard drives or stern drives. The electric motor 4 powerhead is operably connected to and configured to rotate the propeller 10. As will be known to the ordinary skilled person in the relevant art, the propeller 10 may include one or more propellers, impellers, or other propulsor devices and the term "propeller" may be used to refer to all such devices. In certain embodiments, the electric motor 4 includes a rotor and a stator in a known configuration. The electric motor 4 may be, for example, a brushless electric motor, such as a brushless DC motor. In other embodiments, the electric motor may be a DC brushed motor, an AC brushless motor, a direct drive, a permanent magnet synchronous motor, an induction motor, or any other device that converts electric power to rotational motion. The motor 4 provides sufficiently high output to propel the marine vessel 1, such as such as up to 250 amps-350 amps at of voltage less than or equal to 60 Vdc.

The electric marine drive 3 is powered by the scalable power storage system 16 that includes one battery 18 or a plurality of batteries 18 connected in parallel. For example, each battery 18 may be a nominal 36 volt or 48 volt battery, or any battery with a maximum operating voltage at or below 60 volts DC. For example, each battery 18 has a maximum operating voltage when fully charged that does not exceed 60 volts, such as 58 volts. The inventors recognized that providing a system configured for operation in the 50 to 60 volt range has advantages of enabling sufficient output, such as powering motors in the 3-5 horsepower range, while also providing a system at voltage levels that are safe and easy for novice users to manage. Each battery 18 is rechargeable, such as by connection to a battery charger 490 when the electric motor 4 is not in use. Various battery devices and systems are known in the relevant art. For example, the power storage system 16 may include one or a plurality of lithium-ion (LI) batteries 18, each LI battery 18 comprised of multiple battery cells. In other embodiments, each battery 18 may be a lead-acid battery, fuel cell, flow battery, ultracapacitor, and/or other devices capable of storing and outputting electric energy.

Referring particularly to FIG. 2, the switch box 7 is configured to accommodate up to four batteries 18a-18d. Batteries may be connected or disconnected from switch box 7 without interrupting the power connection of the remaining batteries to the electric marine drive 3. This allows a user to add and remove batteries to the system 2 depending on the distance of travel, and to remove low-charge batteries and add fully charged batteries into the system 2 as needed. In FIG. 2, two batteries 18a and 18b are shown connected, and two batteries 18c and 18d are not currently connected but are available to be added to power the electric marine drive 3 as needed.

Each battery 18a-18d is connected to the switch box 7 via a respective connection cable 90b. Each connection cable comprises a cable 122a-122b (only two are shown) having a connector 99, 100 on each end, where one end connects to one battery 18a-18d and the other end connects to a port on the switch box 7. Each connection cable 90 may comprise identical connectors on each end, or the connectors on either end may be different from one another. In the example shown, the connection cables 90b connecting each of the batteries 18a-18d to the switch box 7 comprise a battery-end connector being an elbow connector 100a-100d and a switch box-end connector being a straight connector 99a-99b (only two are shown). The connectors 99, 100 are described in more detail below.

Referring also to FIG. 3, the connection cable 90d connecting the electric marine drive 3 to the switch box 7 has elbow connectors 100y and 100z on each end. In one embodiment, the connectors 100y and 100z on cable 122z are identical, and thus the connection cable 90d can be connected in either orientation. The elbow connectors 100y and 100z may also be identical with elbow connectors 100a-100d, and likewise the ports on each of the electric marine drive 3 and batteries 18 may be identical. Thus, the drive connection cable 90d (and likewise the battery connection cables 90b if they also have two identical elbow connectors 100) can also be utilized to connect the electric marine drive 3 directly to the battery 18.

This arrangement is shown in FIG. 4, where the same drive connection cable 90d is connected to a battery 18. Specifically, elbow connector 100y is moved from the switch box 7 and is connected to the battery 18 instead. This enables a simplified system if only one battery 18 is being used. It also enables easy and direct connection to a battery 18 in a situation where the switch box 7 has a failure.

Each battery 18a-18d may include an associated battery control system 20a-20d. Each battery control system 20a-20d (e.g., battery management system (BMS)), includes one or more controllers configured to monitor and/or control the respective battery, including being configured to monitor parameters measured within the battery housing 22a-22d—such as current, voltage, temperature, pressure, etc.—and determine battery charge level (e.g., battery state of charge and/or battery voltage), battery temperature, battery state of health, etc. Each battery control system 20a-20d may be further configured to determine a power limit for the battery 18a-18d, which is an amount of power that the battery 18a-18d can supply without overheating, over-discharging, or otherwise compromising the battery.

The battery control systems 20a-20d may be configured to communicate those values via a communication link 34 to other control devices in the system 2, including a central controller 12, which in the embodiment shown in FIG. 2 is a propulsion control module (PCM) located in the electric marine drive 3. Other devices, such as steering wheel 36 and throttle lever 38 may also communicate with the central controller 12 via the communication link 34, which may be the same communication means or different. To provide one example, the communication link(s) 34 may be one or more CAN buses, such as operating via a Kingdom Network protocol. As explained in more detail below, the communication link 34 between the batteries 18a-18d and the electric marine drive 3 runs through the connection cables 90 and the switch box 7.

Each battery control system 20a-20d may also be configured to control whether the respective battery 18a-18d is connected to deliver power, and thus is in a power delivery mode, or is inactive and in a disconnected mode in which the battery is disconnected from and not delivering power to the electric marine drive 3. Each battery 18a-18d includes an internal disconnect switch or plurality of switches that internally disconnects the battery cells or other storage elements from the battery output terminals 18+, 18−. Where a battery 18a-18d is in an inactive state, the respective battery control system 20a-20d may be configured to communicate a power limit of zero and/or to communicate an error or disconnected status indicating that the battery 18a-18d is not active or available to provide power.

The electric marine propulsion system 2 is configured to propel the marine vessel 1 in a direction instructed by an operator. In the depicted embodiment, the electric marine drive 3 is an outboard drive steered and controlled by a tiller handle 5, such as one of various tiller arrangements that are well-known in the relevant art. FIG. 2 shows an embodiment including an outboard electric marine drive 3 connected to steering and throttle control devices at the helm, including a steering wheel 36 and a throttle lever 38. Alternatively or additionally, the helm devices may include a joystick, push buttons, a touch screen, or other user input device enabling throttle and/or steering control. Alternatively or additionally, the helm devices may include a computing system and/or a hand-held mobile device, such as a cell phone, communicatively connected to the electric marine drive 3, for example, as part of an onboard management system, such as the VesselView™ and/or VesselView Mobile™ system by Mercury Marine of Fond du Lac, Wisconsin.

A control system of the electric marine propulsion system 2 may include a plurality of control devices configured to cooperate to provide the method of controlling the electric marine propulsion system 2 and the marine batteries 18a-d, including power mode selection. For example, the control system includes a central controller 12, a plurality of battery control systems 20a-20d, and one or more motor controllers, trim controllers, steering controllers, etc. communicatively connected, such as by a communication bus. A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected.

Each controller may comprise a processor and a storage device, or memory, configured to store software and/or data utilized for controlling and or tracking operation of the electric marine propulsion system 2. The memory may include volatile and/or non-volatile systems and may include removable and/or non-removable media implemented in any method or technology for storage of information. The storage media may include non-transitory and/or transitory storage media, including random access memory, read-only memory, or any other medium which can be used to store information and be accessed by an instruction execution system, for example. An input/output (I/O) system provides communication between the control system and peripheral devices.

FIGS. 5-19 show details of the connection cables 90, including the connectors 100 and cables 122. FIGS. 5-19 also show details of connectors 200, 300 that may serve as the ports on the electric marine drive 3, switch box 7, and batteries 18, and how the connectors 100 can be mated with the connectors 200, 300 to connect the various devices in the electric marine propulsion system 2.

Figure 5:
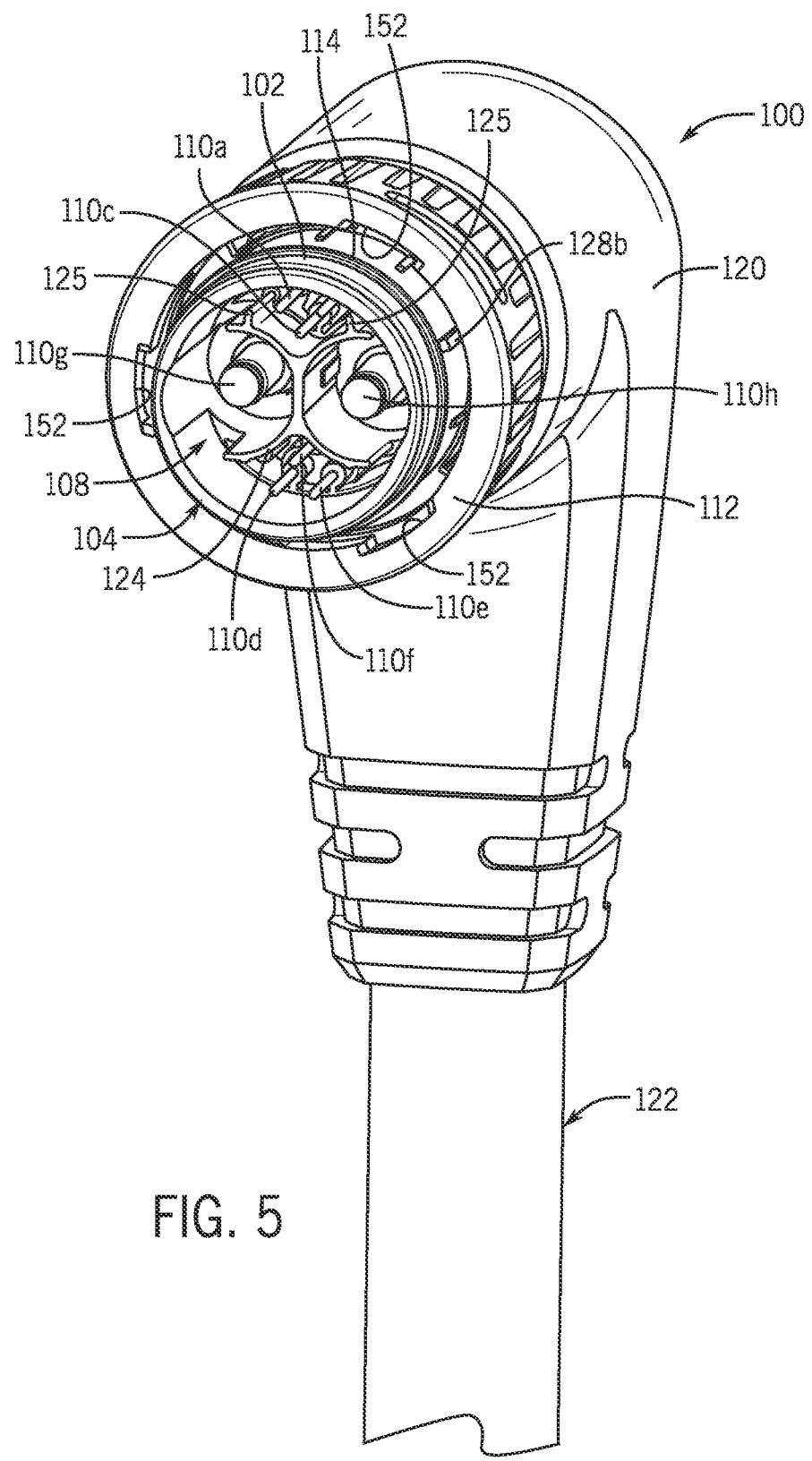
FIG. 5 is a perspective view of a first connector for a marine device of the electric marine propulsion systems of the present disclosure.
Figure 6:
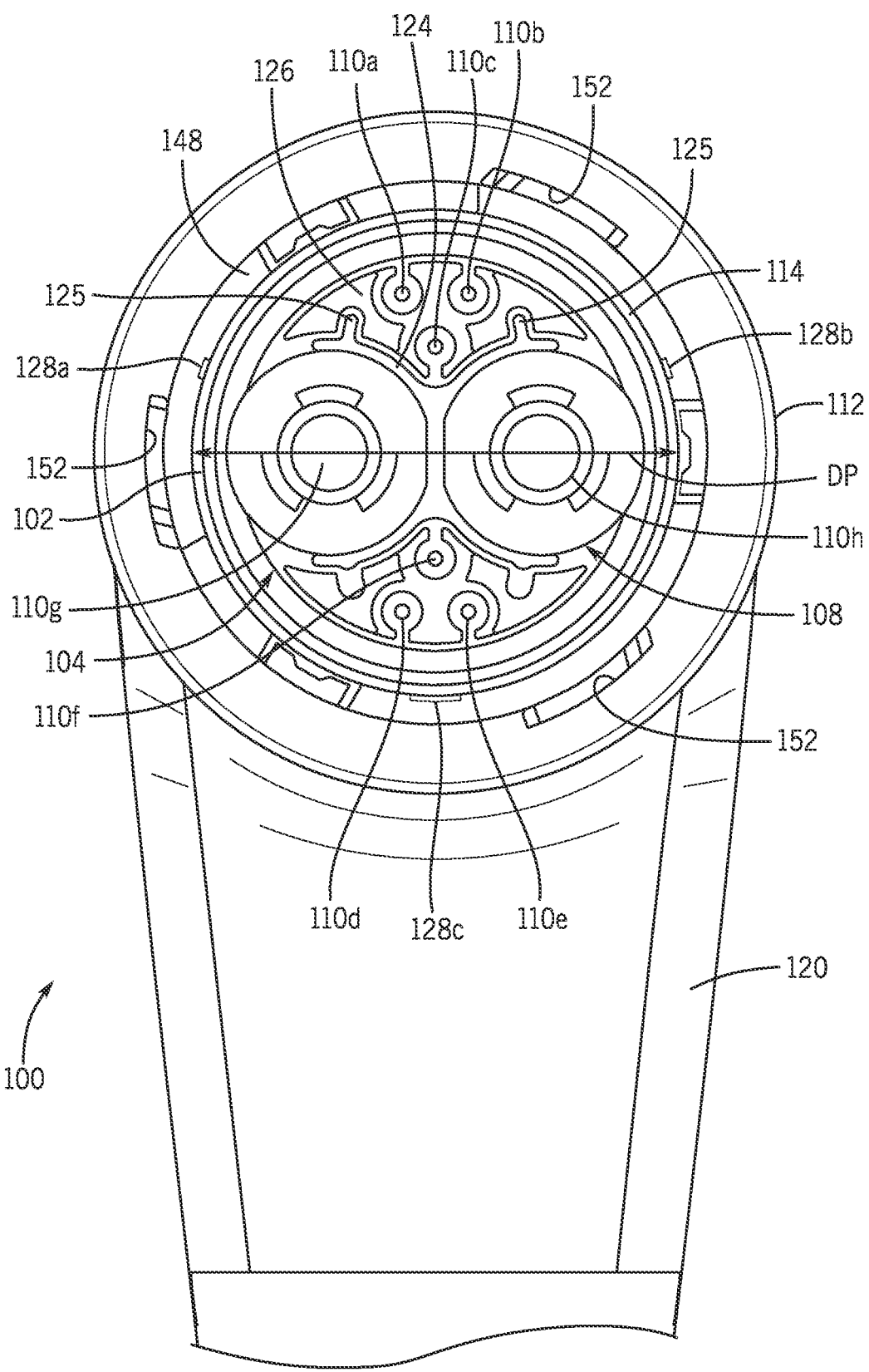
FIG. 6 is a view looking into a housing of the first connector of FIG. 5.
Figure 9:
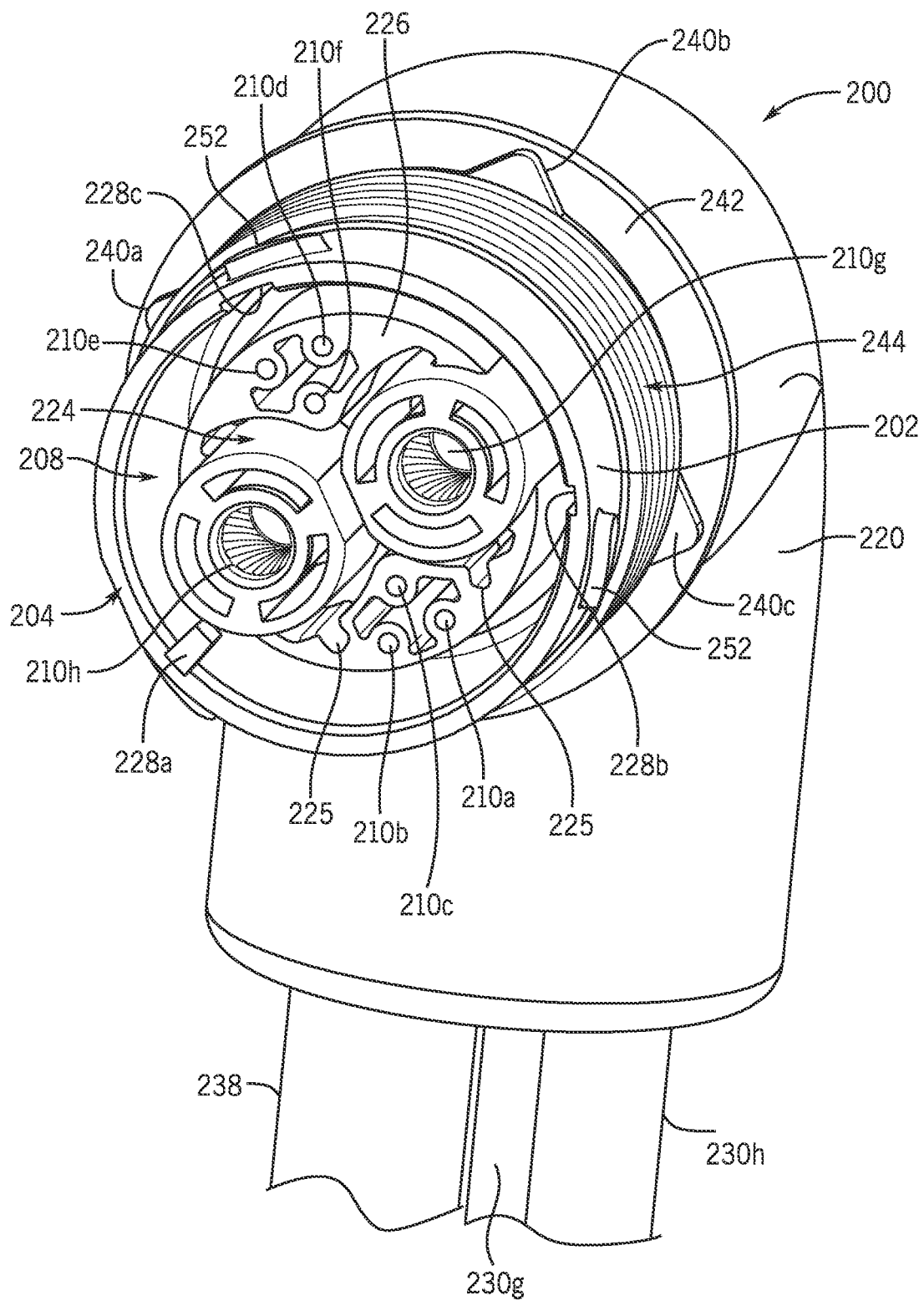
FIG. 9 is a perspective view of a second connector for a marine device of the electric marine propulsion systems of the present disclosure.
Figure 10:
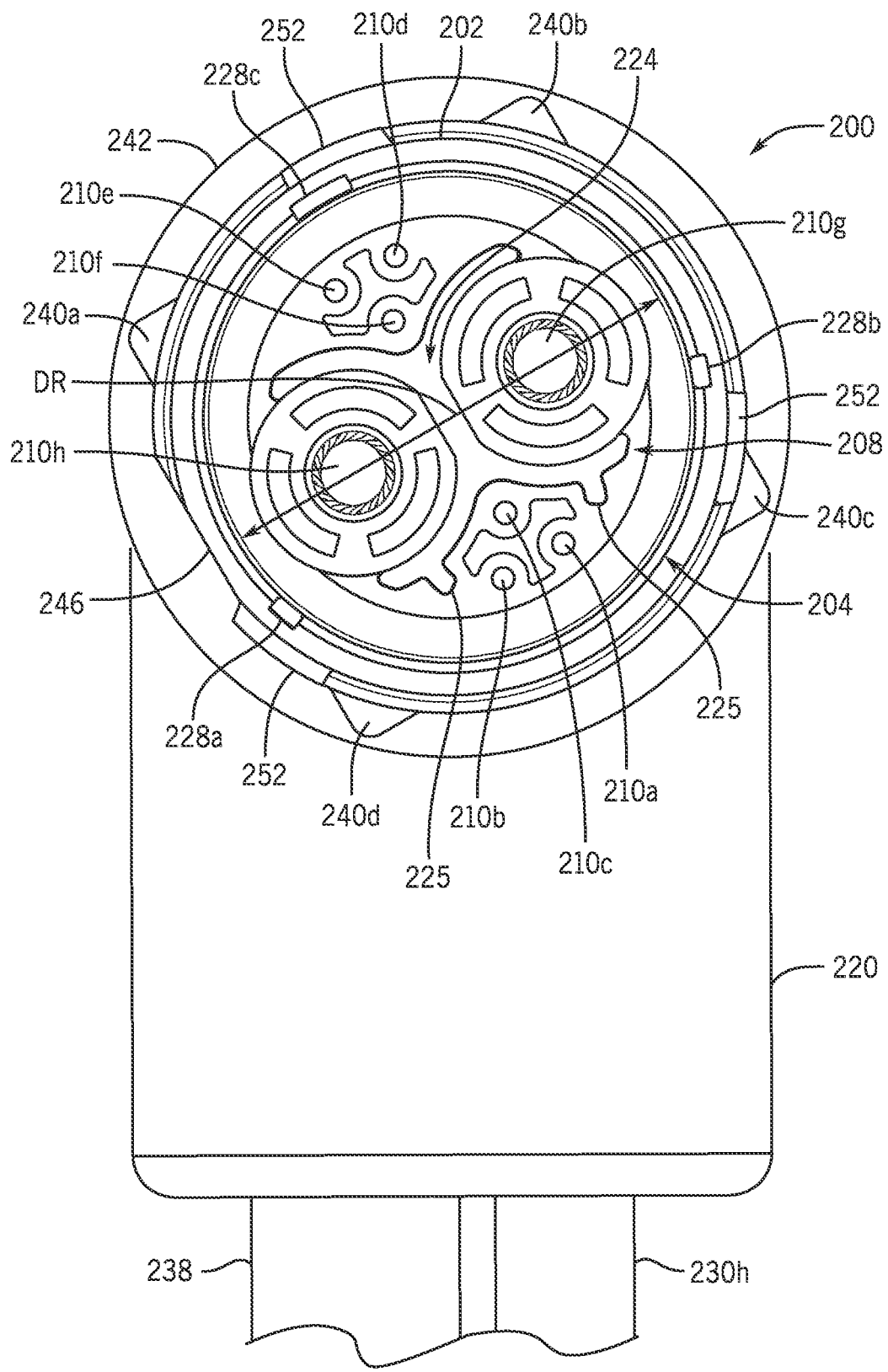
FIG. 10 is a view looking into a housing of the second connector of FIG. 9.
Figure 11:
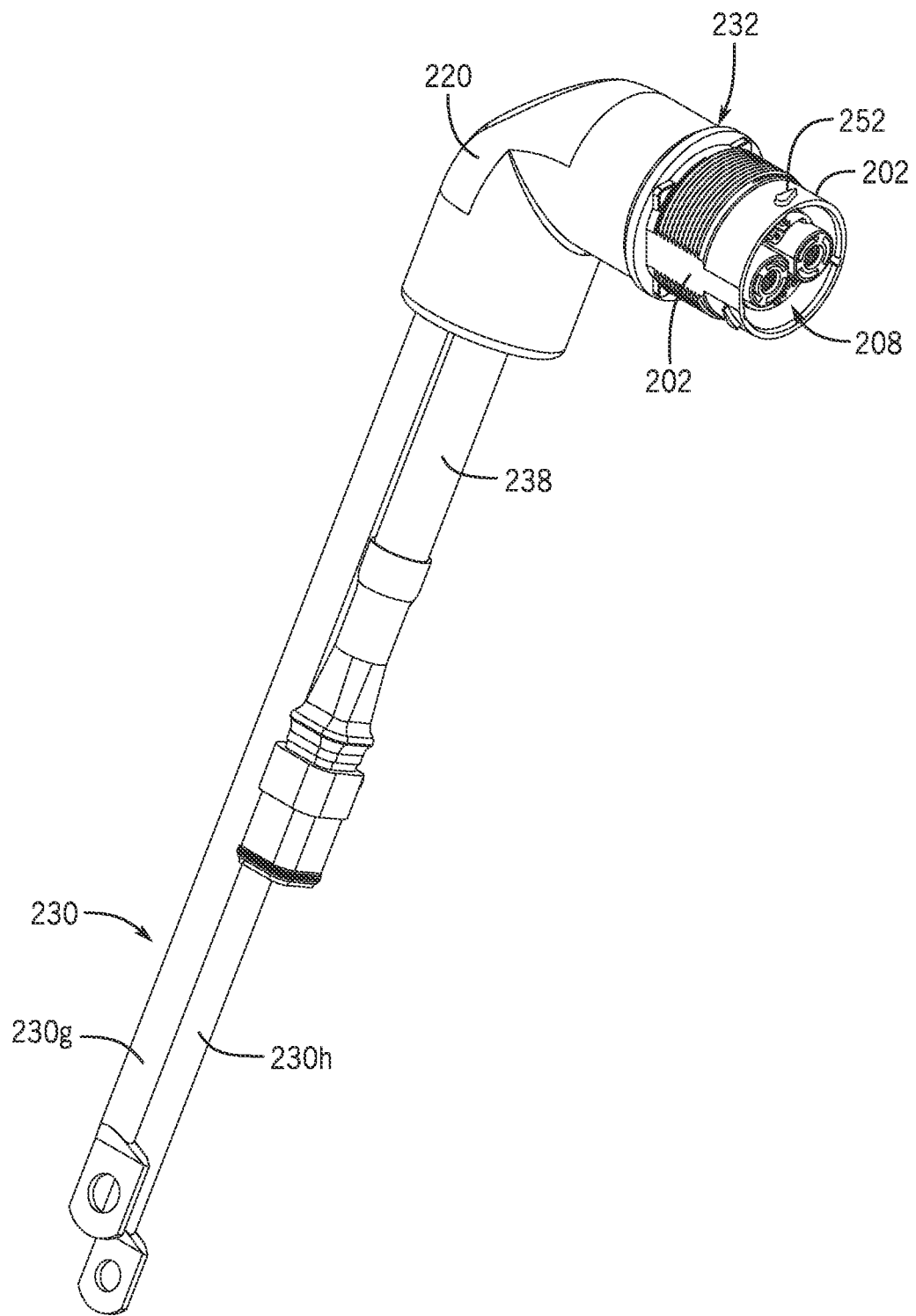
FIG. 11 illustrates the second connector coupled to a cable and wires.
Figure 19:
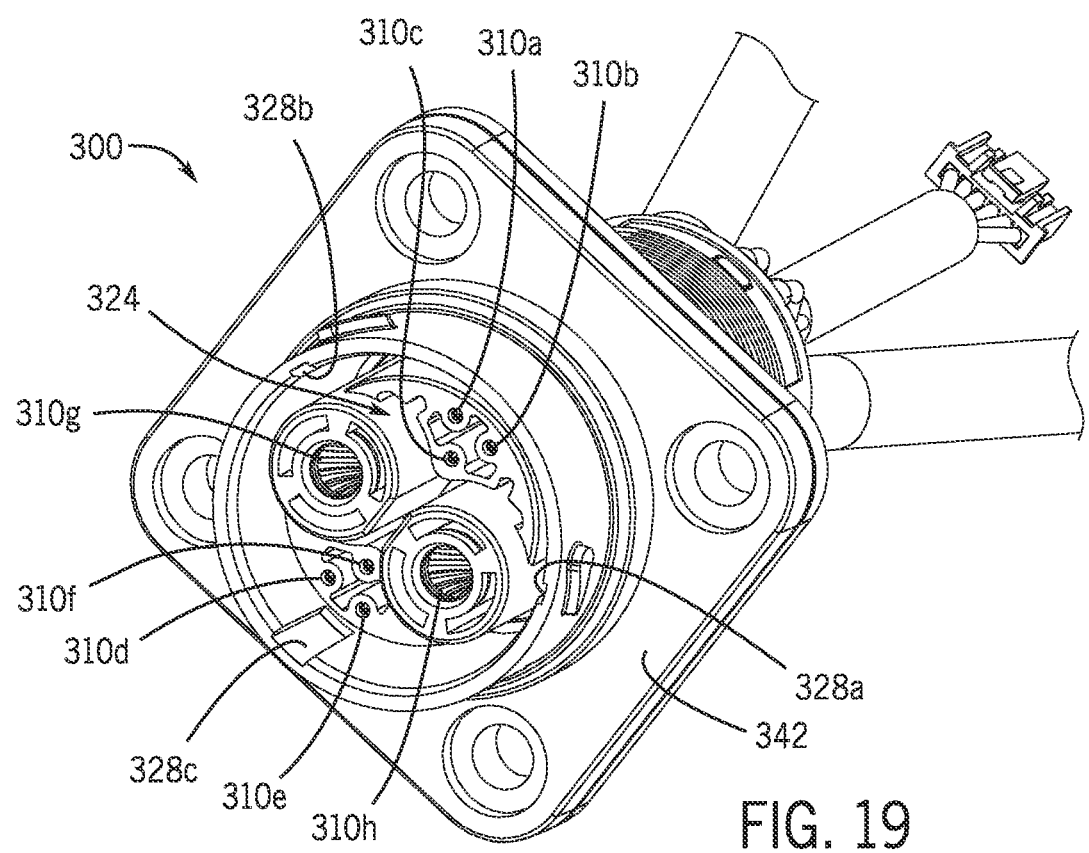
FIG. 19 illustrates a third connector that can be provided on the battery of FIG. 18.

FIG. 5 shows a perspective view of a connector for a marine device, here, the elbow connector 100 provided as part of the connection cables 90 shown in FIGS. 1-4. Thus, the connector 100 of FIG. 5 can be provided on either or both ends of the cables 122 connecting the electric marine drive 3 to the switch box 7 or to the battery 18, or the cables 122 connecting the switch box 7 to the battery 18. As will be described further herein below, the connector 100 is configured to be mated with a connector 200 as shown in FIGS. 9-11 or a connector 300 as shown in FIG. 19. The connector 100 has a barrel-shaped housing 102 having an open first end 104 and an opposite second end 106 (see FIGS. 16 and 17, which show cross sections through the connector 100). FIG. 6 shows a view looking straight into the connector 100 from the first end 104. A plug 108 is provided within the housing 102. The plug 108 comprises a plurality of electrical pins 110a-h supported within a base surface 126 of the plug 108. A sleeve 112 surrounds the housing 102 and is rotatable with respect to the housing 102 for reasons that will be described herein below. A perimetral seal 114, which may be an elastomeric gasket, is provided about an outer surface of the housing 102. A backshell 120, which will be described further herein below, is provided at the second end 106 of the housing 102 between the housing 102 and a cable 122.

The plurality of electrical pins 110a-h includes first and second power pins 110g, 110h. The power pins 110g, 110h are configured to be electrically connected to the battery 18 to carry electrical power through the cable 122. The power pins 110g, 110h may have insulators on their distal ends to prevent a user or another device from unintentionally grounding the circuit with a battery 18. The first and second power pins 110g, 110h are aligned along a diameter DP of the plug 108 and a remainder of the electrical pins 110a-f in the plurality of electrical pins are symmetrically located on either side of the diameter DP of the plug 108. Specifically, in the present example there are three electrical pins on either side of the diameter DP of the plug 108: electrical pins 110a-c on a first side of the diameter DP and electrical pins 110d-f on a second side of the diameter DP. Electrical pin 110a is symmetrically located with electrical pin 110d with respect to the diameter DP. Electrical pin 110b is symmetrically located with electrical pin 110e with respect to the diameter DP. Electrical pin 110c is symmetrically located with electrical pin 110f with respect to the diameter DP. The remainder of the electrical pins 110a-f may include one or more signal pins, interlock pins, and/or drain pins. The signal pins are configured to be connected to signal wire(s) (e.g., three pins in a CAN bus arrangement CAN high, CAN low, CAN ground) forming part of communication link 34, the interlock pins are configured to be connected to wires forming part of an interlock circuit 500 (see FIGS. 24 and 25 described below), and the drain pin is configured to be connected to a ground wire.

The present inventors placed the power pins 110g, 110h along the diameter DP of the plug 108 in order to allow the diameter DP of the plug 108 to have as small a dimension as possible. To maximize the space around the power pins 110g, 110h, the remainder of the electrical pins 110a-f may be arranged symmetrically with respect to the diameter DP. Such a placement allows the electrical pins 110c, 110f to be placed as close to the power pins 110g, 110h as possible to maintain the plug 108 compact. However, the inventors realized that the symmetry of the electrical pins 110a-f about the diameter DP could result in a mating connector 200 (FIG. 9-11) or 300 (FIG. 19) being incorrectly connected to the connector 100. Thus, keys may be provided on the connector 100 to prevent such incorrect connection.

In the depicted examples, an asymmetrical key 124 is provided within the housing 102 and divides the first and second power pins 110g, 110h. The key 124 has the shape of two "C"s situated back-to-back, each "C" partially surrounding the power pins 110g, 110h. The key 124 projects from the base surface 126 of the plug 108 toward the first end 104 of the housing. Asymmetry is provided by the inclusion of nubs 125 on the top of each "C," which nubs are not provided on the bottom of each "C." Thus, the key 124 is asymmetrical with respect to the diameter DP of the plug 108. The location, shape, and/or number of nubs 125 could vary from that shown. The key 124 is configured to be received within a corresponding keyway 224 (FIGS. 9, 10) provided in a first portion of the mating connector 200, 300 as will be described herein below. An additional key is provided on the outer surface of the housing 102 of the first connector 100. More specifically, as best shown in FIG. 6, three additional keys 128a-c are provided on the outer surface of the housing 102. The keys 128a and 128b have the same size, but the key 128c is wider. In other examples, the keys 128a-c all have the same size, or the keys 128a and 128b are wider than the key 128c. The additional key (e.g., keys 128a-c) is configured to be received within a corresponding additional keyway (e.g., keyways 228a-c, FIGS. 9, 10) formed in a second portion of the mating connector 200, 300.

Referring now also to FIG. 7, a plurality of wires 130 is respectively connected to the plurality of electrical pins 110a-h. The plurality of wires 130 includes at least a first power wire 130g and a second power wire 130h, connected respectively within the plug 108 to power pins 110g and 110h. As noted, the power wires 130g, 130h carry electrical power through the cable 122. The backshell 120 has a first end 132 that interfaces with the second end 106 of the housing 102 and surrounds the plurality of wires 130. A first cable jacket 136 extends from an opposite second end 134 of the backshell 120. The first cable jacket 136 surrounds the plurality of wires 130. A second cable jacket 138 surrounds a subset of the plurality of wires 130, such as the wires that are respectively connected within the plug 108 to the electrical pins 110a-f. This subset of pins/wires can be for signal, interlock, and/or drain purposes as noted herein above. The second cable jacket 138 extends through the first cable jacket 136 and shields the signal wires and other wires within the second cable jacket 138 from the power wires 130g, 130h. A schematic cross-section of the cable 122 is provided in FIG. 8, showing the wires 130a-f surrounded by the second cable jacket 138 and showing the second cable jacket 138 and the wires 130g, 130h surrounded by the first cable jacket 136.

FIG. 9 shows a perspective view of another connector 200 for a marine device, such as for the electric marine drive 3 shown in FIGS. 1-4. In one example, the connector 200 forms the port provided on the electric marine drive 3 to which the elbow connector 100 can be mated. The connector 200 includes a housing 202 configured to pass through an aperture in the outer cowling 50 of the electric marine drive 3, as will be described further herein below. The housing 202 has an open first end 204 and an opposite second end 206 (see FIGS. 16 and 17, which show cross sections through the connector 200). FIG. 10 shows a view looking straight into the connector 200 from the first end 204. A receptacle 208 is located within the housing 202. The receptacle 208 comprises a plurality of electrical sockets 210a-h formed in an end surface 226 of the receptacle 208. A plurality of wires, including wires 230g, 230h, is respectively connected to the plurality of electrical sockets (e.g., wire 230g is connected to electrical socket 210g and wire 230h is connected to electrical socket 210h). A backshell 220 interfaces with the second end 206 of the housing 202 and surrounds the plurality of wires 230g, 230h and a cable jacket 238, which in turn surrounds additional wires, as will be described further herein below.

In the present example, the plurality of electrical sockets 210a-h includes first and second power sockets 210g, 210h. As noted, the power sockets 210g, 210h are configured to be connected to power wires 230g, 230h, which are configured to conduct electrical power when a battery 18 is electrically connected to the connector 200 as shown in FIGS. 1-4. The power wires 230g, 230h are configured to be connected to the electric motor 4 to provide power thereto. The receptacle 208 is generally cylindrical and the first and second power sockets 210g, 210h are aligned along a diameter DR of the receptacle 208. A remainder of the electrical sockets 210a-f in the plurality of electrical sockets are symmetrically located on either side of the diameter DR of the receptacle 208. Specifically, in the present example there are three electrical sockets on either side of the diameter DR of the receptacle 208: electrical sockets 210a-c on a first side of the diameter DR and electrical sockets 210d-f on a second side of the diameter DR. Electrical socket 210a is symmetrically located with electrical socket 210d with respect to the diameter DR. Electrical socket 210b is symmetrically located with electrical socket 210e with respect to the diameter DR. Electrical socket 210c is symmetrically located with electrical socket 210f with respect to the diameter DR. The remainder of the electrical sockets 210a-f may include one or more signal sockets, interlock sockets, and/or drain sockets, which are configured to be connected to signal wires, interlock wires, and/or drain wires, respectively.

The present inventors placed the power sockets 210g, 210h along the diameter DR of the receptacle 208 in order to allow the diameter DR of the receptacle 208 to have as small a dimension as possible. In order to fill the space around the power sockets 210g, 210h, the present inventors then placed the remainder of the electrical sockets 210a-f symmetrically with respect to the diameter DR. Such a placement allows the electrical sockets 210c, 210f to be placed as close to the power sockets 210g, 210h as possible to maintain the receptacle 208 compact. However, the present inventors then realized that the symmetry of the electrical sockets 210a-f about the diameter DR could result in a mating connector 100 (FIGS. 5-7) being incorrectly connected to the connector 200. Thus, the present inventors provided keyways on the connector 200 to prevent such incorrect connection.

Specifically, the connector 200 comprises an asymmetrical keyway 224 provided in the receptacle 208 and dividing the first and second power sockets 210g, 210h. The keyway 224 is recessed from the end surface 226 of the receptacle 208 and has the shape of two "C's" situated back-to-back, each "C" partially surrounding a respective power socket 210g or 210h. Asymmetry is provided by the inclusion of recesses 225 on the bottom of each "C," which recesses are not provided on the top of each "C." Thus, the keyway 224 is asymmetrical with respect to the diameter DR of the receptacle 208. The location, shape, and/or number of recesses 225 could vary from that shown, but should match the location, shape, and/or number of nubs in the plug 108. The keyway 224 is configured to receive the corresponding key 124 provided on a portion of the mating connector 100 (FIGS. 5-6). An additional keyway is formed in an inner surface of the housing 202. More specifically, three additional keyways 228a-c are provided in the inner surface of the housing 202. Keyways 228a, 228b are narrower than keyway 228c, but in other examples, all keyways 228a-c could have the same width, or keyway 228c could be narrower than keyways 228a and 228b. The additional keyway (e.g., keyways 228a-c) is configured to receive the corresponding additional key (e.g., keys 128a-c) provided on a portion of the mating connector 100.

Referring now also to FIG. 11, as noted hereinabove, a plurality of wires 230 is respectively connected to the plurality of electrical sockets 210a-h in the receptacle 208. The plurality of wires 230 includes at least a first power wire 230g and a second power wire 230h, connected respectively within the receptacle 208 to power sockets 210g and 210h. These power wires 230g, 230h are configured to carry electrical power when a battery 18 is connected to the receptacle 208 via the plug 108 of a given connection cable 90. The backshell 220 has a first end 232 that interfaces with the second end 206 of the housing 202 (see also FIGS. 16 and 17) and surrounds the plurality of wires 230. A subset of the plurality of wires 230 is provided within a separate cable jacket 238. The subset of wires in the cable jacket 238 may include the signal, interlock, and drain wires, which may have the same purposes as the signal, interlocks and drain wires described hereinabove with respect to the first connector 100.

Referring back to FIGS. 9 and 10, the housing 202 comprises a geometrical feature extending outwardly from an outer surface of the housing 202. Specifically, the housing 202 comprises four geometrical features 240a-d, each in the form of a triangle. The geometric features 240a-d are raised with respect to a flange 242 that surrounds the housing 202 at the second end 206 of the housing 202. The geometric features 240a-d are equally spaced and together form four points of a square centered on the housing 202. However, the geometric features could instead form three points of a triangle or could be unequally spaced.

Figure 12:
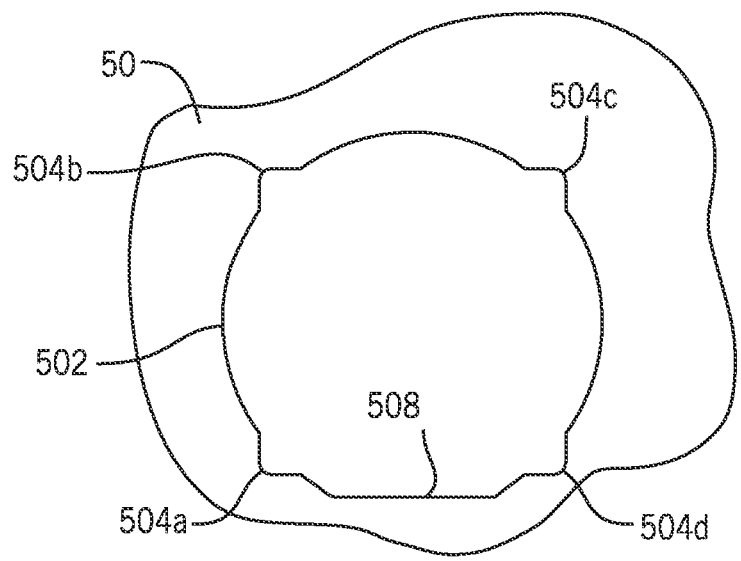
FIG. 12 shows an aperture that may be provided in a cowling of an electric marine drive to install the second connector of FIGS. 9-11 therein.
Figure 13:
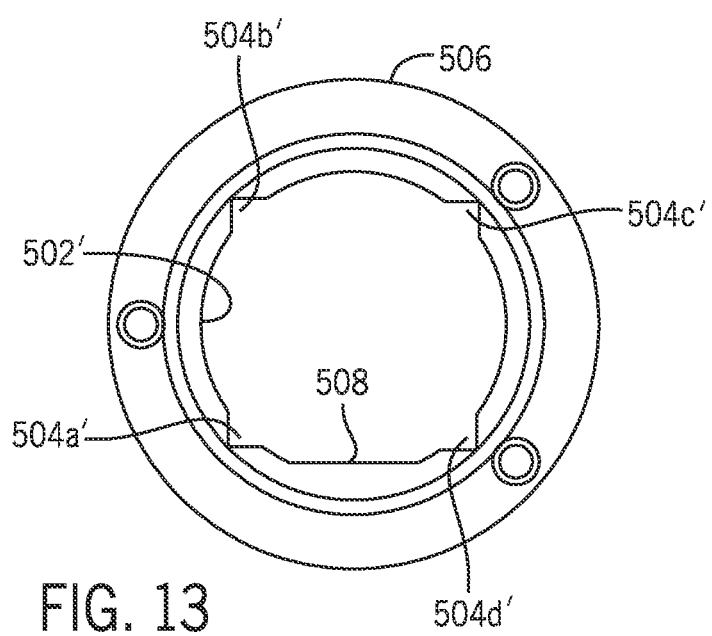
FIG. 13 shows an adapter that may be used to provide the aperture in the cowling of the electric marine drive.
Figure 14:
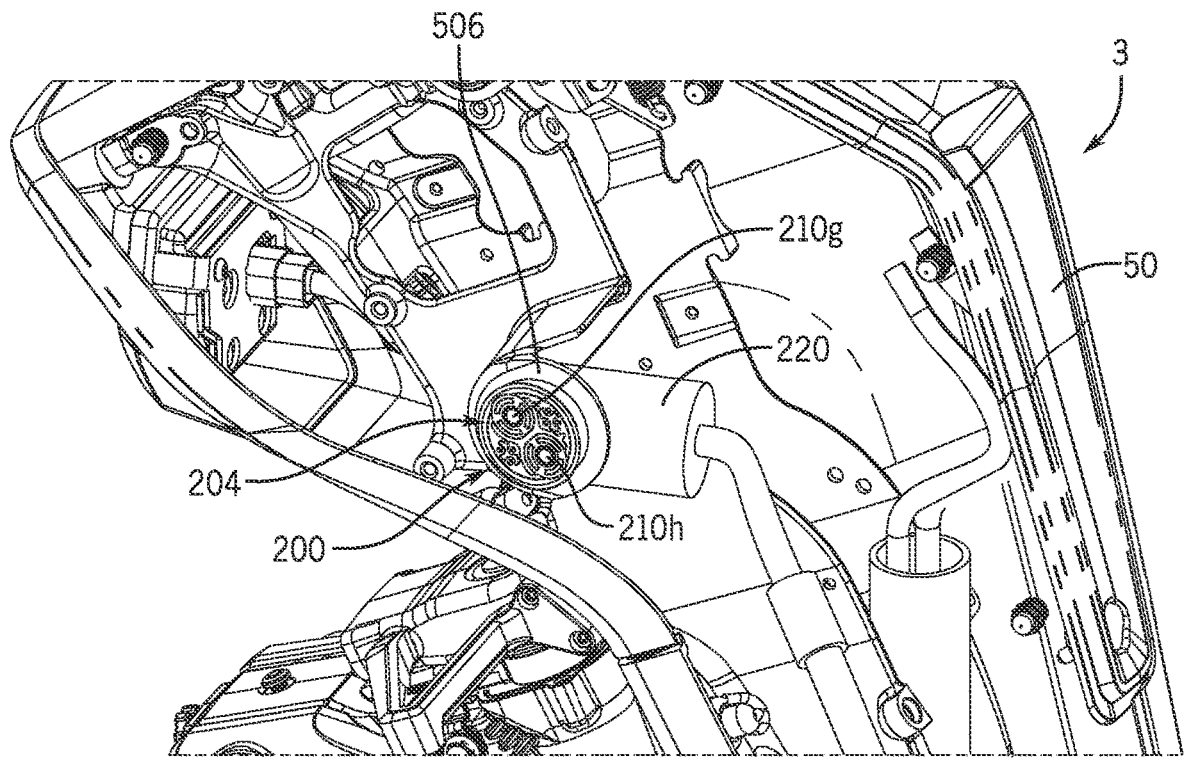
FIG. 14 shows a portion of an electric marine drive with the second connector of FIGS. 9-11 installed therein.

Referring to FIGS. 12-14, as noted hereinabove, the housing 202 of the connector 200 is configured to pass through an aperture 502 in an outer cowling 50 of the electric marine drive 3. The geometrical feature on the housing 202 of the second connector 200 is configured to be received in a corresponding geometrical feature in the aperture 502 in the outer cowling 50 in a manner that prevents rotation of the housing 202 with respect to the aperture 502 and thus the cowling 50. Specifically, the geometrical features 240a-d on the housing 202 are configured to be received in corresponding geometrical features 504a-d in the aperture 502 in the outer cowling 50 in a manner that prevents rotation of the housing 202 with respect to the aperture 502. The geometrical features 504a-d are also in the shape of triangles spaced equally apart and forming the corners of a square centered on what is otherwise a generally circular aperture 502 having a diameter slightly larger than the diameter of the housing 202. The geometrical features 504a-d can be made directly in the cowling 50 as shown in FIG. 12 or can be made in an adapter 506 as shown in FIG. 13. If the adapter 506 is used, the geometrical features 504a'-d' are preformed in the adapter 506, the cowling 50 is cut or formed to the outside shape of the adapter 506 (here, a circle), and the adapter 506 is inserted in the appropriately sized space in the cowling 50. Using an adapter may 506 make manufacturing of the cowling 50 easier and/or may allow for more precise forming of the aperture 502' and geometrical features 504a'-d'.

FIG. 14 shows a portion of the electric marine drive 3 with the cowling 50 on the near side of the electric marine drive 3 removed so that the location of the adapter 506 and connector 200 situated therein can be seen. With the connector 200 placed inside the cowling 50 and the first end 204 of the housing 202 facing outwardly, the geometrical features 240a-d and 504a-d or 504a'-d' are respectively aligned and the housing 202 of the connector 200 is pushed through the aperture 502 or 502' from the inside of the cowling 50. The connector 200 is configured to be installed through the aperture 502 or 502' in the outer cowling 50 such that the backshell 220 and a portion of the housing 202 are located internally of the outer cowling 50 and a remainder of the housing 202 (e.g., at least the first end 204 thereof) is located externally of the outer cowling 50. The flange 242 on the connector 200 sits just internally of the cowling 50, while the geometric features 240a-d sit directly within the corresponding geometric features 504a-d or 504a'-d' of the aperture 502 or 502'. A washer and nut may be placed over the first end 204 of the housing 202 and the nut tightened via the threads 244 (FIG. 9) on the outer surface of the housing 202 until the washer contacts the cowling 50 or the adapter 506. The adapter 506 is then held in place between the washer and nut on the outside of the cowling 50 and the flange 242 of the housing 202 on the inside of the cowling 50. The situating of the geometric features 240a-d within geometrical features 504a-d or 504a'-d' ensures that the connector 200 will not rotate with respect to the cowling 50 when external forces (such as connection/disconnection of the connector 100 or jiggling of the cable 122 during use) tend to place a torque on the connector 200. Such an anti-rotation feature goes beyond that already provided by the D-flat 246 on the housing 202 (FIG. 10) and the corresponding D-flat 508 or 508' in the aperture 502 (FIGS. 12 and 13).

Figure 15:
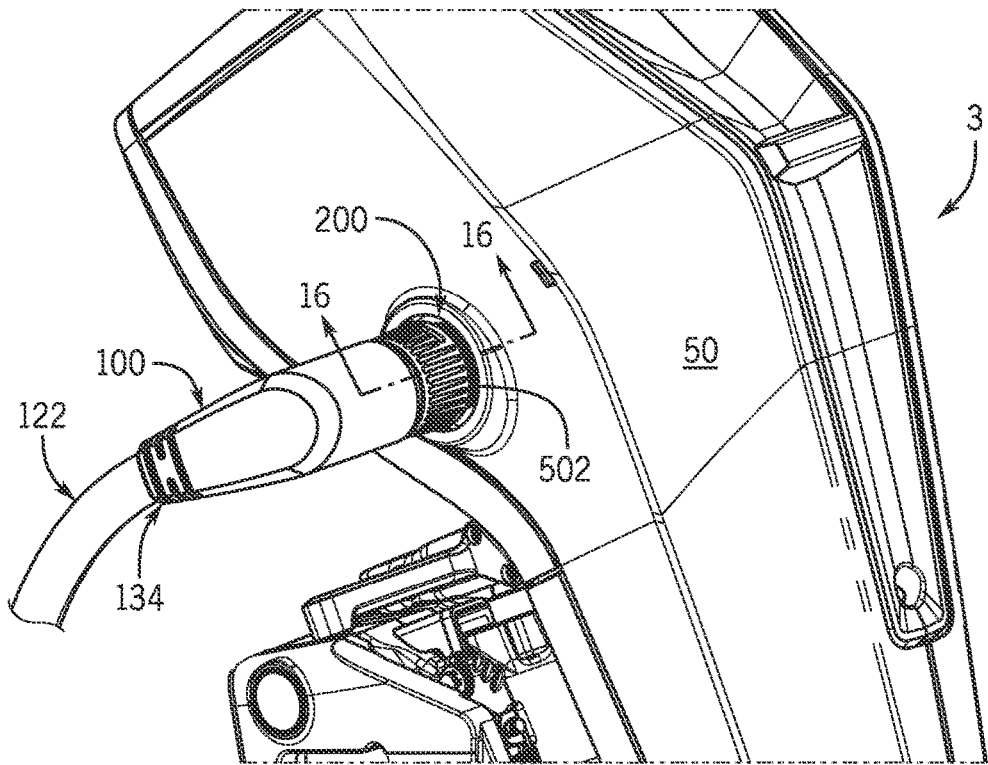
FIG. 15 shows a portion of the electric marine drive of FIG. 14 with the first connector of FIGS. 5-7 mated with the second connector of FIGS. 9-11.

As shown in FIG. 14, the electric marine drive 3 is more or less in a vertically upright position. In other words, its steering shaft is more or less perpendicular with respect to the surface of the water in which the electric marine drive 3 is operating. This may be the case when, for example, the electric marine drive 3 is in a neutral trim position, not trimmed in or trimmed out. The connector 200 is configured to be installed in the electric marine drive 3 such that the first and second power sockets 210g, 210h are not vertically aligned with one another when the electric marine drive 3 is in the upright position. This clocking correlates to an intuitive and ergonomic connection of the connector 100 of FIGS. 5-7 with the connector 200 of FIGS. 9-11, as shown in FIG. 15. Specifically, the connector 100 is configured to connect with the connector 200 in a manner such that the second end 134 of the backshell 120 is located forwardly (with respect to the marine vessel) of the housing 102 where connection is made to the electric marine drive 3. Such an orientation of the elbow-shaped connector 100 makes it easy for a user to grip the connector 100 with their right hand to connect/disconnect the connector 100 to/from the connector 200 while on the marine vessel. In terms of human-machine interaction, it would be counterintuitive for a user to flip the connector 100 in an opposite direction in which the backshell 120 cannot be used as a "handle" of sorts to hold the connector 100. This intuitive "handle" feature of the elbow connector 100 thus also prevents attempts to incorrectly mate the connectors 100, 200.

FIGS. 14 and 15 also show how the connector 200 is used to create a power/signal port on the cowling 50 of the electric marine drive 3 that is aesthetically pleasing and prevents water ingress. The port sheds water due to its vertical orientation and does not hang off of the electric marine drive 3 as do current pigtail-style assemblies. This makes it easier for a user to remove the electric marine drive 3 from the marine vessel and transport and/or store it elsewhere, as the user does not need to worry about electronic equipment hanging off of or out of the cowling 50 being damaged. The port on the electric marine drive 3 can be provided with a waterproof cap that mates to the connector 200 and/or with a hatch-type door on the cowling 50.

Figure 16:
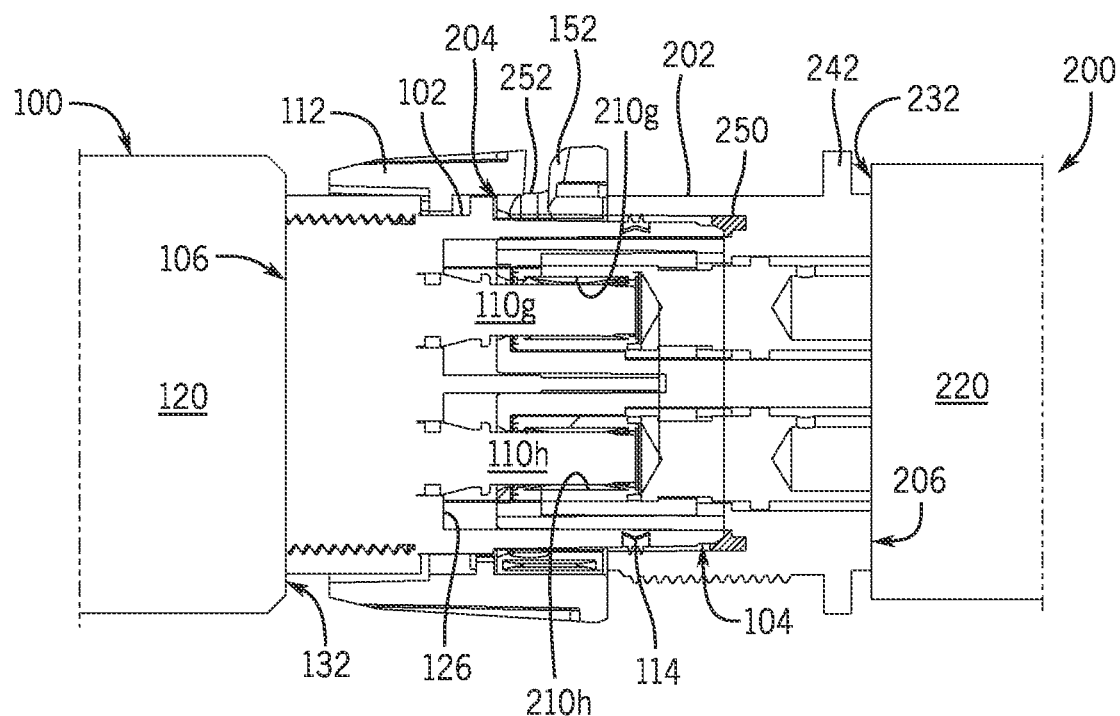
FIG. 16 is a cross section of the mated first and second connectors taken along the line 16-16 in FIG. 15.
Figure 17:
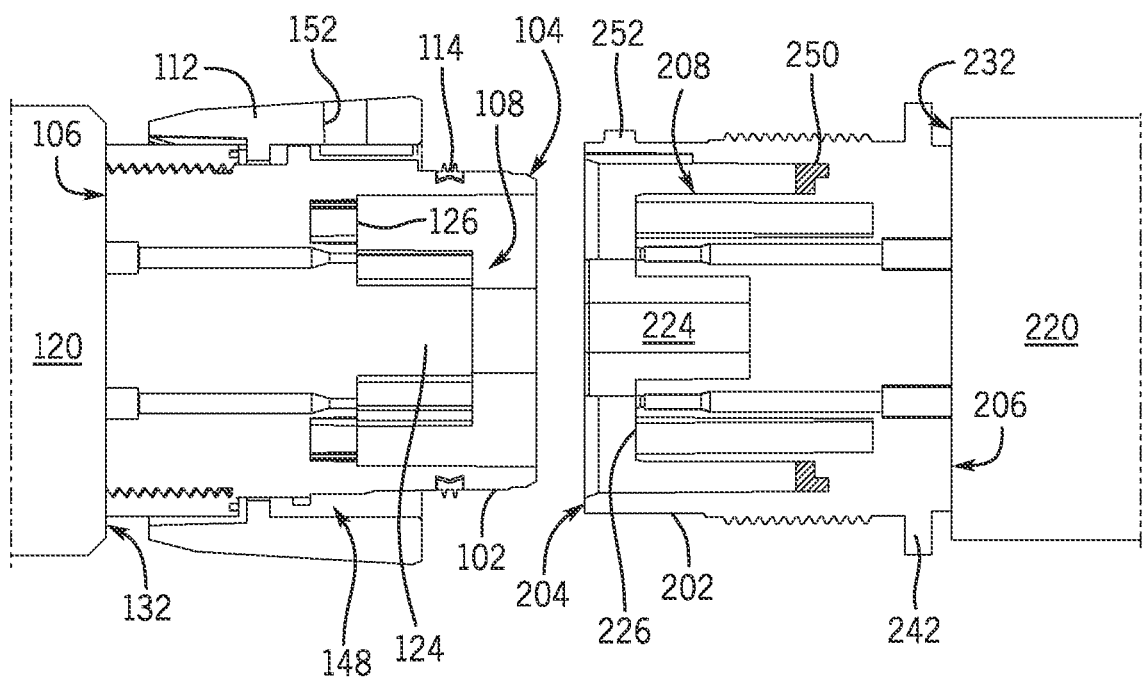
FIG. 17 is a cross section of the first and second connectors taken perpendicular to the cross section of FIG. 16, with the first and second connectors not being mated together.

As shown in FIGS. 16 and 17, according to the present disclosure, the housing 102 of the connector 100 is configured to receive a first portion (here, the receptacle 208) of the mating connector 200 via the first end 104 of the housing 102. An annular gap 148 (see also FIG. 6) between the outer surface of the housing 102 and the sleeve 112 is configured to receive a second portion (here, a distal portion of the housing 202) of the mating connector 200, and the perimetral seal 114 is configured to contact the second portion (i.e., the annular inside surface of the housing 202) of the mating connector 200. Simultaneously, the housing 202 of the connector 200 is configured to receive a portion (here, the distal portion of the housing 102) of the mating connector 100 via the first end 204 of the housing 202. Once the two connectors 100, 200 have been mated, the sleeve 112 can be twisted about the housings 102 and 202 such that keys 252 on the outer surface of the housing 202 ride within slots 152 in the sleeve 112 to lock the connectors 100, 200 together against accidental disconnection.

Note that the power pins 110g, 100h are longer than the electrical pins 110a-f (see FIGS. 5-6) and therefore the power pins 110g, 100h mate with the power sockets 210g, 210h (see FIG. 16) before the electrical pins 110a-f mate with the electrical sockets 210a-f. The connectors are thus designed such that the power pins 100g, 100h can carry 100% rated current from the battery 18 to the electric motor 4 after the signal pins (which are a subset of the pins 100a-e) mate with their respective sockets provided that the interlock circuit 500 is completed, as described in more detail below.

Thus, the present disclosure is of a pair of connectors 100, 200 for marine devices, the pair of connectors 100, 200 comprising a first connector 100 and a second connector 200. The first connector 100 comprises a first housing 102 having an open first end 104 and an opposite second end 106. A plug 108 is provided within the first housing 102, the plug 108 comprising a plurality of electrical pins 110a-h. First and second electrical pins 110g, 110h of the plurality of electrical pins are aligned along a diameter DP of the plug 108 and a remainder of the electrical pins 110a-f in the plurality of electrical pins are symmetrically located on either side of the diameter DP of the plug. The first connector 100 also comprises a sleeve 112 surrounding the first housing 102 and an asymmetrical key 124 provided within the first housing 102 and dividing the first and second electrical pins 110g, 110h. The second connector 200 comprises a second housing 202 having an open first end 204 and an opposite second end 206. A receptacle 208 is located within the second housing 202, the receptacle 208 comprising a plurality of electrical sockets 210a-h. First and second electrical sockets 210g, 210h of the plurality of electrical sockets are aligned along a diameter DR of the receptacle 208 and a remainder of the electrical sockets 210a-f in the plurality of electrical sockets are symmetrically located on either side of the diameter DR of the receptacle 208. The second connector 200 also comprises an asymmetrical keyway 224 provided in the receptacle 208 and dividing the first and second electrical sockets 210g, 210h.

The first housing 102 of the first connector 100 is configured to receive the receptacle 208 of the second connector 200 via the first end 104 of the first housing 102. A gap 148 between an outer surface of the first housing 102 and the sleeve 112 is configured to receive the second housing 202 of the second connector 200. Further, the keyway 224 of the second connector 200 is configured to receive the key 124 of the first connector 100. An additional key 128a-c is provided on the outer surface of the first housing 102 and an additional keyway 228a-c is formed in an inner surface of the second housing 202. The additional keyway 228a-c is configured to receive the additional key 128a-c. The keys and keyways prevent incorrect connection of the connectors 100, 200 as the connectors 100, 200 are physically incapable of mating unless all keys are aligned with all corresponding keyways.

The second connector 200 further comprises a plurality of wires 230 respectively connected to the plurality of electrical sockets 210a-h and a backshell 220 interfacing with the second end 206 of the second housing 202 and surrounding the plurality of wires 230. The second connector 200 is configured to be installed through an aperture 502 in an outer cowling 50 of an electric marine drive 3 such that the backshell 220 and a portion of the second housing 202 are located internally of the outer cowling 50 and a remainder of the second housing 202 is located externally of the outer cowling 50. The second connector 200 is configured to be installed in the electric marine drive 3 such that the first and second electrical sockets 210g, 210h are not vertically aligned with one another when the electric marine drive 3 is in an upright position. The second housing 202 comprises a geometrical feature 240a-d extending outwardly from an outer surface of the second housing 202. The geometrical feature 240a-d on the second housing 202 is configured to be received in a corresponding geometrical feature 504a-d or 504a'-d' in the aperture 502 or 502' in the outer cowling 50 in a manner that prevents rotation of the second housing 202 with respect to the aperture 502 or 502'.

A plurality of wires 130 is respectively connected to the plurality of electrical pins 110a-h of the first connector 100. A backshell 120 has a first end 132 interfacing with the second end 106 of the first housing 102 and surrounds the plurality of wires 130. A first cable jacket 136 extends from an opposite second end 134 of the backshell 120. The first cable jacket 136 surrounds the plurality of wires 130. A second cable jacket 138 surrounds a subset 130a-f of the plurality of wires. The second cable jacket 138 extends through the first cable jacket 136 to shield the wires in the second cable jacket 138 from those outside the second cable jacket 138.

FIGS. 16 and 17 also show a first perimetral seal 250 located within the second housing 202 around an outer surface of the receptacle 208. The first perimetral seal 250 is configured to abut the first end 104 of the first housing 102 when the connectors 100, 200 are mated. A second perimetral seal 114 is provided about an outer surface of the first housing 102. The second perimetral seal 114 is configured to contact an inner surface of the second housing 202 when the connectors 100, 200 are mated. The second perimetral seal 114 is located between the first and second ends 104, 106 of the first housing 102. While the first perimetral seal 250 can provide a watertight seal when the connectors 100, 200 are mated perfectly and one is not tilted with respect to the other, the second perimetral seal 114 is able to provide a watertight seal even when the first connector 100 is tilted with respect to the second connector 200.

Figure 18:
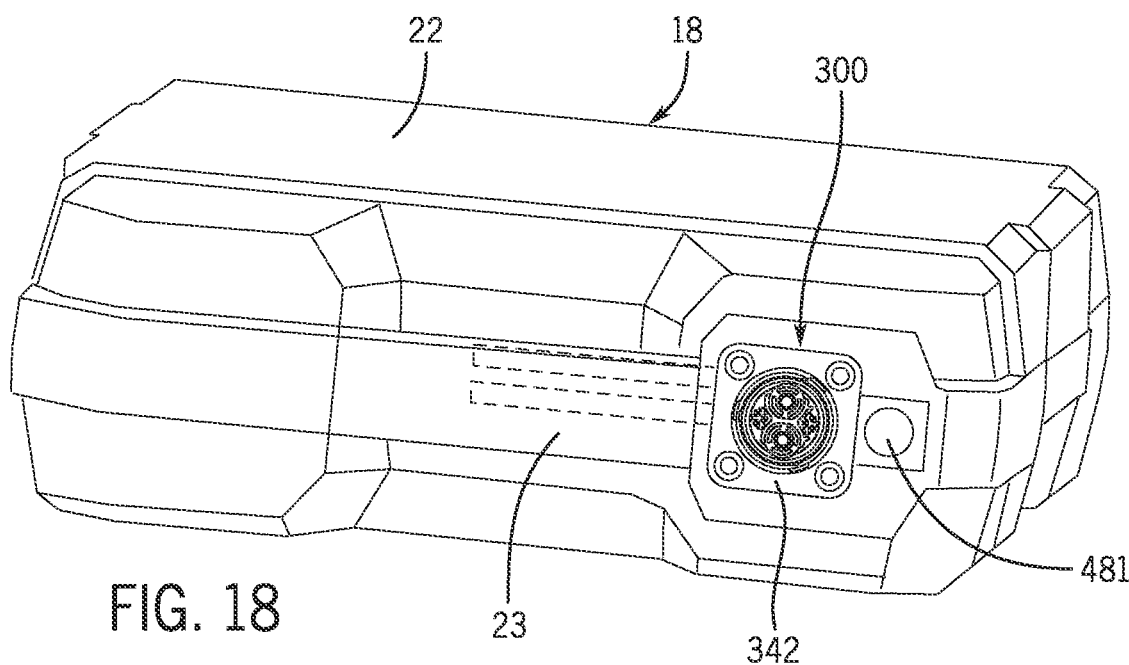
FIG. 18 illustrates on embodiment of battery according to the present disclosure.

FIG. 18 shows a battery 18 according to the present disclosure, on which a battery port is provided as noted hereinabove with respect to FIGS. 1-4. The battery port is itself a connector 300 very similar to the connector 200 provided on the electric marine drive 3. The connector 300 has a flange 342 providing for connection to the battery housing 22. Other than the shape of this flange 342, the lack of a D-flat 246, threads 244, or geometrical features 240a-d on the connector 300 (all of which may be particular to a connector 200 to be installed on the cowling 50), the remainder of the connector 300 is identical to the connector 200. Parts of the connector 300 that are labeled with a "3" in the hundreds place correspond to the same parts labeled with a "2" in the hundreds place and the same two numerals in the tens and ones places. Therefore, each of the parts of the connector 300 will not be described further herein. The connector 100 can be mated to the connector 300 in the same way as described with respect to FIGS. 16 and 17 regarding mating of the connectors 100 and 200. Thus, the same connector 100 can be used to mate to the connector 300.

Referring now to all the figures, one of ordinary skill in the relevant art would understand that various configurations of connectors 100, 200, 300 and cables could be provided for any given connection cable 90 in the electric marine propulsion system 2. For instance, the connection cable 90d of FIG. 2 has an elbow connector 100y, 100z on either end, each connector 100y, 100z being the same as the connector 100 described with respect to FIGS. 5-7. In other examples, it may be beneficial to use a connector cable 90x like that shown in FIG. 7, with ring terminals 131g, 131h on the ends of the power wires 130g, 130h for connection to the switch box 7 or to the battery 18. In still other examples, straight connectors can be used on one or both ends of a connection cable 90, such as the straight connectors 99a, 99b shown on the switch box 7 in FIG. 2. These straight connectors would have the same connective configuration (i.e., plug 108) as those of the elbow connector 100 described with respect to FIGS. 5-7, but a different backshell shape to allow for connection of multiple connectors 99 immediately adjacent one another on the switch box 7. Thus, each of the ports on the electric marine drive 3, the switch box 7, and the batteries 18 may have the female configuration of the receptacle 208 described with respect to FIGS. 9-11, while each of the elbow and straight connectors on the ends of connection cables 90 may have the male configuration of the plug 108 described with respect to FIGS. 5-7. It is contemplated that any given connection cable 90 can have one of the following configurations: elbow connectors on both ends; elbow connector on one end and straight connector on the other end; straight connectors on both ends; elbow connector on one end and ring terminals on the other end; straight connector on one end and ring terminals on the other end. In the case where ring terminals are provided on a connection cable 90, the marine device to which the ring terminals are to be connected includes screws for connection of the ring terminal to the device's circuit. A receptacle for the separate signal cable is then also provided.

Figure 20:
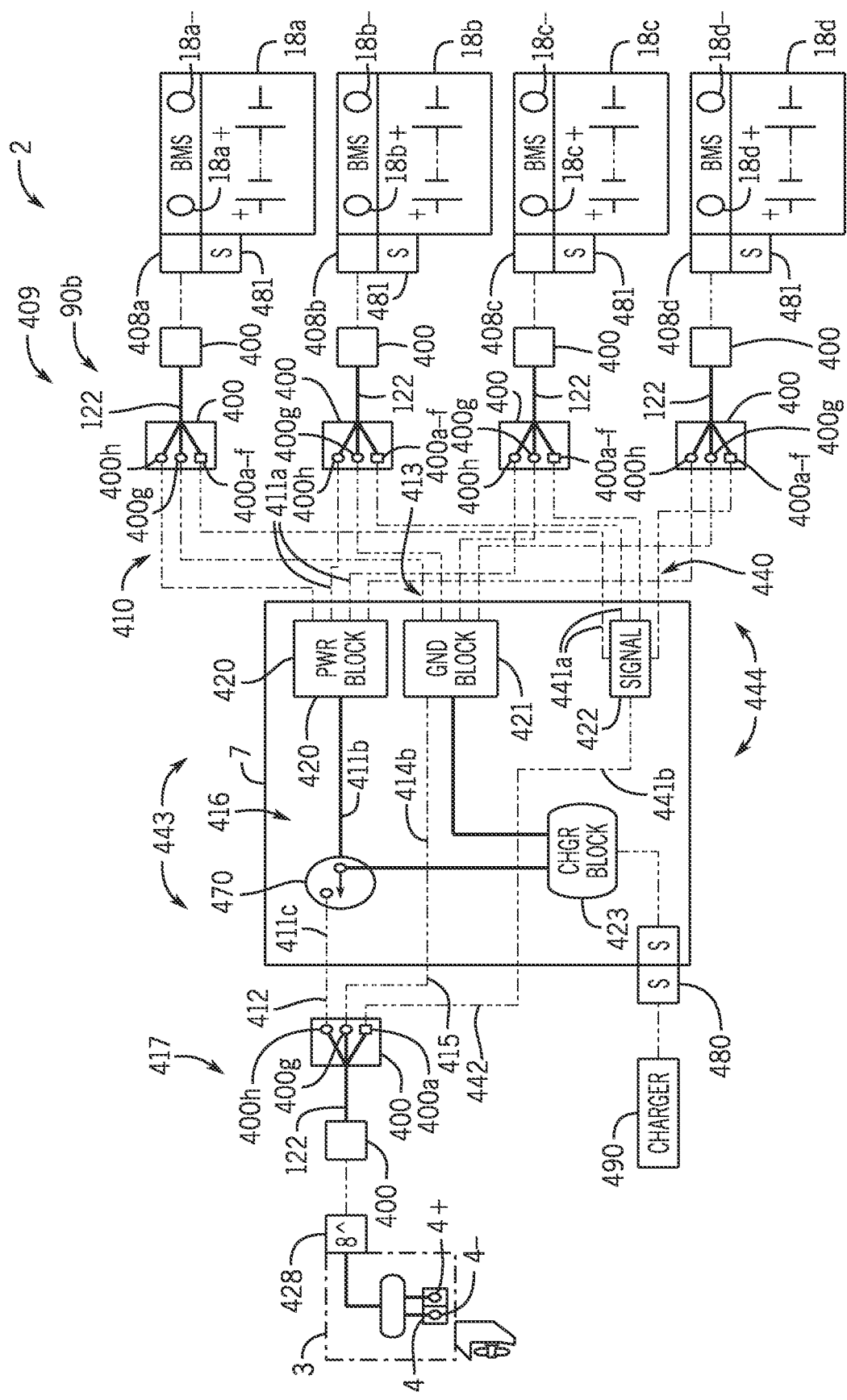
FIG. 20 is a schematic representation of another electric marine propulsion system according to the present disclosure, in which a power circuit and a signal circuit are illustrated.

FIG. 20 graphically depicts the power and signal connections of one embodiment of the propulsion system 2 having four marine batteries 18a-d connected in parallel to a switch box 7, which in turn connects to the marine drive 3. Four connection cables 90a connect each battery 18a-d to the switch box 7 and one connection cable 90d connects between the switch box 7 and the marine drive 3. The connection cables 90d and 90b each comprise a cable 122 having a connector 400 on each end, wherein the connector 400 is a unified power and signal connector, such as the elbow connector 100 or the straight connector 99 described above. In this example, each of the connection cables 90b and connection cable 90d have the same connector 400 arrangement and thus are all interchangeable. For example, the connectors 400 at the switch box end of the cables 90b,d may each be straight connectors 99 and the connectors 400 at the drive end of the cables 90b,d may each be elbow connectors 100. In an alternative example, all connectors at both ends of the cables may be straight connectors 99 or may be elbow connectors 100. In such an embodiment where the connectors 400 at both ends are identical, the cables 90b,d are reversible (direction agnostic) and interchangeable. In still other embodiments, the connectors 400 at different locations on the connection cables 90b,d may differ from one another, taking on any of the various embodiments described herein.

The unified power and signal connector 400 may have a pin, or terminal, arrangement similar to that shown and described with respect to FIGS. 5-6. The connector includes power terminals 400g-h (e.g., power pins 110g-h in FIGS. 5-6) and one or more signal terminals 400a-f (e.g., electrical pins 110a-f in FIGS. 5-6). The power terminals 400g-h connect a power circuit 443, where when connected, current flows from each of the batteries 18a-d to the marine drive 3 through the switch box 7. The signal terminals 400a-f connect to signal circuit 444. The signal terminals 400a-f include at least two interlock circuit terminals (e.g., electrical pins 110a-b ore pins 110c-d in FIGS. 5-6). The power circuit 443, signal circuit 444, and the interlock circuit 500 are described in detail below.

Figure 21:
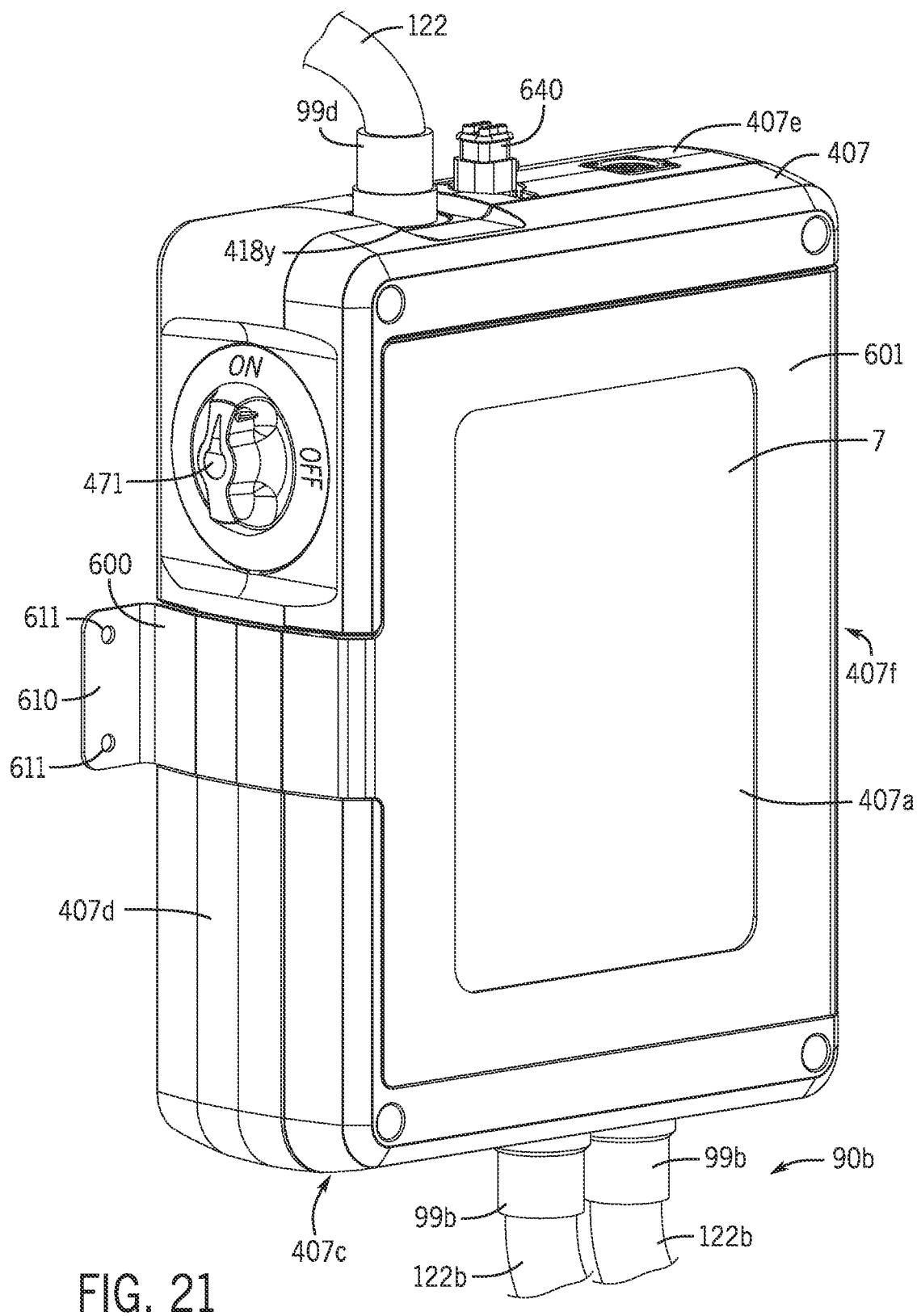
FIGS. 21-23 are exterior views of an exemplary switch box for a marine device of the electric marine propulsion systems of the present disclosure.
Figure 22:
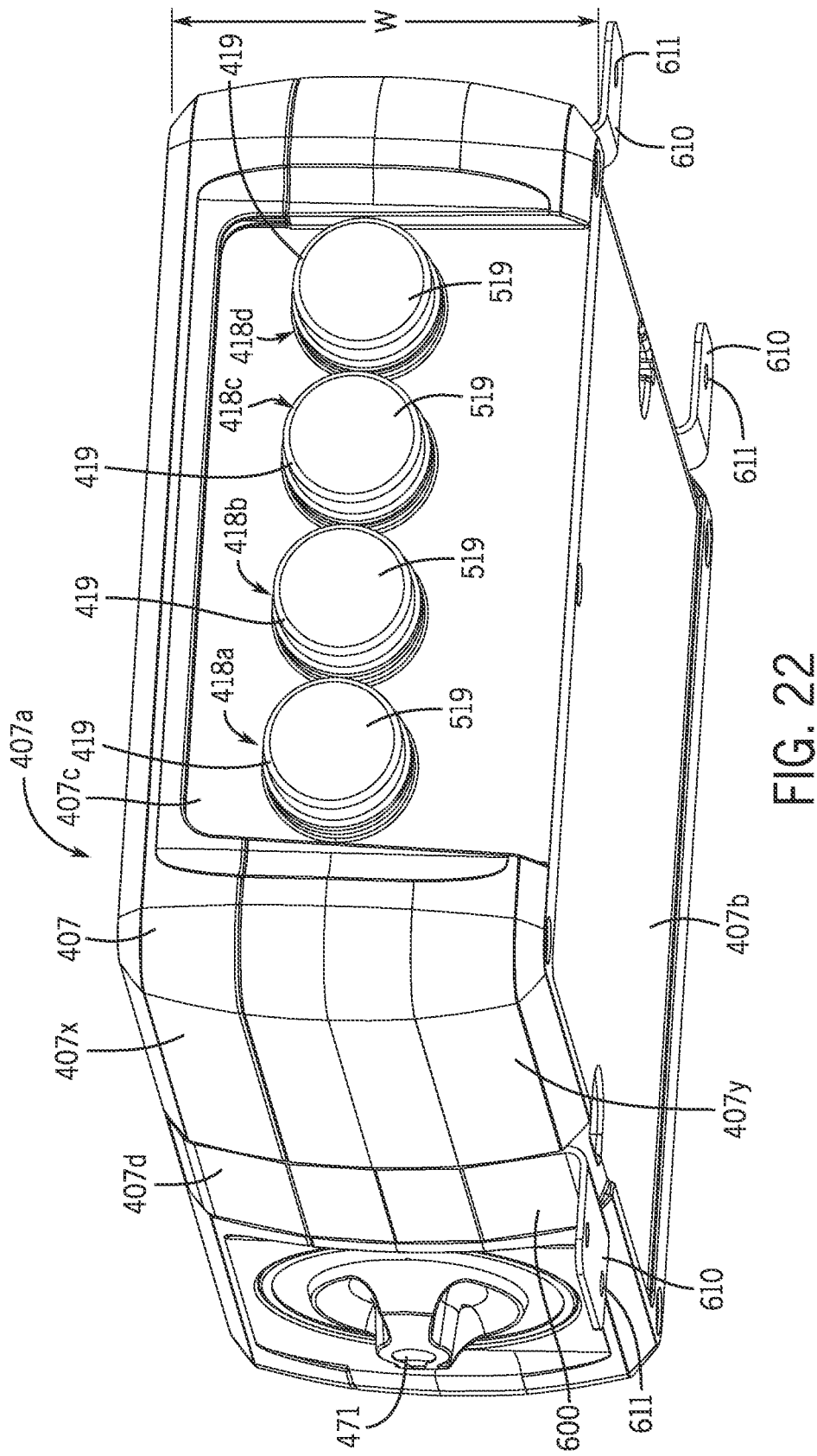
Figure 23:
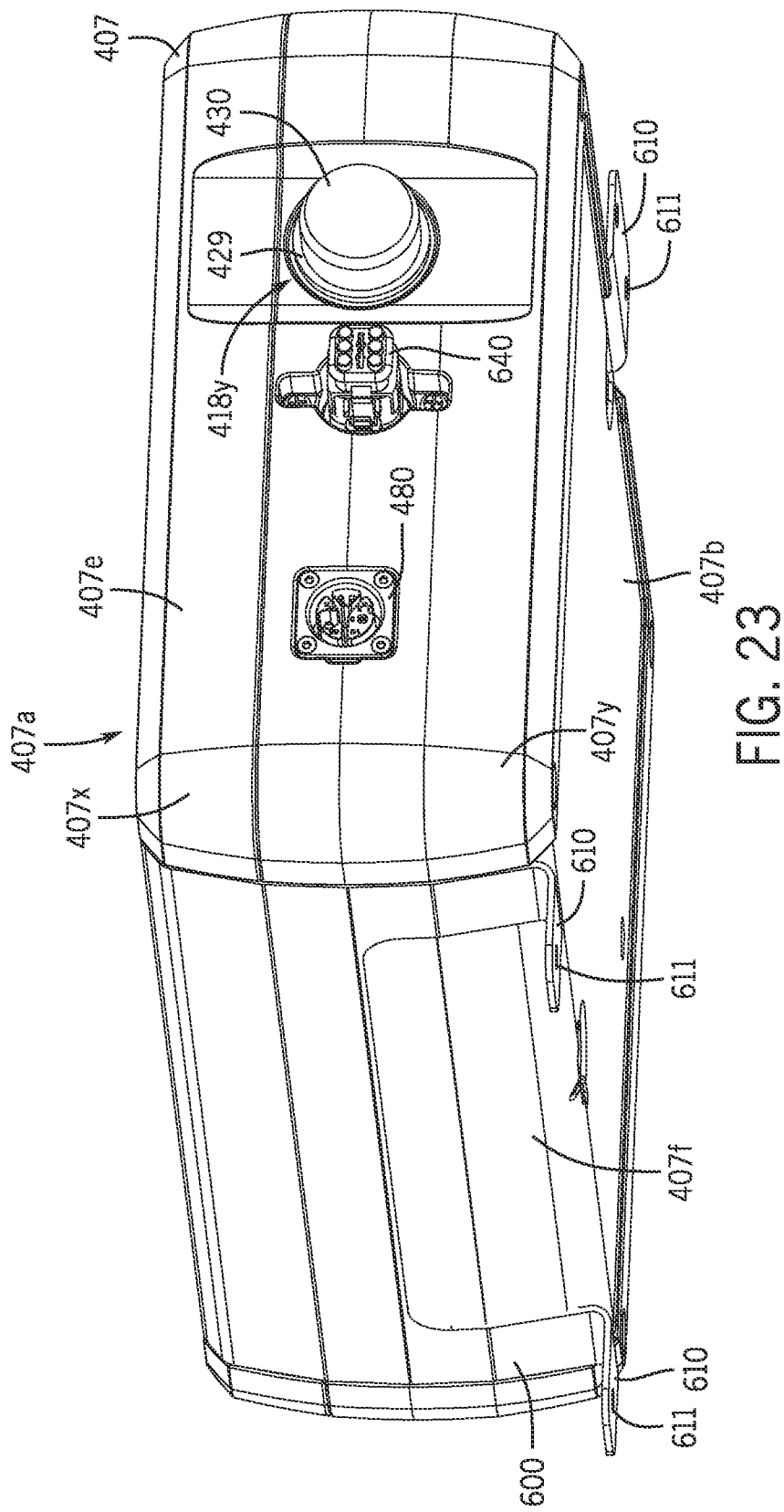

Each connection cable 90b connects between a respective battery port 408a-d on each marine battery 18a-d and switch box port 418a-d on the switch box 7. For example, each of the battery ports 408a-d may be formed by mating connectors 300 on the battery housing 18 as shown in FIG. 18. FIGS. 21-23 and 26-27 depict an exemplary embodiment of the switch box 7. FIG. 21 shows the switch box 7 with housing 407 connected to two connection cables 90b each having a straight connector 99b at the switch-box-end of the cable 122b. Referring in particular to FIGS. 21-23, each of the switch box ports 418a-d may be formed by mating connectors 419 having receptacles 519 on the switch box housing 407 configured to receive the mating end of each connector 400. For example, the mating connectors 419, being configured to provide electrical sockets for power and data connections (and in some embodiments interlock circuit connections or other safety control connections), may be the same or similar to the connectors 200, 300 having the same or similar receptacles as described above.

In the depicted example, the housing 407 is a rectangular-box-shape having a first side 407a and a second side 407b. Though the first side 407a is shown on top and the second side 407b is shown on bottom, the switch box housing 407 is configured to be mounted at any possible orientation such that any of the sides 407a-f are oriented upwards. The housing 407 has a third side 407c, fourth side 407d, fifth side 407e, and sixth side 407f. Here, the connection ports and other features are located on the sides 407c-f. As best shown in FIG. 22, switch box ports 418a-d are located together on one side, here the third side 407c. Four switch box ports 418a-d are shown, but in other embodiments a different number of switch box ports 418 may be provided, such as two ports, three ports, five ports, six ports, etc. In other embodiments, the switch box ports 418a-d may be distributed around the sides 407c-f of the housing 407, or even on the first or second sides 407a-b. The switch box ports 418a-d are centered along the width w of the housing 407 to provide symmetry, optimizing the switch box 7 design to be mounted or placed in any orientation on the vessel. The housing 407 comprises two pieces 407x and 407y that are connected together as described below with respect to FIG. 27.

Referring again to FIGS. 20 and 21, connection cable 90d connects between the switch box 7 and the marine drive 3, and more specifically between the drive port 428 and a switch box port 418 (e.g., dedicated port 418y) on the switch box housing 407. The drive port 428 may be on the outer housing, or cowling 50, of the marine drive 3, such as formed by the mating connector 200 shown in FIGS. 14 and 15 above. The other connector 400 of the cable 90d connects to the switch box 7. This is illustrated in FIGS. 21 and 23 as a straight connector 99d of switch box port 418y. FIG. 23 shows the corresponding side 407e of the switch box housing 407, where switch box port 418y is positioned (again centered in the width as described above). Thus, the switch box port 418y dedicated for connection to the marine drive 3 is on an opposing side 407e from the side 407c where the switch box ports 418a-d are located.

Figure 24:
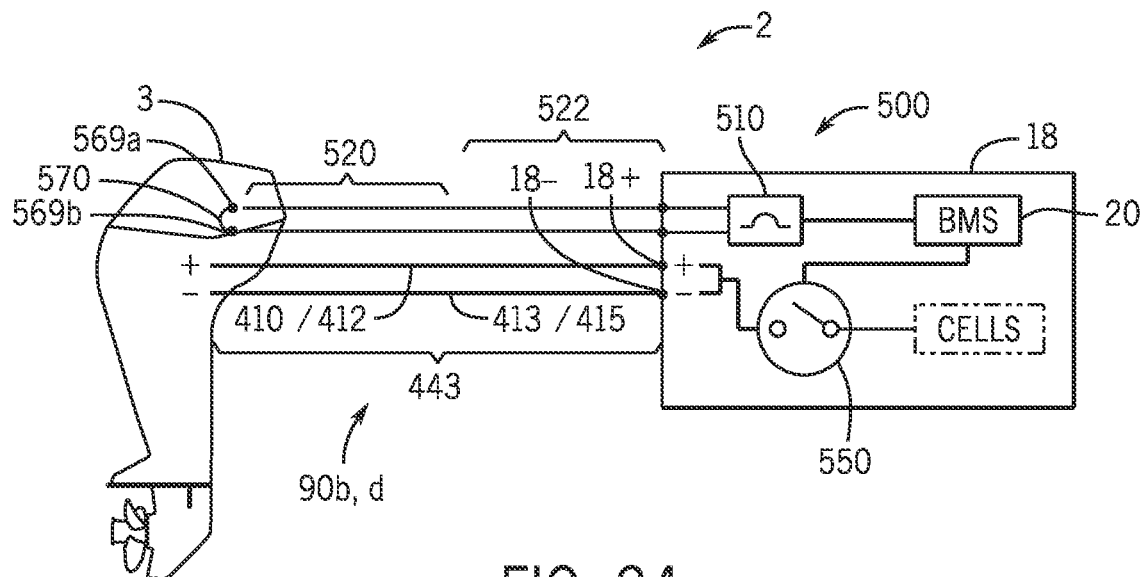
FIGS. 24-25 are schematic representations of another electric marine propulsion system according to the present disclosure, in which a power circuit and an interlock circuit are illustrated.

The switch box port 418y is formed by mating connector 429 having receptacle 430. The mating connector 429 is configured to receive and mate with connector 400 on the cable 90d, which in this embodiment is shown as straight connector 99d. The mating connector 429, being configured to provide electrical sockets for power and data connections (and in some embodiments interlock circuit connections or other safety control connections), may be the same or similar to the connectors 200, 300 having the same or similar receptacles as described above. Likewise, the mating connector 429 may be identical to the mating connectors 419 configured to connect to the batteries, thereby facilitating the use of identical connectors 400 and interchangeable connection cables 90d and 90b and the ability to use either of the cables 90d or 90b to connect the marine drive 3 directly to one of the batteries 18a-18d. This arrangement of one drive connected by connection cable 90b,d is schematically shown in FIG. 24 and also the arrangement depicted in FIG. 4.

Figure 25:
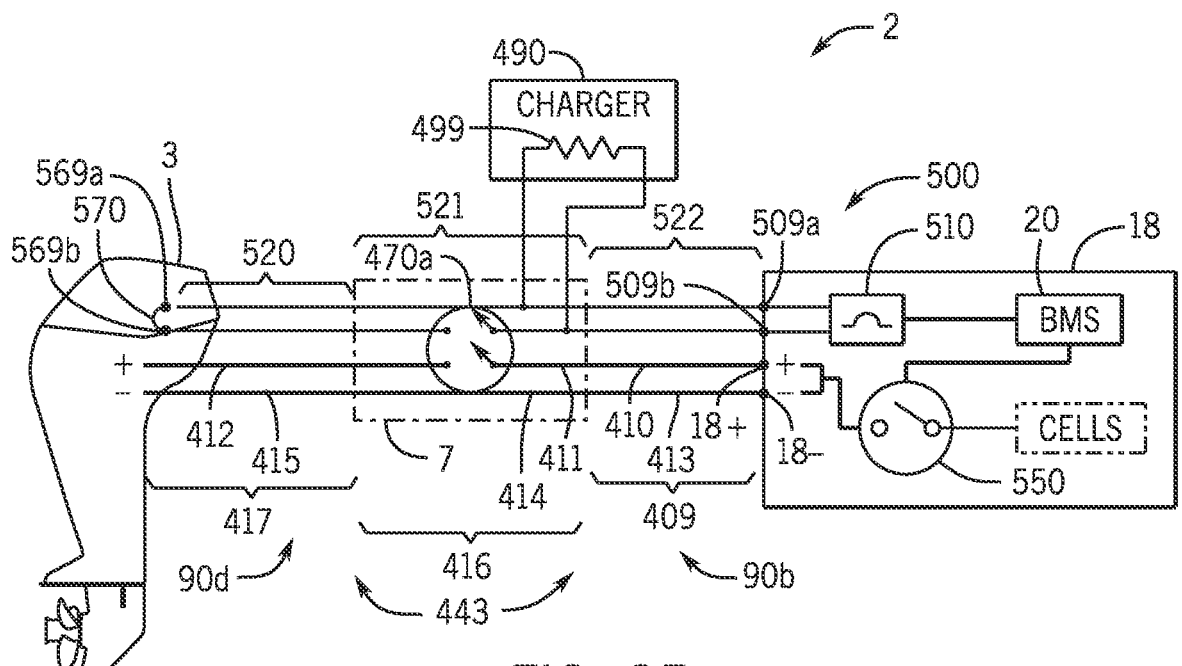

Referring again to FIG. 20, the switch box 7 and connection cables 90b and 90d enable completion of a power circuit 443 which delivers power and sufficiently high current levels from the one or more connected batteries 18a-18d to power the marine drive 3. In this example, the power circuit 443 includes a battery power circuit portion 409, a drive power circuit portion 417, and a switch box power circuit portion 416 connecting therebetween. As also shown in FIG. 25, the battery power circuit portion 409 includes sets of positive power connection legs 410 and ground power connection legs 413 (one set housed in each connection cable 90b) between each marine battery 18a-d and the switch box 7. More specifically, each positive power connection leg 410 connects from one of the positive battery terminals 18a+ through 18d+ to a positive power pin in a respective switch box port 418a-d and each ground/negative power connection leg 413 connects from one of the negative battery terminals 18a− through 18d− to a ground power pin in the respective switch box port 418a-d. The drive power circuit portion 417 includes a positive power connection leg 412 and a ground power connection leg 415 connecting between sets of positive power pins and between sets of negative power pins, respectively, on the switch box ports and drive ports (and ultimately to the positive power input 4+ and the negative power input 4− to the motor 4).

Where switch box 7 is included to connect a plurality of batteries 18a-d, the switch box 7 houses the switch box power circuit portion 416 that connects the drive power circuit portion 417 and the battery power circuit portion 409. However, as explained above, the system is configured to also enable direct connection of a marine drive 3 to a single battery 18. Also referencing FIG. 24, where the switch box is eliminated, the power circuit 443 includes overlapping power and drive circuit portions, where one cable 90b,d connects the positive and negative pins on the drive 3 (and ultimately the positive and negative inputs 4+ and 4− on the motor 4) to the positive and negative battery terminal 18+ and 18−, respectively.

Returning to FIGS. 20 and 25, the switch box power circuit portion 416 includes a positive power connection 411 and a ground power connection 414. The positive power connection 411 in the switch box 7 connects between the plurality of positive power connection legs 410 and the positive power connection leg 412. The plurality of plurality of positive power connection legs 410 are joined together within the switch box 7, electrically connected at power block 420. Power block 420 electrically connects to each of the positive power connection terminals 400h (when connector 400 is plugged into the respective port 418a-d) leading from the plurality of batteries 18a-d into one positive power connection output.

Figure 26:
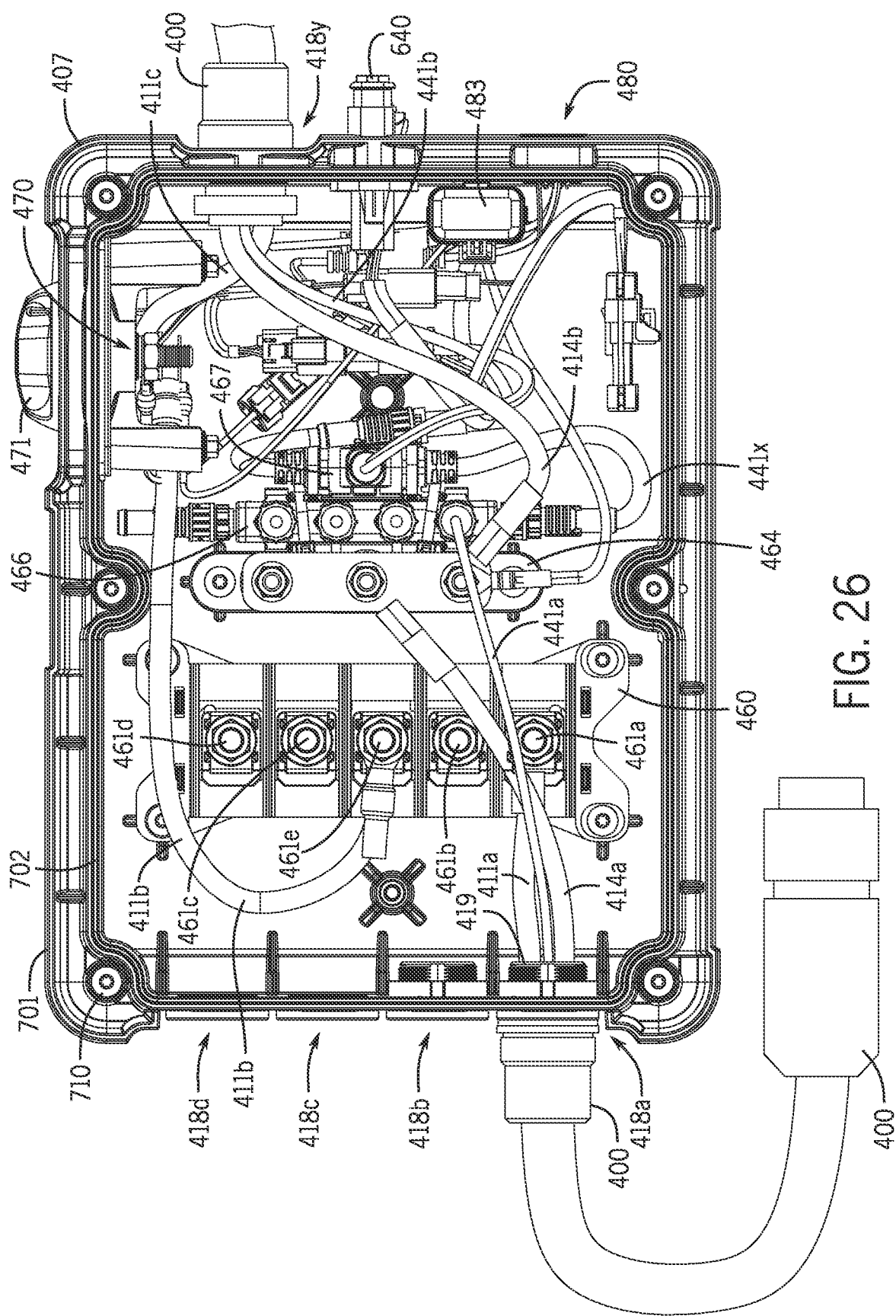
FIGS. 26-27 are is are interior views of an exemplary switch box for a marine device of the electric marine propulsion systems of the present disclosure.

Referring also to FIG. 26, an interior view of the switch box 7 is shown with the first cover piece 407x removed. As shown here, the power block 420 includes a fuse bus 460 that includes a bus bar with a fuse connecting to each switch box port 418, including each port 418a-d providing a battery connection and each port 418y providing a drive connection. Thus, in this example where the switch box 7 is configured to provide parallel connections for up to four batteries 18a-d, the fuse bus includes five fuses 461a-e. Fuses 461a-d each connect to the positive power input from batteries 18a-d through switch box ports 418a-d. For visual clarity, FIG. 26 shows connection of only one connector, connector 419a of port 418a, which is connected to the fuse bus 460 via positive power connection portion 411a. Each remaining port 418b-d has a mating connector identical to connector 419a (not shown for visual clarity) that connects to a respective fuse 461b-d on the fuse bus 460. A fifth fuse 461 connects to output switch box port 418y via providing the output connection to the marine drive 3 via positive power connection portions 411b and 411c. As explained further below, positive power connection portions 411b and 411c are connected/disconnected by a user-operated switch 470.

The ground power connection 414 in the switch box 7 connects the plurality of ground power connection legs 413 to the ground power connection leg 415 via ground block 421. Ground block 421 includes ground bus bar 464 that electrically connects each of the ground terminals 400g (when connector 400 is plugged into the respective port 418a-d) together to one ground output to the dedicated switch box port 418y for the drive. Again, only one connector is shown for visual clarity, connector 419a of port 418a, which is connected to the ground bus bar 464 via ground power connection portion 414a. Each remaining port 418b-d is also connected to the ground bus bar 464, which in turn connects to ground power connection portion 414b leading to switch box port 418y.

A user-operable switch 470 is positioned in the positive power connection 411, positive power connection portions 411b and 411c to enable a user to disconnect the power circuit 443. For example, the user-operable switch 470 is a switch configured to provide a central connection/disconnection point for the power circuit 443 (and also, as explained more below, the interlock circuit). In the depicted embodiment, the user-operable switch 470 is a two-position rotary switch having a knob 471 on the exterior of the housing 407 movable by a user between an "ON" position and an "OFF" position (see FIG. 21). In other embodiments, the user-operable switch 470 may be a different type of switch mechanism, such as a button, a slider, etc.

Referring again to FIG. 20, the switch box 7 enables a central location for charging all of the connected marine batteries 18a-d. Charging port 480 in the switch box housing 407 is configured to receive a battery charger connector, such as a battery charger 490 connected to 120V AC grid power, or any standard shore power or wall power supply. The charging port 480 is connected to the charger block 423. Referring also to FIG. 26, the charger block 423 includes fuse block 483 providing fuses for isolation of the charger. Each battery 18a-d also has a charging port 481 (see FIGS. 18 and 20) configured to receive the same battery charger connector such that the charger 490 can connect directly to any of the batteries 18a-d. As shown in described in more detail below with respect to the interlock circuit, the system 2 is configured such that the user-operable switch 470 must be open (in the "OFF" position) for charging current to be delivered to the batteries 18a-d.

As shown in FIGS. 21-23, the switch box 7 may include a bracket 600 configured to enable mounting the switch box 7 at any location on the marine vessel, such as under a seat, on a floor surface of the vessel 1 (as shown in FIG. 1), on a sidewall surface of the vessel 1, etc. The bracket 600 includes a plurality of flanges 610 with holes 611 configured to be screwed or otherwise fastened to a surface. The bracket 600 is configured to securely hold the housing 407 in place, covering at least a portion of three sides 407a,d,f thereof. In some embodiments, the bracket 600 and housing 407 may be configured such that the housing 407 can be oriented in either direction in the bracket 600 (i.e., the planar side 601 can contact the first side 407a or the second side 407b) to allow maximum flexibility for mounting the switch box 7. Alternatively, the switch box 7 may simply be set in the vessel during use and may be carried on and off the vessel 1 with each use. In some embodiments, the housing 407 or the bracket 600 may be configured with a handle to facilitate easy carrying.

Referring again to FIG. 20, signal circuit 444 communicates data between the battery control systems 20a-d and the central controller 12, such as configured as a CAN bus connection. Signal circuit 444 also includes the interlock circuit, as described in more detail below. Signal circuit 444 is formed by signal connection legs 440 connecting between each of the batteries 18a-d, signal connection leg 441a-b in the switch box, and signal connection leg 442 connecting to the marine drive 3. Each of signal connection legs 440 and 442 is housed in a respective connection cable 90b,d, which as described above is a multi-wire and multi-pin connection for power and signal (data and interlock). The switch box 7 houses signal connection leg 441a-b between each of the switch box ports 418a-d and switch box port 418y. Signal connection portion 441a connects between connector 419a of port 418a (again, only one connector is shown for visual clarity) and signal block 422, thus connecting each of the signal terminals 400a-f (when connector 400 is plugged into the respective switch box port 418a-d) to a junction point. Referring also to FIG. 26, signal block 422 includes a CAN bus junction 466 and a breakout connection 467. CAN bus junction 466 is a six-way junction that connects data communication wires (e.g., CAN high, CAN low, CAN ground/reference) and two interlock circuit wires, as well as a shield wire into an output 441x that connects to the breakout connection 467. The breakout connection 467 splits the two interlock circuit wires to connect the interlock circuit 500 (see FIG. 25) to the user-operable switch 470 and the charger port harness, as well as to an auxiliary port 640.

As best shown in FIGS. 21, 23, and 26, the switch box 7 may also include an auxiliary port 640 providing an interface connector for connecting low voltage auxiliary items, such as depth monitors, fish finders, and other electronic devices. The auxiliary port 640 may be configured to deliver a 12 V charge current to connected devices, and in some embodiments may be configured with one or more communication pins, such as configured to communicate on the signal bus (e.g., CAN bus) of the signal circuit.

Figure 27:
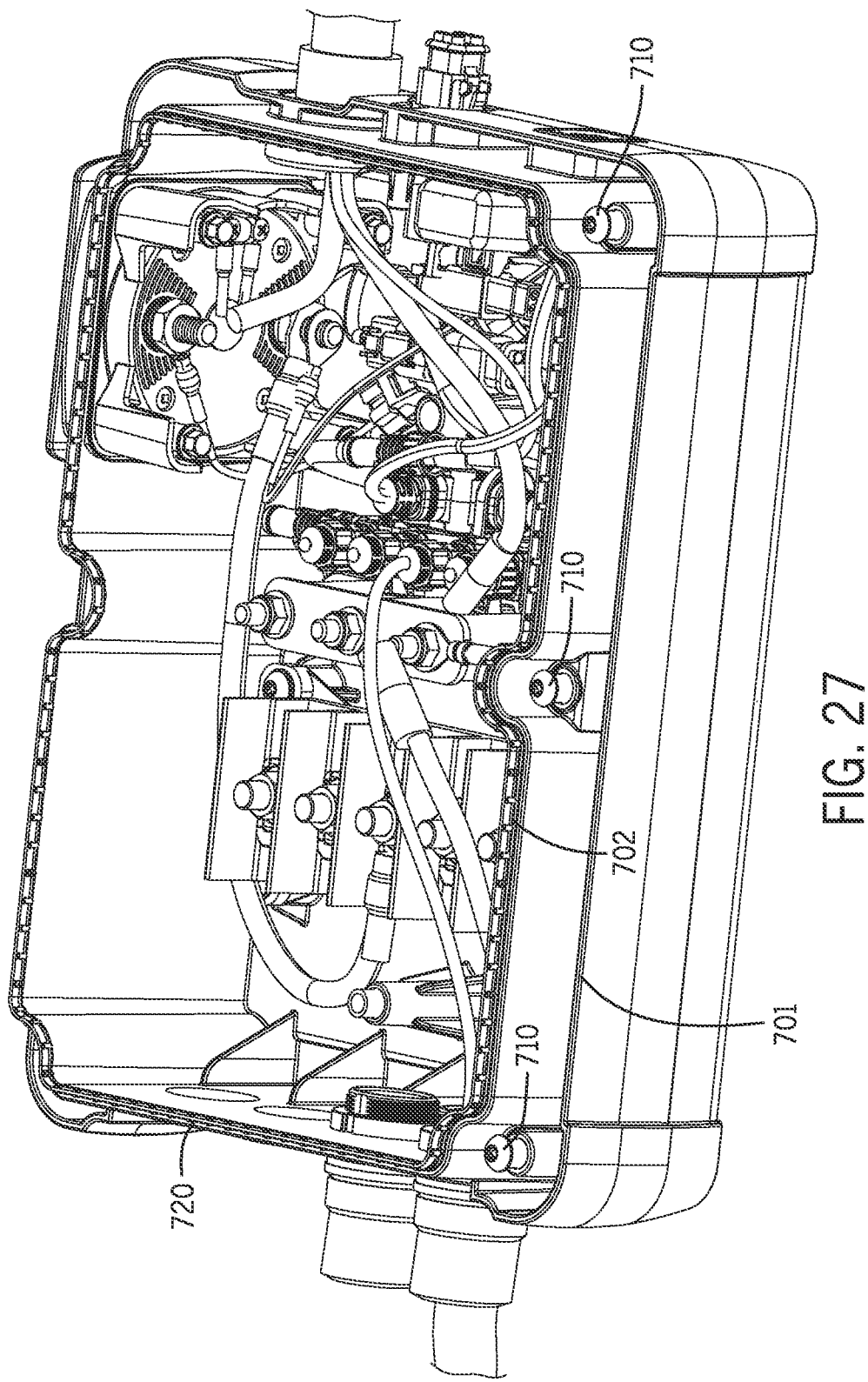

The housing 407 is water-tight and configured to withstand marine environments, and also to provide protection and shock absorption for the electrical elements encapsulated therein. As shown in FIGS. 26 and 27, the housing 407 is double-walled, having an outer wall 701 and an inner wall 702 to provide protection and an attractive outer appearance. The housing 407 is formed by connecting two pieces 407x and 407y, each being double-walled pieces, that are connected by six screws 710. The deeper piece 407y is shown in FIGS. 26 and 27 with the shallower piece 407x removed. Along the inner wall 702 between the two pieces 407x and 407y is a gasket 720 to discourage water ingress through the joint between the two pieces.

The system 2 may include an interlock circuit 500 configured to provide a control signal by which the marine batteries 18a-d can determine an appropriate mode between a power delivery mode, a charge mode, and a disconnected mode and operate an internal disconnect accordingly. The interlock circuit 500 is configured to provide a completed circuit when the at least one battery 18 and the marine drive 3 are connected via connection cable(s) 90b,d (directly or through the switch box 7). FIGS. 24 and 25 depict an exemplary interlock circuit 500 that is adaptable to accommodate a direct connection to a single battery (FIG. 24) or a connection through the switch box 7 (FIG. 25) to enable connection and disconnection of any number of one or more marine batteries 18. The interlock circuit 500 runs parallel to but is independent from the power circuit 443 such that circuits 500 and 443 are not electrically connected. Accordingly, interlock circuit portions run through the connection cable(s) 90b,d incorporated in the system 2. The interlock circuit 500 is configured for lower current than the power circuit 443—e.g., with a lower gauge wire than that of the power circuit 443 which carries a much higher current to power the motor 4.

Each battery control system 20 is configured to measure a resistance of the interlock circuit 500 across the receiving terminals 509a-b at the battery port (e.g., 408a-d in FIGS. 20 and/or 300 in FIGS. 18-19). The receiving terminals 509a-b connect to the two interlock circuit terminals 400a-b in the connection cable 90b connecting to the battery 18, whether directly or through a switch box 7. A resistance measurement unit 510 measures a resistance across the receiving terminals 509a-b and communicates the value to the battery control system 20. For example, resistance measurement unit 510 may be an interlock detection circuit configured to inject a small current into the interlock circuit 500 at a known voltage, and measuring the voltage drop across the interlock sockets 781c-d and 788c-d so as to determine the resistance. The battery control system 20 is configured to perform comparison logic comparing the resistance to one or more thresholds to identify which operation mode—power delivery mode, charge mode, or disconnected mode—is appropriate.

The interlock circuit 500 includes a drive circuit portion 520 and battery circuit portion 522. The battery circuit portion 522 connects to the battery port (e.g., 408a-d in FIGS. 20 and/or 300 in FIGS. 18-19), including the receiving terminals 509a-b. The drive circuit portion 520 connects to the drive port (e.g., 428 in FIGS. 20 and/or 200 in FIGS. 14-15) on the marine drive 3, including the receiving terminals 569a-b. In the depicted embodiment, the drive circuit portion 520 of the interlock circuit 500 terminates in a short 570 between the receiving terminals 569a-b in the drive port. Thus, when the connection cable 90d is connected to the drive port, the drive circuit portion 520 is shorted and adds little to no resistance to the interlock circuit 500. In other embodiments, a resistor of a known fixed resistance may separate the receiving terminals 569a-b at the drive end.

Based on a low measured resistance (or the appropriate known fixed resistance at the drive end) of the interlock circuit 500 by the resistance measurement unit 510, the battery control system 20 determines that the battery 18 and the marine drive 3 are connected together and engages a power delivery mode by controlling the internal disconnect 550 to connect to the power circuit 443—namely, to connect the power storing battery cell(s) to the output terminals 18+, 18−. On the other hand, if the resistance of the interlock circuit 500 is significantly higher (e.g., orders of magnitude greater or more) then the controller determines that the interlock circuit 500 is open, such as because the marine drive 3 and/or the battery 18 are not connected. When the interlock circuit 500 is open, the battery control system 20 engages the disconnected mode where the internal disconnect 550 disconnects the battery cells from the terminals 18+, 18− thereby removing the battery from the power circuit 443.

When the system 2 includes a switch box 7, the interlock circuit 500 includes a switch box circuit portion 521 that connects between the drive circuit portion 520 and the battery circuit portion 522. As shown in FIG. 25, the switch box circuit portion 521 routes through the switch 470a, which here is a double pole double throw switch that simultaneously disconnects both the power circuit 443 and the interlock circuit 500. When the switch 470a is opened, the resistance sensed at the battery end by the resistance measurement unit 510 becomes very high because it is sensing resistance across the open circuit. Based on the sudden drastic change in resistance on the interlock circuit 500, the battery control system 20 knows that the switch 470a has been opened. It then switches to the disconnected mode to disconnect from the power circuit 443.

The interlock circuit 500 may also be configured to enable multi-battery charging though the switch box 7. The battery charger 490 may be configured to connect to the interlock circuit 500 such that its connection to the charging port 480 (see FIGS. 20 and 26) can be detected by the battery 18 (or all connected batteries 18a-d) to enable charging. Thus, the battery charger has a connector (not shown) configured with pins for the interlock circuit and the charging port 480 has interlock circuit receptacles, similar to the connectors described above. Here, the charger 490 is configured to connect a predefined charge indicator resistance 499 to the interlock circuit 500, and specifically to the battery circuit portion 522 between the battery 18 and the switch box 7. For example, the charge indicator resistance may be a relatively large resistance value, such as 5 kOhms. Thereby, when the switch 470a is open, the resistance of the interlock circuit 500 measured by the resistance measurement unit 510 is close to or within a range of the predefined charge indicator resistance 499. The battery control system 20 then switches the battery to charge mode enabling the battery 18 to receive a charge current via terminals 18+, 18−. However, when the switch 470a is closed and the interlock circuit 500 is completed between the battery 18 and the drive 3, then the resistance measured by the resistance measurement unit 510 will be low because current will travel the path of least resistance through the short 570. Thus, the battery control system 20 will remain in power delivery mode and will not enable charging even if the battery charger 490 is connected.

Figure 28:
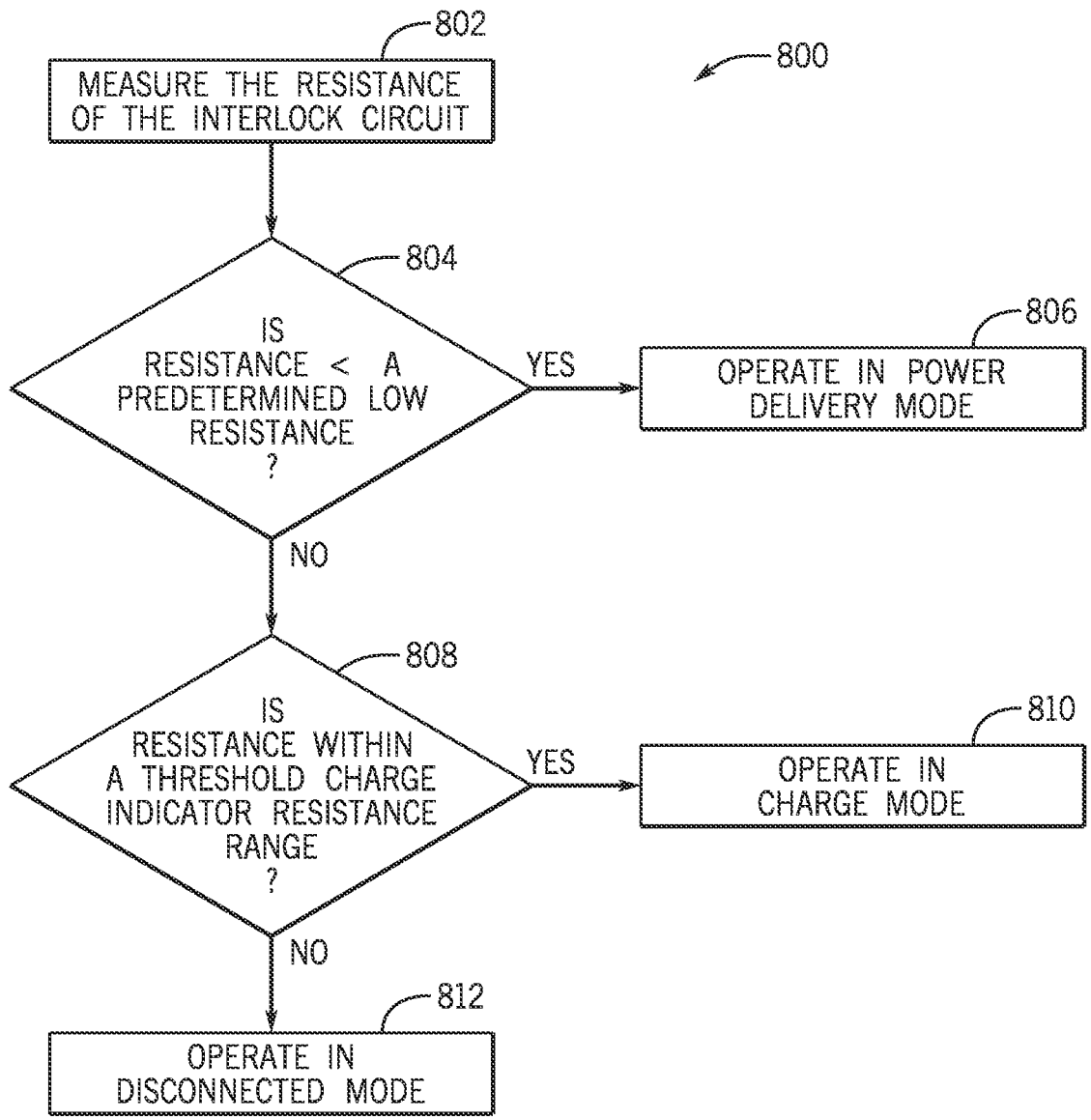
FIG. 28 is a flow chart illustrating one embodiment of a method of controlling a power circuit of an electric marine propulsion system according to the present disclosure.

FIG. 28 depicts one embodiment of a method 800 of controlling a power circuit for an electric marine propulsion system 2, and particularly for controlling connection of one or more batteries to the power circuit 443 with an interlock circuit 500. The resistance of the interlock circuit 500 is measured at step 802, such as by the resistance measurement unit 510 in the battery 18. The resistance is provided to the battery control system 20 which conducts the following comparative logic. If the resistance is less than a predetermined low resistance at step 804, then the battery is operated in the power delivery mode (shown as step 806). For example, the predetermined low resistance may be set based on the expected resistance of the completed interlock circuit 500 when both the marine drive 3 and the battery 18 are connected, allowing for a buffer. Additionally, the predetermined low resistance may be sufficiently below the low end of the threshold charge indicator resistance range such that fluctuations in resistance or measurement error will not erroneously trigger operation in the power delivery mode. To provide one example where the drive end of the interlock circuit 500 is a short 570 or low resistance and the predefined charge indicator resistance 499 is 5 kOhms, the predetermined low resistance may be 500 Ohms. Thus, if the resistance measurement unit 510 measures anything less than 500 Ohms then the battery control system operates in the power delivery mode.

If the measured resistance is not less than the predetermined low resistance at step 804, then step 808 is executed to determine whether the resistance is within a threshold charge indicator resistance range. If so, then the controller 20 operates the battery 18 in the charge mode at step 810 enabling receipt of charge current from a battery charger 490. The threshold charge indicator resistance range is a threshold range of resistances that includes the predefined charge indicator resistance 499. Thus, if the battery charger 490 connects to the charging port 480 of the switch box 7 and is configured to connect a predefined charge indicator resistance 499 to the interlock circuit 500, and the drive circuit portion 520 is disconnected, then the measured resistance by the resistance measurement unit 510 will be within range of the predefined charge indicator resistance 499 and the charge mode is triggered. To provide one example where the predefined charge indicator resistance 499 is 5 kOhms, the threshold charge indicator resistance range may be 4 kOhms to 6 kOhms. Thus, if the resistance measurement unit 510 measures a resistance of the interlock circuit 500 that is within that range, then the battery control system operates in the charge mode.

If the resistance is not within the threshold charge indicator resistance range at step 808 (and not less than the predetermined low resistance as described above), then the battery control system 20 operates in the battery 18 in the disconnected mode at step 812 where the battery internal disconnect 550 is controlled to remove the battery 18 from the power circuit 443 such that power delivery from and power receipt to the battery cells are disabled. Thereby, the battery power is conserved, and shock hazards are reduced, when the marine drive 3 is not connected. In the example above, if the resistance measurement unit 510 measures a resistance of the interlock circuit 500 that is greater than 6 kOhms, then the battery control system operates the battery in the disconnected mode.

Figure 29:
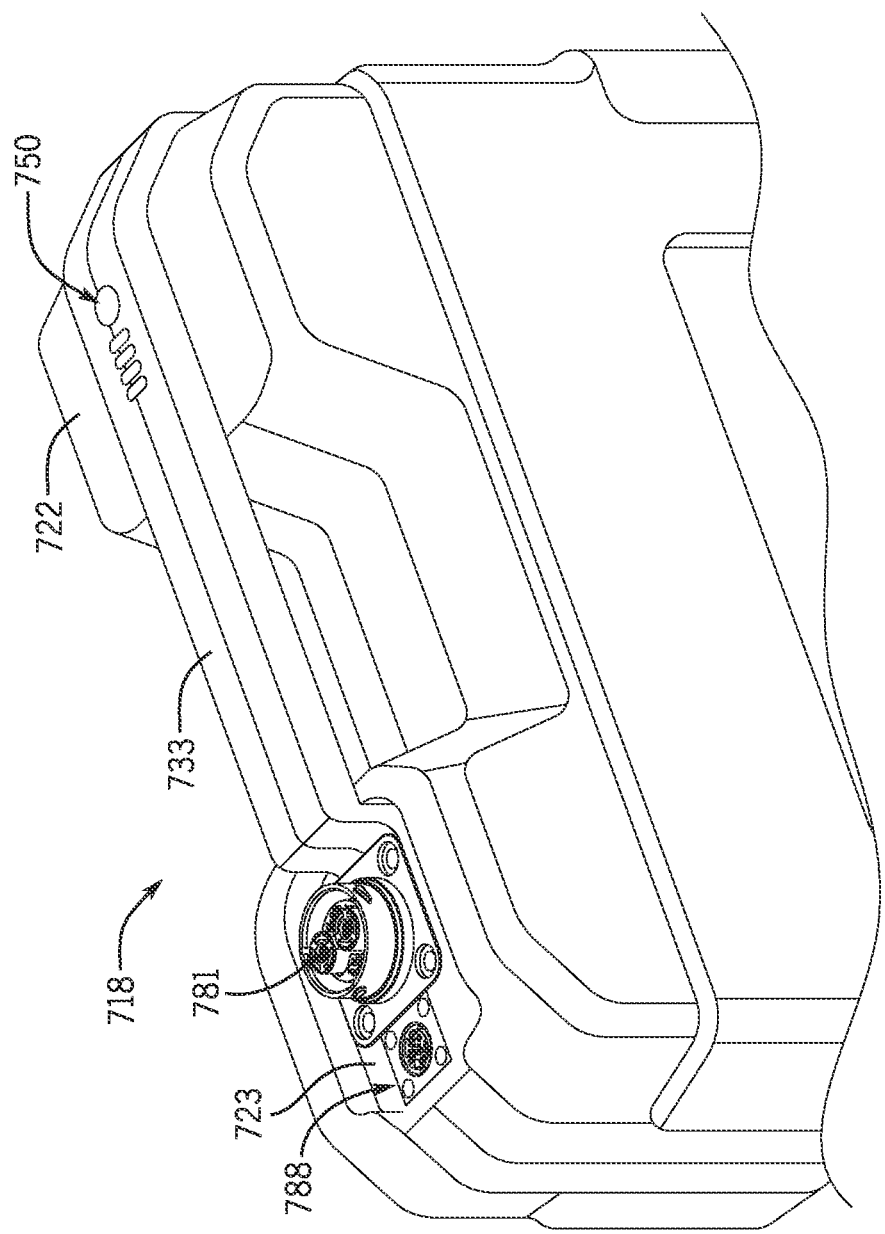
FIG. 29 illustrates another battery according to the present disclosure.

FIG. 29 shows a perspective view of a battery 718 having a bidirectional port 781 and a charge only port 788 on the housing 722. The bidirectional port 781 enables current delivery out of the battery, providing current output to a load from the one or more battery cells within the battery 718. The bidirectional port 781 is configured to provide power and signal sockets housing power and signal pins, respectively, configured to receive and provide power, data, and interlock signal. For example, the bidirectional port 781 may be the battery connector 300 described and shown above, including in FIGS. 18 and 19. A person of ordinary skill in the art will understand in view of the present disclosure that the bidirectional port and corresponding connector may be constructed with a different pin and socket configuration providing power connection and the same or similar signal connections as described above.

The charge only port 788 is configured to provide power sockets for receiving a charge current that is significantly lower that the discharge current provided through the power sockets of the bidirectional port 781, and thus the power sockets and corresponding pins of the charge only port 788 arrangement have a smaller diameter and a lower current rating. The charge only port 788 may have, for example, a six pin arrangement, including two power pins configured to deliver a charge current from a battery charger, two interlock pins configured to connect to an interlock circuit 500, and two data pins such as configured for CAN communication. The bidirectional port 781 and the charge only port 788 are adjacent to one another, positioned next to each other on the top side of the battery housing 722 having the handle 733. More particularly, the ports 781 and 788 are positioned next to one another in a valley 723 in the housing 722. The valley 723 is configured to provide some protection for the ports 781 and 788 and for protecting the connection of connectors mated to the ports. In other embodiments, the ports may be positioned elsewhere on the housing 722 and may be positioned together or separated onto different sides and/or portions of the housing 722. Indicators lights 750 are also located on the top side of the housing 722, such as configured to illuminate in colors and/or patterns indicating operation and operation mode of the battery 718.

Figure 30:
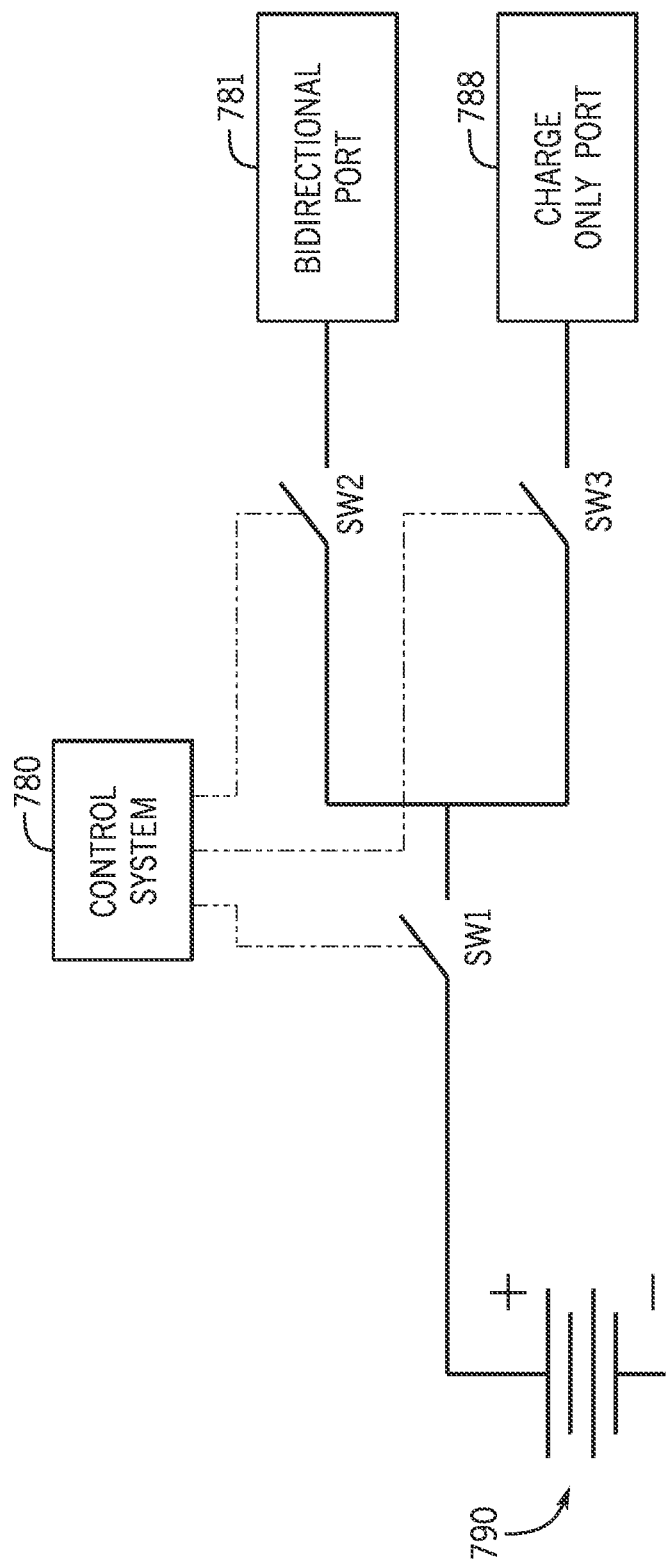
FIG. 30 schematically depicts a plurality of switches for one embodiment of a battery according to the present disclosure.

As described above, the battery 718 is configured to operate in at least three modes, including between a power delivery mode, a charge mode, and a disconnected mode. The battery 718 includes a plurality of switches within the housing 722 and controllable between open and closed states and configured to connect and disconnect each of the ports 781 and 788 from the battery cells within the battery 718. FIG. 30 shows one example where a battery control system 780 controls three switches SW1, SW2, and SW3 to enable or disable current flow between each of the ports 781 and 788 and the one or more rechargeable battery cells 790 (e.g., a cell pack). Here, the main port switch SW2 controls disconnection of the bidirectional port 781 and charge port switch SW3 controls disconnection of the charge only port 788. Switch SW1 commonly controls disconnection of both ports 781 and 788 to disable current flow in at least one direction between the ports 781 and 788 and the battery cells 790.

In the power delivery mode, the battery control system 780 controls the switches SW1-SW3 to permit current flow from the battery cells 790 to the bidirectional port 781 but to prevent current flow from the battery cells 790 to the charge only port 788. This prevents charge accumulation at the power terminals of the charge only port 788 if no connector is connected, and otherwise prevents current flow into any circuit connected to the charge only port 788. In the charge mode, the battery control system 780 controls the switches SW1-SW3 to permit current flow from at least one of the ports 781 and 788 to the battery cells 790. In one embodiment, only one of the bidirectional port 781 and charge only port 788 is permitted to provide charge current to the battery cells 790 to enable control over the charging rate and prevent multiple chargers from feeding charge current to the cells 790 simultaneously. Thus, only one of the switches SW2 or SW3 are activated to allow current flow and the other is open to prevent current from flowing to the inactive one of the ports 781, 788. In the disconnected mode, the battery control system 780 controls the switches SW1-SW3 to prevent any current flow between either of the ports 781 and 788 and the battery cells 790, thus disconnecting the battery 718 from the output terminals and preventing any connection to a load or any power circuit.

The switches SW1-SW3 may be bidirectional switches, such as relays, operable to (i.e., openable to) prevent any current flow between the ports 781 and 788 and the battery cells 790. Alternatively, the switches SW1-SW3 may be unidirectional switches, such as unidirectional MOSFET switches comprising a metal oxide field effect transistor (MOSFET), or other semiconductor devices or arrangements operable to prevent only one direction of current flow. Unidirectional switches may be desirable because it enables control over the direction of current flow. The use of MOSFET switches may be desirable due to space and cost constraints. Where MOSFET switches or other unidirectional switches are used, the arrangement in FIG. 30 has particular benefits in that it provides the ability to disconnect current flow into and out of each port 781, 788 with only three low-cost reliable switches that occupy a small footprint. While the three-switch arrangement shown in FIG. 30 has benefits, particularly where unidirectional switches are used, other switch arrangements may be implemented that enable cutting off current flow to the unused one of the ports 781, 788. In other embodiments, two or four switches (or more than four switches) may be used, depending on the type of switch used—e.g., whether the switch prevents bidirectional current flow or prevents unidirectional current flow. For example, in one embodiment where bidirectional switches such as relays are implemented, two switches may be utilized instead of three, including one at the bidirectional port 781 (SW2) and one at the charge only port 788 (SW3). In such an embodiment, the switch SW3 at the charge only port will be open when the power delivery mode is engaged and when the charge mode is engaged and the charge current is being delivered through the bidirectional port 781. The switch SW2 at the bidirectional port will be open when the charge mode is engaged and a charge current is being delivered through the charge only port 788.

Figure 31:
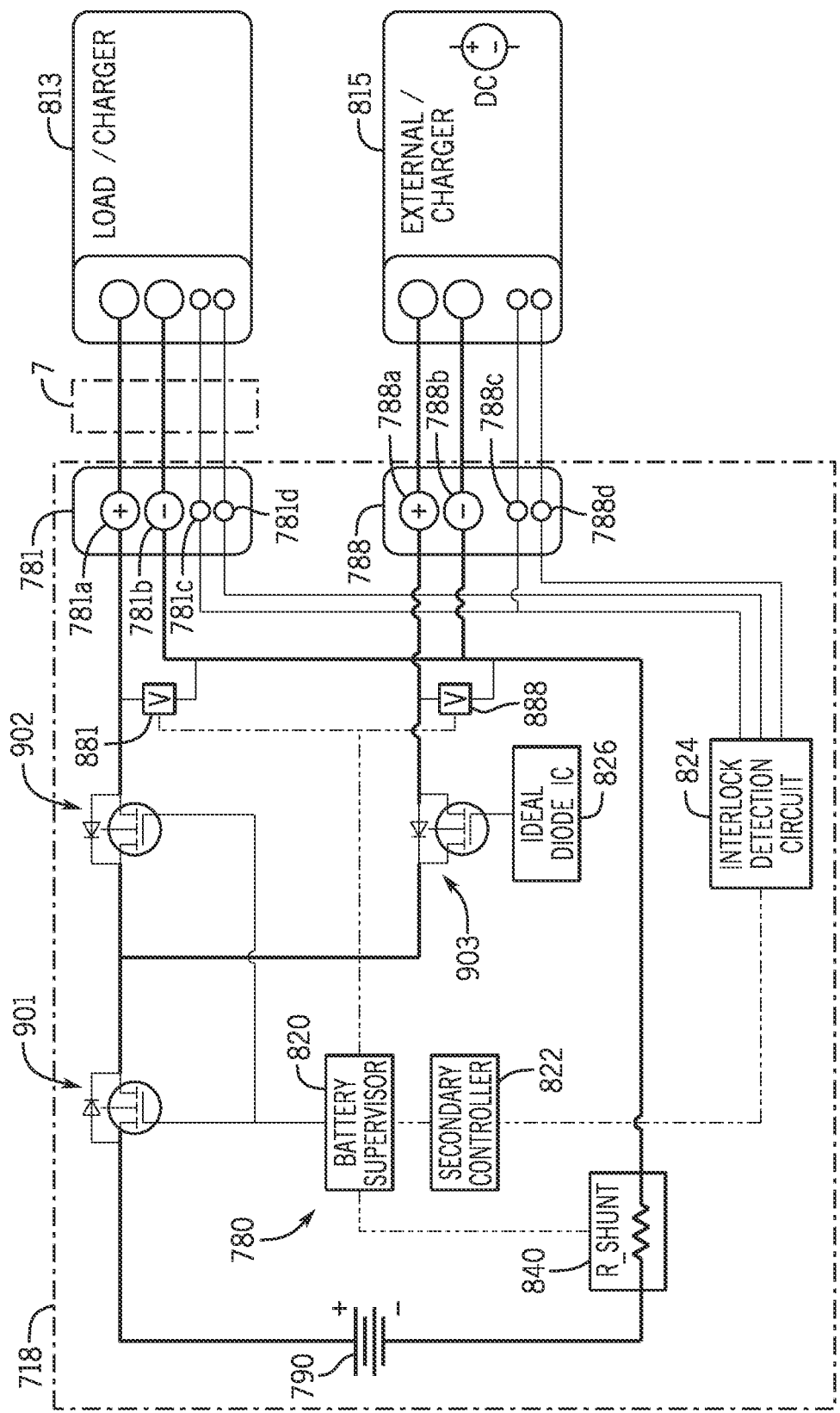
FIG. 31 is a simplified circuit diagram of a system including a battery having a plurality of switches according to an exemplary embodiment of the present disclosure.

FIG. 31 provides one example of a battery 718 where three MOSFET switches 901-903 are positioned in the arrangement depicted in FIG. 30. The diagram illustrates components of the system connectable to the battery 718, including a load/charger 813 which is alternatively a load or a charger connectable to the bidirectional port 781 of the battery 718, which may be through the switch box 7. A battery charger 815 is connectable to the charge only port 788 of the battery 718. Each of the ports 781, 788 includes at least four sockets, including at least two power sockets 781*a-b* and 788*a-b* each configured to mate with power pins in a received connector and at least two interlock circuit sockets 781*c-d* and 788*c-d* configured to mate with interlock circuit pins, as in the examples described above.

Each MOSFET switch 901-903 includes a MOSFET arranged to selectively block current flow towards or out of the battery cells 790 when the switch is open. The switch 901 is configured as a charge enable switch operable to prevent flow of charge current to the battery cells 790. Switch 901 is positioned between both of the ports 781 and 788 and the battery cells 790 such that when it is open (e.g., an enhancement mode MOSFET that is not powered), charge current cannot flow from either port 781, 788 to the battery cells 790 and closing the switch 901 permits charge current to flow from either port 781, 788 to the cells 790. Switch 902, referred to here as the main port switch 902, is positioned between the bidirectional port 781 and the battery cells 790 and oriented such that when it is open, charge current cannot flow to the bidirectional port 781. Switch 903, referred to here as the charge port switch 903, is positioned between the charge only port 788 and the battery cells 790 and oriented such that when it is open, charge current cannot flow out of the charge only port 788. The diodes of the main port switch 902 and the charge port switch 903 will allow charge current to flow through to the battery. However, such current will be blocked by the charge enable switch 901 when it is open.

The battery 718 includes a control system 780, which includes one or more controllers configured to control the charge mode of the battery 718 and thus to control the switches 901-903. The controllers 820, 822, 826 in the battery control system 780 may be communicatively connected and/or some of the controllers may act independently as described below. In the depicted example, the control system 780 includes a main controller 820 (e.g., a battery supervisor) and a secondary controller 822. The secondary controller 822 is configured to receive information regarding the interlock circuit from the interlock detection circuit 824 which is configured to measure a resistance of the interlock circuit, and thus includes a resistance measurement unit as described above. The main controller 820, in conjunction with input from the secondary controller, is configured to control the charge enable switch 901 and the main port switch 902. In addition, the control system 780 includes an ideal diode integrated circuit (idIC) 826 configured to control the charge port switch 903. In contrast to the charge enable switch and the main port switch 902, which are configured to enable current flow in both directions when the switch is closed, the charge port switch 903 is configured to only permit current to flow in one direction—i.e., to only ever permit current to flow in the direction from the charge only port 788 toward the cells 790. The idIC 826 is a standalone IC that blocks reverse current flow toward the charge only port 788.

The battery control system 780 is configured to control the battery mode and battery functions in a way that manages safety and protection of the battery, and is also configured to account for the connection status of each port 781, 788. The battery control system 780 is configured to determine the connection status for each of the bidirectional port 781 and the charge only port 788—i.e., whether a connector is connected to the port and/or whether a permitted load or charge device is connected-based at least in part on a voltage and/or resistance measurements across pairs of sockets in each port 781.

In the depicted example, voltage sensors 881 and 888 are configured to measure the voltage across respective power sockets 781*a-b* and 788*a-b*. When a bidirectional connector gets connected to the bidirectional port 781, the voltage will increase across the power sockets 781*a-b*. Likewise, when a charger connector gets connected to the charge only port 788, the voltage measured across the power sockets 788*a-b* will increase. The voltage measurements by the voltage sensors are received and monitored by the main controller 820, which determines a connected indicator for each port 781 and 788 indicating whether a connector is or is not connected to the respective port. If the voltage measurement for a port 781, 788 exceeds a threshold, then the main controller 820 determines that the connected indicator for that port is "connected"—i.e., that a connector is connected to, or engaged, in the port such that power could be transferred through the port 781, 788. With reference to the embodiments described above, for example, the connected indicator for the bidirectional port 781 indicates whether a connector 100, 400 of a charger or a load is engaged in the port. If the voltage is less than the threshold, then the main controller 820 determines that the connected indicator for the respective port 781, 788 is "disconnected." Alternatively or additionally, the connected indicator may be determined based on the interlock circuit, such as whether a measurable resistance across the interlock sockets 781*c-d* and 788*c-d* is detected.

The connection status of each port may include the connected indicator indicating whether a connector is connected thereto, as well as a permitted load indicator or permitted charger indicator indicating that a permitted device is connected to the charger. In the depicted example, the permitted load indicator or permitted charger indicator is determined for each port 781, 788 based on the resistance measurement for the interlock circuit. For example, the resistance across each of the interlock circuit sockets 781*c-d* and 788*c-d* measured by the interlock detection circuit 824 is compared to one or more thresholds to assess whether the device end of the interlock circuit 500 (see e.g., FIGS. 24-25) provides an expected resistance value. Exemplary logic for such as resistance threshold assessment is described above. For example, a permitted load indicator may be determined for the bidirectional port if the resistance at the interlock circuit sockets 781*c-d* is less than a low resistance threshold. A permitted charger indicator may be determined for the bidirectional port or the charge only port, since a charger can be connected to either port, such as if the resistance at the interlock circuit sockets 781*c-d* or 788*c-d* is within a threshold charge indicator resistance range.

If a connected indicator for one of the ports 781, 788 indicates connection and a permitted load or charger is indicated, then the battery control system 780 will engage the power delivery mode or the charge mode accordingly, and the switches 901-903 are controlled accordingly as described above. The battery control system 780 may be configured to engage the disconnected mode if the connected indicator for both of the ports 781, 788 indicates that no connector is connected or if the permitted load indicator or permitted charger indicator does not indicate that a permitted device is connected. Additionally, the control system 780 may be configured to engage the disconnected mode if the connected indicator for both ports 781, 788 indicates that both ports are connected. In other words, if a connector is engaged at each of the bidirectional port 781 and the charge only port 788, then the control system 780 engages the disconnected mode and opens all three switches 901-903 to disable charge and discharge of the battery. Thereby, the control system 780 is able to ensure protection of the battery, including being able to control the charge rate of the battery by only enabling connection of one charger at a time and including ensuring that a charger 815 connected to the charge only port 788 is not delivering charge current when the power delivery mode is engaged (and thus the switches 901 and 902 are closed).

The battery control system 780 may also be configured to control the switches 901 and 902 based on current flow measured in the battery 718, which in the depicted embodiment is at the shunt resistor 840. When the current flow reaches a threshold level, and depending on the mode and which port is being used (e.g., based on the connected indicators described above), the main controller 820 will close one or both of the switches 901 and 902 to enable power transfer (charge or discharge) without incurring a voltage drop over the diodes. In the power delivery mode, for example, the control system 780 may close both switches 901 and 902 (not just the main port switch 902) to avoid a voltage drop over the diode of charge enable switch 901. In the charge mode where the bidirectional port 781 is being used for charging, the control system 780 may close both switches 901 and 902 (not just the charge enable switch 901) to avoid the voltage drop over the diode of the main port switch 902.

Figure 32:
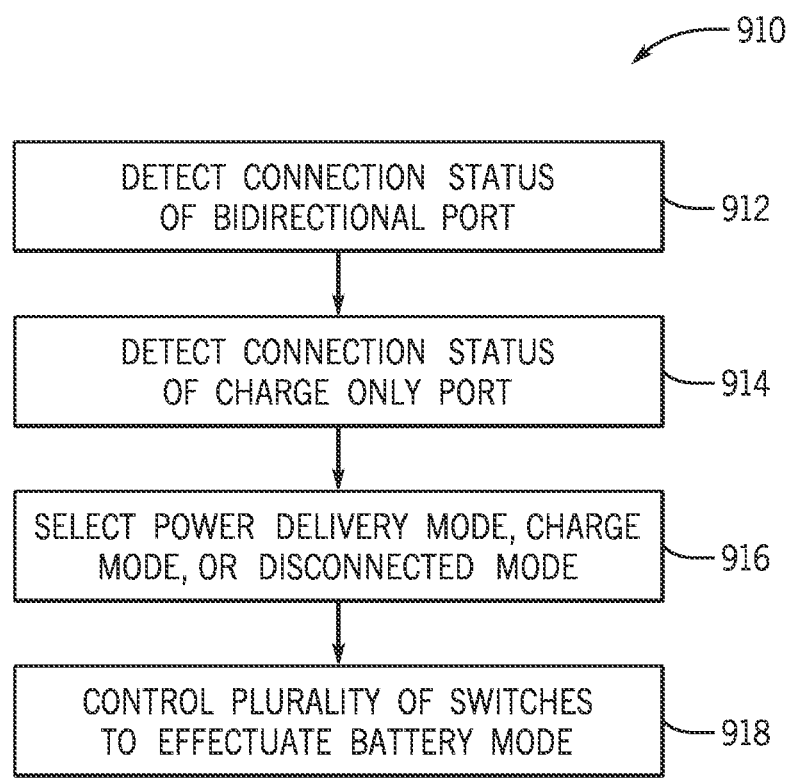
FIGS. 32-34 are a flow diagrams illustrating embodiments of a method of controlling charging of a battery according to an embodiment of the present disclosure.
Figure 33:
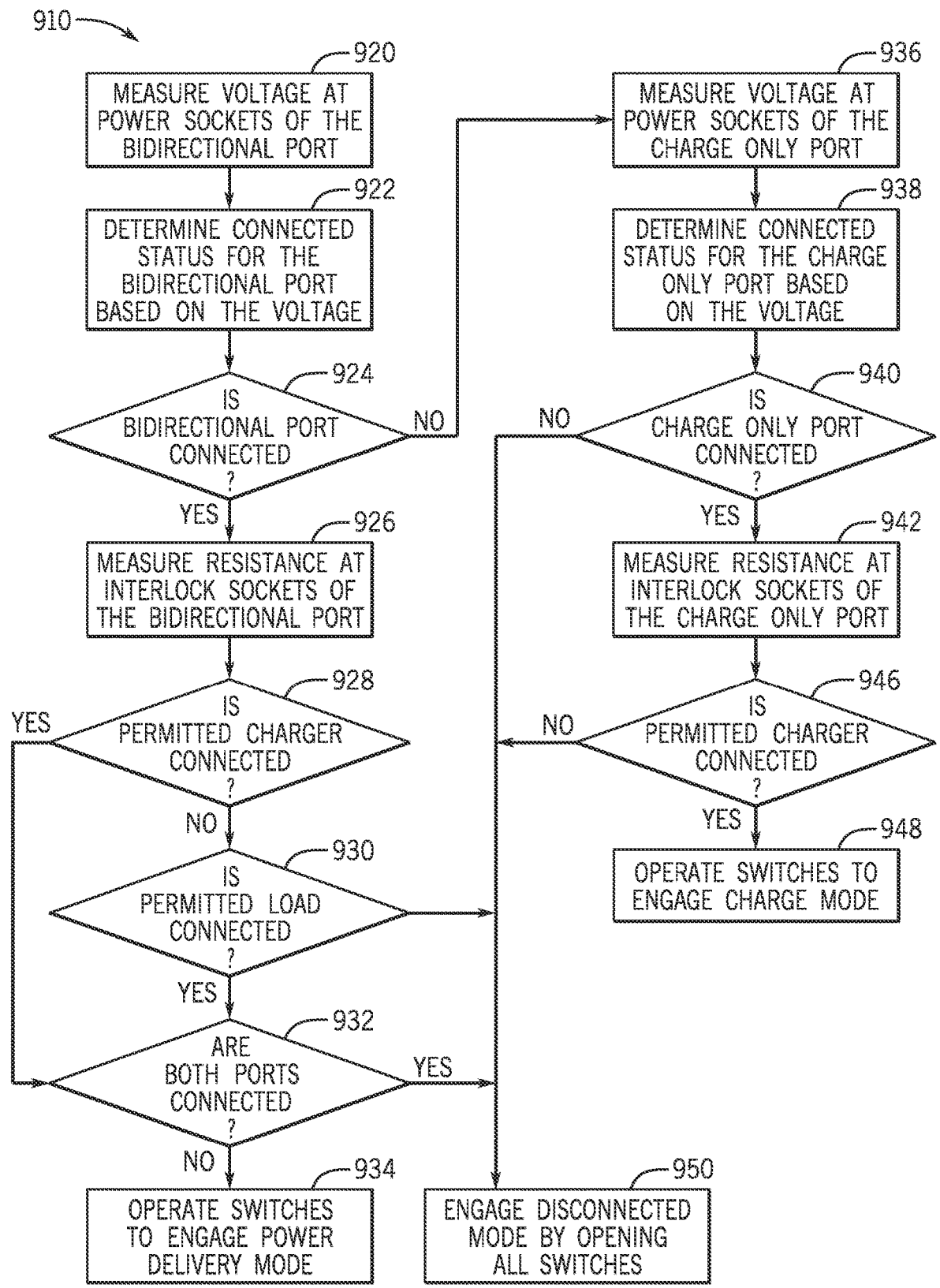

FIGS. 32 and 33 are flow charts demonstrating embodiments of methods of controlling charging of the battery 718 with a bidirectional port 781 and a charge only port 788. Turning first to FIG. 32, the connection status of the bidirectional port is detected at step 912, such as whether that port 781 is connected to something and whether that something is a load or a charger. The connection status of the charge only port 788 is detected at step 914, such as whether that port 788 is connected to a charger. For example, the battery control system 780 may be configured to detect the connection status of the bidirectional port 781 and the charge only port 788 based on at least one of a resistance measurement across two sockets 781*a-d* and 788*a-d* in each of the of the bidirectional port and the charge only port and a voltage measurement across two sockets in each of the of the bidirectional port and the charge only port. An operation mode is selected for the battery at step 916 based on the connection status of each of the ports 781 and 788, such as selecting one of the power delivery mode, the charge mode, and the disconnected mode. The plurality of switches are then controlled at step 918 to effectuate the selected battery mode, and thus to discharge of the battery in power delivery mode, intake of charge current in charge mode, or disconnection of the battery cell pack 790 from the ports 781, 788.

FIG. 33 depicts another embodiment of a method wherein the connection status of each port 781, 788 are detected based on voltage and current measurements at that port and the mode is selected accordingly. A voltage differential across the power sockets 781*a-b* at the bidirectional port 781 is measured at step 920. A connection status of the bidirectional port is then determined at step 922 based on the voltage, such as by comparing the voltage to a voltage threshold indicating that the power sockets 781*a-b* are connected to a power circuit. The connection status is assessed at step 924. If the bidirectional port is connected, then further analysis is conducted to assess what device is connected. If the bidirectional port is not connected at step 924, then the logic proceeds to step 926 and begins assessing the charge only port 788.

Assuming that the bidirectional port 781 is connected, step 926 is executed to measure the resistance across the interlock circuit pins 781*c-d*, which provides the resistance of the interlock circuit 500. As described above, the interlock circuit is designed to include predefined resistances in each of a permitted load (e.g., short circuit 570 in marine drive 3) and a permitted charger (e.g., 500 kOhm or other predefined large resistance 499 in charger 490). Accordingly, step 928 is executed to determine whether a permitted charger is connected based on the measured resistance, such as whether the measured resistance is within a threshold charge indicator resistance range. If not, then step 930 is executed to determine whether the measured resistance indicates that a permitted load is detected, such as whether the measured resistance is less than a predetermined low resistance or within some range associated with the predefined resistance of a permitted load. If a permitted charger is detected at step 928 or a permitted load is detected at step 930, then step 930 is executed to make sure that the charge only port 788 is not connected. If both ports are connected, then the disconnected mode is engaged to protect the battery 718 and to prevent unintended current backflow through either port 781, 788. Thereby, the logic is configured to allow connection to and power exchange with only one device to one port at a given time. Provided that both ports are not connected at step 932, then the plurality of switches SW1-SW3 or 801-803 are controlled at step 934 to engage the power delivery mode. If the bidirectional port 781 is connected but neither a permitted charger or a permitted load are detected, then the battery engages the disconnected mode at step 950 such that it does not permit any power transfer with the non-permitted device. For example, engaging the disconnected mode may include opening all of the switches SW1-SW3 or 801-803.

Assuming that the bidirectional port 781 has a "disconnected" status at step 924, then the voltage across the power sockets 788*a-b* is measured at step 936 and the connected status is determined at step 938 for the charge only port 788. If the charge only port 788 is also disconnected, then the disconnected mode is engaged at step 950. If the charge only port is connected at step 940, then the resistance at the interlock circuit sockets 788*c-d* is measured at step 942. The resistance is compared to one or more thresholds at step 946 to determine whether the permitted charger is connected. If not, then the disconnected mode is engaged at step 950. If a permitted charger is connected, then the charge mode is engaged at step 948. For example, the switches SW1-SW3 or 901-903 are operated to permit flow of charge current from the charge only port 788 to the cell pack 790 and to prevent backflow of current to the bidirectional port 781, as described above.

Figure 34:
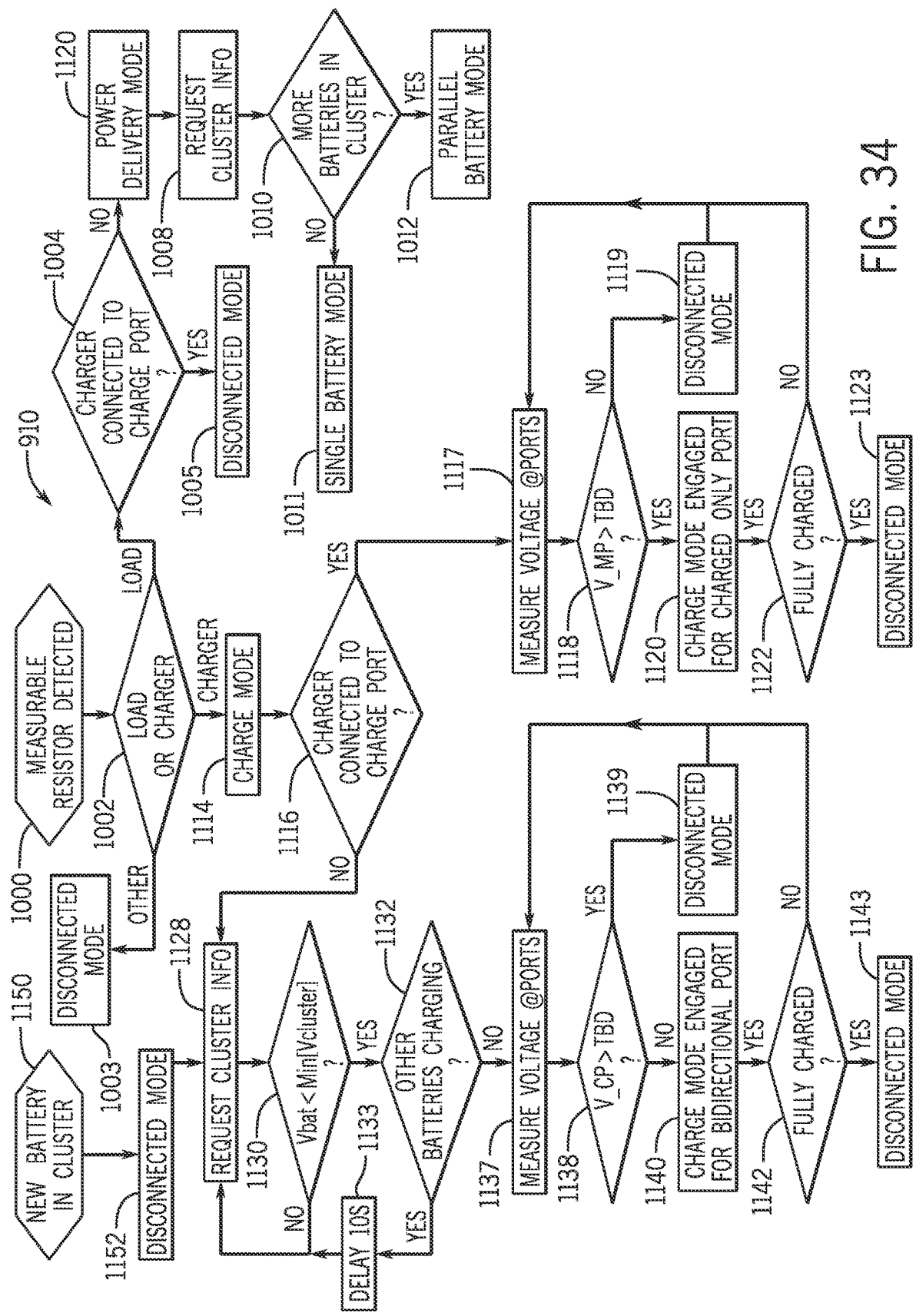

FIG. 34 depicts another embodiment of a method 910 for mode selection, wherein the connection status of each port 781, 788 are detected based on voltage and current measurements at each port and the battery selects its mode accordingly. Thereby, determination of connection of a proprietary device configured to connect to the interlock circuit 500 is prioritized in the connection status detection logic. In this embodiment, the connection status is initially determined based on resistance across the interlock sockets 781*c-d* and 788*c-d*. The method 910 is initiated at step 1000 when the connected status for the bidirectional port 781 or the charge only port 788 becomes "connected"—i.e., a device is connected by a connector engaged in the port 781. For example, the "connected" status may be identified when a measurable resistance is detected across the interlock sockets 781*c-d* and 788*c-d*. Alternatively, the connected indicator may be determined based on a voltage measurement across the power sockets as described above. Step 1002 is then executed to determine whether a load or a charger are connected, such as based on comparison of the measured resistance of the interlock circuit to one or more thresholds as described above. If a load is connected (e.g., the resistance of the interlock circuit is less than a predetermined low resistance), then it is assumed that the port is the bidirectional port 781 and step 1004 is executed to check whether the charge only port 788 is also connected. Namely, if the connected indicator for the charge only port 788 indicates a connection (and thus connectors are in both ports 781, 788), then an error is detected and the disconnected mode is engaged.

If the connected indicator for the charge only port 788 indicates that there is not a connection there, then the power delivery mode is engaged at step 1006 to begin providing power to a load, such as a marine drive 3 (or other permitted load) that is detected based on the interlock circuit—i.e., detection of a specified resistance. Here, steps are then executed to determine whether the battery executing the logic is the only one present, or whether one or more additional batteries (e.g., 18b-d) are present. Battery information is requested at step 1008. Namely, charge level and mode information is communicated between the batteries so that power provision operations can be coordinated as necessary. If other batteries are present at step 1010, then the parallel battery power delivery mode is engaged at step 1012. If no other batteries are present, then the single battery power delivery mode 1011 is engaged.

Returning to step 1002, if the resistance of the interlock circuit does not fall within any of the expected ranges for a permitted load or a permitted charger, then the battery is not mated and is maintained in disconnected mode at step 1003. If, on the other hand, a charger is detected based on the interlock circuit (e.g., the measured resistance of the interlock circuit is within the threshold charge indicator resistance range described above), then a permitted charger is determined to be mated at step 1114. Logic is then executed at step 1116 to determine which port is connected to a charger. If the charge only port 788 is connected, then a check is performed to ensure that the bidirectional port 781 is not also connected. Here, the voltage across sockets (e.g., power sockets 781a-b) in the bidirectional port 781 is measured at step 1117 and logic is performed at step 1118 to determine whether the bidirectional port 781 is also connected (e.g., the voltage across the power sockets 781a-b is non-zero and within an expected range for connection to a charger (or a load)). If so, then both ports 781 and 788 are connected and the disconnected mode 1119 is engaged to protect the battery 18. Assuming that the bidirectional port 781 is not also connected, then the charge mode is engaged at step 1120 where charging is performed via the charge only port 788—e.g., the switches SW1 and SW3 are operated to accept a charge current from the charge only port 788 to the battery cell pack 790 and SW2 is open to prevent current flow to the bidirectional port 781. Logic is performed at step 1122 to assess the charge state of the battery. Provided that the bidirectional port 781 remains disconnected, then charging continues via the charge only port 788 until the battery is fully charged at step 1122, at which point the disconnected mode is engaged at step 1123.

Returning to step 1116, if the interlock circuit connection indicator assessment indicates that the charge only port 788 is not connected, then the bidirectional port 781 is determined to be the port connected for charging. Here, steps are executed to determine whether the battery executing the logic is the only one present or whether one or more additional batteries (e.g., 18b-d) are present and whether this battery is at or below the charge level of the other batteries. Battery information is requested at step 1028. Namely, charge level and mode information is communicated between the batteries so that charging operations can be coordinated as necessary. Logic is performed at step 1130 to determine wither this battery's charge level (e.g., SOC, battery voltage level, etc.) is less than or equal to any other battery reporting in the group that is not disconnected. Only the battery or batteries with the lowest charge levels will be operated in charging mode to avoid current flow between batteries 18a-d connected in parallel. Logic is then executed at step 1132 to double check that there are no other batteries already charging (i.e., in charge mode) that have a higher charge level. If so, then a delay is engaged before requesting and reassessing the cluster information from the other batteries.

If no other batteries with a higher charge level are present at step 1032, then then a check is performed to ensure that the charge only port 788 is not also connected. Here, the voltage across sockets (e.g., power sockets 788a-b) in the charge only port 788 is measured at step 1137 and logic is performed at step 1138 to determine whether the charge only port 781 is also connected (e.g., the voltage across the power sockets 788a-b is non-zero and within an expected range for connection to a charger (or a load)). If so, then both ports 781 and 788 are connected and the disconnected mode 1139 is engaged to protect the battery 18. Assuming that the charge only port 788 is not also connected, then the charge mode is engaged at step 1140 where charging is performed via the bidirectional port 781—e.g., the switches SW2 and SW3 are operated to accept a charge current from the port 781 to the battery cell pack 790 and SW1 is open to prevent current flow to the charge only port 788. Logic is performed at step 1142 to assess the charge state of the battery. Provided that the charge only port 788 remains disconnected, then charging continues via the bidirectional port 781 until the battery is fully charged at step 1142, at which point the disconnected mode is engaged at step 1143.

If a new battery 18 is connected in parallel at any time during the above-described process (e.g., connected to the switch box 7), then upon connection detected at step 1150 all batteries in the cluster may be pulled out of their existing modes and the mode logic may be reperformed to guarantee safe and proper operation of the batteries 18a-d. For example, additional battery detection may be based on information communicated between the batteries (e.g., via CAN), and the batteries may be configured such that when a new battery is added it communicates a message and/or when any one battery sees a new battery it communicates a notice to all of the other batteries. The mode reassessment may be performed quickly so that no noticeable disruption to battery operation is detected by the user.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings and can include electrical couplings. "Electrical" couplings or connections can include, but are not limited to, power and signal connections.

In the present description, certain terms have been used for brevity, clarity, and understanding. No unnecessary limitations are to be implied therefrom beyond the requirement of the prior art because such terms are used for descriptive purposes only and are intended to be broadly construed. It is to be understood that the invention is not limited in its application to the details of construction and the arrangement of components set forth in the foregoing description or illustrated in the drawings. The invention is capable of other embodiments and of being practiced or of being carried out in various ways. The different assemblies described herein may be used alone or in combination with other systems. Various equivalents, alternatives, and modifications are possible within the scope of the appended claims. The methods herein are not limited to being performed in the order described and could be performed in any logical order.

We claim:

1. A marine battery configured to removably connect to a load to power at least one electric motor, the marine battery comprising:
   at least one battery cell;
   a bidirectional port configured to provide current output to the load from the at least one battery cell and to receive a charge current from a battery charger to charge the at least one battery cell;
   a charge only port configured to receive charge current from the battery charger to charge the at least one battery cell;
   a plurality of switches positioned between the bidirectional port, the charge only port, and the at least one battery cell; and
   a battery control system configured to detect a connection status of at least one of the bidirectional port and/or the charge only port and, based on the connection status, to control the plurality of switches to transition the marine battery between a power delivery mode where current can flow from the at least one battery cell out of the bidirectional port, a charge mode where current can from the bidirectional port or the charge only port to the at least one battery cell, and a disconnected mode where current cannot flow between the bidirectional port or the charge only port and the at least one battery cell.

2. The marine battery of claim 1, wherein the battery control system is further configured to:
   enable the power delivery mode only if the connection status of the bidirectional port is connected and the connection status of the charge only port is disconnected; and
   enable the charge mode only if the connection status of only one of the bidirectional port and the charge only port is connected.

3. The marine battery of claim 1, wherein the battery control system is further configured to enable the disconnected mode if the connection status of the bidirectional port is disconnected and the connection status of the charge only port is disconnected or if the connection status of the bidirectional port is connected and the connection status of the charge only port is connected.

4. The marine battery of claim 1, wherein the battery control system is configured to detect the connection status of the bidirectional port and the charge only port based on at least one of a resistance measurement across sockets in each of the of the bidirectional port and the charge only port and a voltage measurement across sockets in each of the of the bidirectional port and the charge only port.

5. The marine battery of claim 4, wherein the connection status of the bidirectional port is based on a connected indicator indicating whether a connector is or is not connected to the bidirectional port, and a permitted load indicator indicating whether a permitted load is or is not connected to the bidirectional port or a permitted charger indicator indicating whether a permitted charger is or is not connected to the bidirectional port, and wherein the connection status of the charge only port includes a connected indicator indicating whether a connectors is or is not connected to the charge only port and a permitted charger indicator indicating whether a permitted charger is or is not connected to the charge only port.

6. The marine battery of claim 4, wherein each of the bidirectional port and the charge only port include two power sockets configured to receive two power pins from a respective connector, and wherein the battery control system is configured to determine the connection status for each of the bidirectional port and the charge only port based at least in part on a voltage measurement across the respective power sockets.

7. The marine battery of claim 4, wherein each of the bidirectional port and the charge only port include two interlock circuit sockets configured to receive two interlock circuit pins from a respective connector to connect to an interlock circuit, and wherein the battery control system is configured to determine the connection status for each of the bidirectional port and the charge only port based at least in part on a resistance measurement across the respective interlock circuit sockets.

8. The marine battery of claim 1, wherein the plurality of switches comprises three unidirectional switches, including a main port switch operable to prevent current flow out of the bidirectional port, a charge port switch operable to prevent current flow out of the charge only port, and a charge enable switch operable to prevent current flow to the at least on battery cell.

9. The marine battery of claim 8, wherein each of the three unidirectional switches is a MOSFET.

10. The marine battery of claim 1, wherein the load is a marine drive comprising an electric motor powerhead.

11. A rechargeable marine battery system configured to removably connect to a load comprising at least one electric motor, the system comprising:
    a plurality of marine batteries each marine battery comprising:
      at least one battery cell;
      a bidirectional port configured to provide current output to the load from the at least one battery cell and to receive a charge current from a battery charger to charge the at least one battery cell in the marine battery;
      a charge only port configured to receive charge current from the battery charger to charge the at least one battery cell;
      a plurality of switches positioned between the bidirectional port, the charge only port, and the at least one battery cell; and
      a battery control system configured to detect a connection status of at least one of the bidirectional port and the charge only port and, based on the connection status, to control the plurality of switches to transition the marine battery between a power delivery mode where current can flow from the at least one battery cell out of the bidirectional port, a charge mode where current can from the bidirectional port or the charge only port to the at least one battery cell, and a disconnected mode where current cannot flow between the bidirectional port or the charge only port and the at least one battery cell; and
    a switch box configured to connect the plurality of marine batteries in parallel to the load and provide for simultaneous charging of all of the plurality of batteries.

12. The system of claim 11, wherein each of the plurality of marine batteries is configured to receive a charge current through the bidirectional port from a battery charger connected through the switch box, and to receive a charge current through the charge only port from a battery charger connected directly to the charge only port.

13. The system of claim 11, wherein each of the plurality of marine batteries is configured to permit receipt of the charge current through only one of the bidirectional port or the charge only port at a time.

14. A method of controlling a marine battery, wherein the marine battery includes at least one battery cell, a bidirectional port, and a charge only port and a plurality of switches positioned between the bidirectional port, the charge only port, and the at least one battery cell, the method comprising:
   detecting a connection status of at least one of the bidirectional port and/or the charge only port; and
   based on the connection status of each port, controlling the plurality of switches to transition the marine battery between a power delivery mode where current can flow from the at least one battery cell out of the bidirectional port, a charge mode where current can from the bidirectional port or the charge only port to the at least one battery cell, and a disconnected mode where current cannot flow between the bidirectional port or the charge only port and the at least one battery cell.

15. The method of claim 14, wherein detecting the connection status of the bidirectional port and the charge only port includes measuring at least one of a resistance across sockets in each of the of the bidirectional port and the charge only port and a voltage across sockets in each of the of the bidirectional port and the charge only port and determining the connection status of each of the of the bidirectional port and the charge only port based on the resistance and/or the voltage measured therein.

16. The method of claim 15, further comprising:
   determining a connected indicator for the bidirectional port based on the voltage at the bidirectional port indicating whether a connector is or is not connected to the bidirectional port;
   determining a permitted load indicator for the bidirectional port based on the resistance at the bidirectional port indicating whether a permitted load is or is not connected to the bidirectional port or determining a permitted charger indicator for the bidirectional port based on the resistance at the bidirectional port indicating whether a permitted charger is or is not connected to the bidirectional port;
   wherein the connection status of the bidirectional port is based on the connected indicator for the bidirectional port and the permitted load indicator for the bidirectional port;
   determining a connected indicator for the charge only port based on the voltage at the charge only port indicating whether a connector is or is not connected to the charge only port;
   determining a permitted charger indicator for the charge only port based on the resistance at the charge only port indicating whether the permitted charger is or is not connected to the charge only port; and
   wherein the connection status of the charge only port is based on the connected indicator for the charge only port and the permitted charger indicator.

17. The method of claim 14, wherein the plurality of switches comprises three unidirectional switches, including a main port switch operable to prevent current flow out of the bidirectional port, a charge port switch operable to prevent current flow out of the charge only port, and a charge enable switch operable to prevent current flow to the at least on battery cell, wherein controlling the marine battery between the power delivery mode, the charge mode, and the disconnected mode includes controlling the controlling the main port switch, the charge port switch, and the charge enable switch.

18. The method of claim 17, further comprising closing the main port switch and opening the charge port switch to enable the power delivery mode.

19. The method of claim 18, further comprising closing the charge enable switch in the power delivery mode.

20. A method of controlling charging of a battery, wherein the battery includes at least one battery cell, a bidirectional port, and a charge only port, the method comprising:
   determining a connected indicator for the bidirectional port indicating whether a connector is or is not connected to the bidirectional port based on a voltage at the bidirectional port;
   determining a permitted load indicator indicating whether a permitted load is or is not connected to the bidirectional port based on a resistance at the bidirectional port, or determining a permitted charger indicator indicating whether a permitted charger is or is not connected to the bidirectional port based on the resistance at the bidirectional port;
   determining a connected indicator for the charge only port indicating whether a connector is or is not connected to the charge only port based on the voltage at the charge only port;
   determining a permitted charger indicator for the charge only port indicating whether the permitted charger is or is not connected to the charge only port based on the resistance at the charge only port;
   determining a connection status of the bidirectional port based on the connected indicator for the bidirectional port and the permitted load indicator for the bidirectional port;
   determining a connection status of the charge only port based on the connected indicator and the permitted charger indicator for the charge only port, based on the connection status of the bidirectional port and the connection status of the charge only port, controlling the battery between a power delivery mode where current can flow from the at least one battery cell out of the bidirectional port, a charge mode where current can from the bidirectional port or the charge only port to the at least one battery cell, and a disconnected mode where current cannot flow between the bidirectional port or the charge only port and the at least one battery cell.

* * * * *